(12) United States Patent
Vukanti et al.

(10) Patent No.: US 12,305,571 B2
(45) Date of Patent: May 20, 2025

(54) COMBUSTOR

(71) Applicant: General Electric Company, Schenectady, NY (US)

(72) Inventors: Perumallu Vukanti, Bengaluru (IN); Pradeep Naik, Bengaluru (IN); Saket Singh, Bengaluru (IN); Michael A. Benjamin, Cincinnati, OH (US); Sripathi Mohan, Bengaluru (IN); Clayton S. Cooper, Loveland, OH (US); Rajendra Wankhade, Bengaluru (IN); Hiranya Nath, Bengaluru (IN); Nicholas R. Overman, Sharonville, OH (US); Steven C. Vise, Loveland, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/501,484

(22) Filed: Nov. 3, 2023

(65) Prior Publication Data
US 2025/0067214 A1 Feb. 27, 2025

(30) Foreign Application Priority Data
Aug. 22, 2023 (IN) .............................. 202311056096

(51) Int. Cl.
*F02C 3/30* (2006.01)
*F23R 3/04* (2006.01)

(52) U.S. Cl.
CPC .................. *F02C 3/30* (2013.01); *F23R 3/04* (2013.01); *F05D 2260/202* (2013.01); *F05D 2260/2322* (2013.01); *F23R 2900/03042* (2013.01)

(58) Field of Classification Search
CPC .... F02C 3/30; F23R 3/04; F23R 2900/03042; F05D 2260/202; F05D 2260/2322
See application file for complete search history.

(56) References Cited

U.S. PATENT DOCUMENTS

| 3,038,308 | A | * | 6/1962 | Fuller | F02C 7/141 |
|---|---|---|---|---|---|
| | | | | | 60/730 |
| 3,359,723 | A | * | 12/1967 | Bohensky | F02C 7/16 |
| | | | | | 60/39.55 |
| 4,272,953 | A | | 6/1981 | Rice | |

(Continued)

FOREIGN PATENT DOCUMENTS

CA 2040780 A1 11/1991

*Primary Examiner* — Lorne E Meade
(74) *Attorney, Agent, or Firm* — Venable LLP; Michael C. Sanko; Michele V. Frank

(57) ABSTRACT

A combustor includes a combustion chamber and an annular dome. The combustion chamber includes an outer liner and an inner liner and has a combustion zone. The annular dome is coupled to the outer liner and the inner liner. A plurality of mixing assemblies operably injects a fuel-air mixture into the combustion zone of the combustion chamber to produce combustion gases. A combustor steam system is in fluid communication with the combustion chamber. The combustor steam system includes a steam path defined by at least one of the outer liner, the inner liner, or the annular dome. The combustor steam system operably directs steam through the steam path from the at least one of the outer liner, the inner liner, or the annular dome and into the combustion chamber.

20 Claims, 18 Drawing Sheets

(56) References Cited

U.S. PATENT DOCUMENTS

| | | |
|---|---|---|
| 5,121,597 A | 6/1992 | Urushidani et al. |
| 5,127,221 A | 7/1992 | Beebe |
| 5,461,854 A * | 10/1995 | Griffin, Jr. ............... F02C 3/30 |
| | | 60/39.55 |
| 6,341,485 B1 * | 1/2002 | Liebe ..................... F23R 3/002 |
| | | 60/800 |
| 6,951,108 B2 | 10/2005 | Burrus et al. |
| 8,813,473 B2 * | 8/2014 | Fletcher ................. F23L 7/005 |
| | | 60/39.55 |
| 9,103,547 B2 | 8/2015 | Eroglu et al. |
| 10,837,641 B2 | 11/2020 | Ogata et al. |
| 10,982,853 B2 | 4/2021 | Polyzopoulos et al. |
| 11,313,561 B2 | 4/2022 | Roh |

\* cited by examiner of the outer liner of the combustor of FIG. 2, taken at detail 3 in FIG. 2, according to the present disclosure.

COMBUSTOR

CROSS REFERENCE TO RELATED APPLICATIONS

The present application claims the benefit of Indian Patent Application number 202311056096, filed on Aug. 22, 2023, which is hereby incorporated by reference herein in its entirety.

TECHNICAL FIELD

The present disclosure relates generally to combustors, for example, for turbine engines.

BACKGROUND

A turbine engine generally includes a fan and a core section arranged in flow communication with one another. A combustor is arranged in the core section to generate combustion gases for driving a turbine in the core section of the turbine engine.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
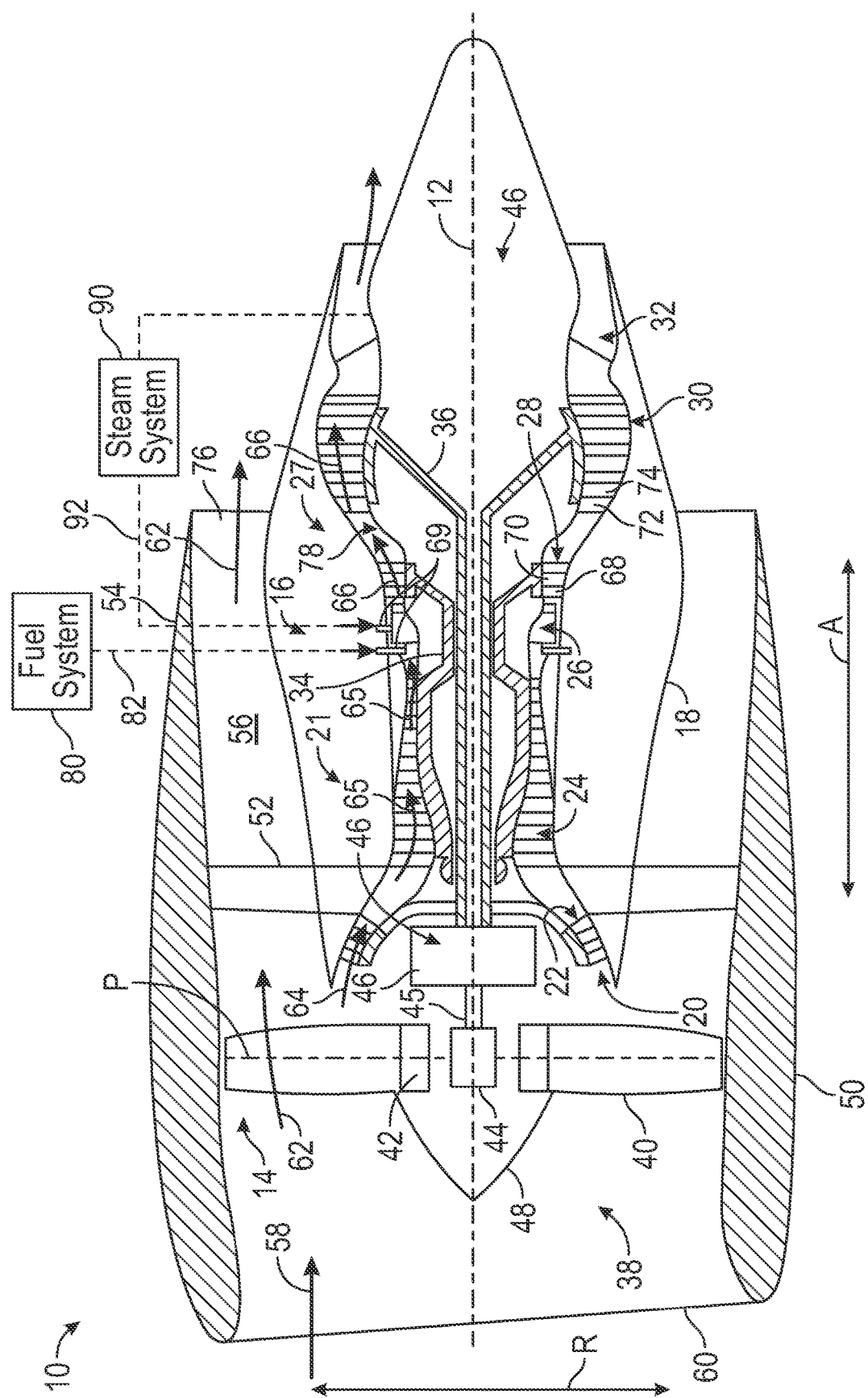
FIG. 1 is a schematic cross-sectional diagram of a turbine engine, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

As used herein, the terms "low," "mid" (or "mid-level"), and "high," or their respective comparative degrees (e.g., "lower" and "higher", where applicable), when used with compressor, combustor, turbine, shaft, fan, or turbine engine components, each refers to relative pressures, relative speeds, relative temperatures, or relative power outputs within an engine unless otherwise specified. For example, a "low-power" setting defines the engine or the combustor configured to operate at a power output lower than a "high-power" setting of the engine or the combustor, and a "mid-level power" setting defines the engine or the combustor configured to operate at a power output higher than a "low-power" setting and lower than a "high-power" setting. The terms "low," "mid" (or "mid-level") or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine or the combustor.

The various power levels of the turbine engine detailed herein are defined as a percentage of a sea level static (SLS) maximum engine rated thrust. Low-power operation or conditions includes, for example, less than thirty percent (30%) of the SLS maximum engine rated thrust of the turbine engine. Mid-level power operation or conditions includes, for example, thirty percent (30%) to eighty-five (85%) of the SLS maximum engine rated thrust of the turbine engine. High-power operation or conditions includes, for example, greater than eighty-five percent (85%) of the SLS maximum engine rated thrust of the turbine engine. The values of the thrust for each of the low-power operation, the mid-level power operation, and the high-power operation of the turbine engine are exemplary only, and other values of the thrust can be used to define the low-power operation, the mid-level power operation, and the high-power operation.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

Combustors for turbine engines, such as turbine engines for aircraft, ignite fuel and air mixtures to produce combustion gases, which in turn drive one or more turbines of the turbine engine, thereby rotating one or more loads (e.g., a fan, a propeller, etc.). Air pollution concerns have led to stricter combustion emissions standards. Such standards regulate the emission of nitrogen oxide ($NO_x$), non-volatile particulate matter (nvPM), as well as other types of exhaust emissions, from the turbine engine. The nvPM includes, for example, soot, smoke, or the like. Generally, $NO_x$ is formed during the combustion process due to high flame temperatures in the combustor. Turbine engine design tradeoffs are necessary to meet requirements for noise, emissions, fuel burn, cost, weight, and performance. As temperatures in the combustor increase, $NO_x$ generation increases due to the higher temperatures. In turbine engine design, balancing a reduction in $NO_x$ emissions, nvPM emissions, carbon monoxide (CO), and noise, while achieving improved engine performance, is difficult. For example, combustor design changes to achieve lower emissions must not impact the ability of the combustion system to satisfy performance and certification requirements throughout the operating cycle of the aircraft.

In addition to balancing a reduction in emissions while achieving improved engine performance, another tradeoff is reducing the specific fuel consumption (SFC) of the turbine engine. The specific fuel consumption is the amount of fuel consumed by the turbine engine for each unit of power output. Accordingly, a lower SFC means that less fuel is consumed to achieve a particular power output of the turbine engine. Some turbine engines utilize combustors in which the steam is injected through the fuel nozzle into the combustion chamber. Injecting steam into the combustion chamber reduces the SFC while also reducing $NO_x$ emissions. For example, the more steam that is injected into the combustor, the more the SFC will be reduced. Steam in the combustion, however, increases CO emissions and can lead to flameout as the steam chokes the flame (e.g., reduces oxygen in the combustion chamber). Further, such turbine engines that inject the steam from the fuel nozzle can achieve up to about 5% water-to-air ratios (WARs) within the combustor before flameout occurs. Thus, such turbine engines are limited in the amount of emissions and SFC reduction that can be achieved with the steam injection prior to flameout.

Accordingly, embodiments of the present disclosure provide systems and methods to balance the requirements in turbine engines of low fuel burn and low emissions (e.g., $NO_x$ emissions, nvPM emissions, CO, and noise) while balancing turbine engine performance, reduced SFC, and avoiding flameout in the combustor. Embodiments of the present disclosure provide for a turbine engine having a combustor with a steam system that causes steam to flow within at least one of the outer liner, the inner liner, or the annular dome of the combustor. The steam flows through a channel within the outer liner, the inner liner, or the annular dome to cool the outer liner, the inner liner, or the annular dome. The steam is exhausted or is injected into the combustion chamber from the outer liner, the inner liner, or the annular dome. At least one of the outer liner or the inner liner includes dilution holes, and the steam is injected through at least one of the dilution holes or steam cooling holes downstream (e.g., axially aft) of the dilution holes. The annular dome includes at least one of flame shaping holes or dome cooling holes through which the steam is injected. The steam through the flame shaping holes prevents the flame from expanding radially beyond the steam that is injected through the flame shaping holes. The steam is injected in locations away from the flame region (e.g., the combustion zone) to avoid flameout, while also ensuring that more steam is injected into the combustion chamber to reduce the SFC, as compared to turbine engines and combustors without the benefit of the present disclosure.

The steam system of the present disclosure enables a greater amount of steam to be injected into the combustor without sacrificing operability of the combustor, as compared to combustors without the benefit of the present disclosure. For example, the steam is injected into the combustion chamber, away from the combustion zone, to avoid flameout of the flame in the combustion zone as the steam is kept away from the flame. Such a configuration of injecting the steam away from the flame enables a greater amount of steam that can be injected into the combustor for reduced emissions and reduced SFC, while providing for flame stability (e.g., avoiding flameout), as compared to combustors without the benefit of the present disclosure. The present disclosure provides for WARs of up to 60%, thereby enabling a greater amount of steam to reduce the emissions and to reduce the SFC, while providing for flame stability in the combustor (e.g., avoiding flameout), as compared to turbine engines and combustors without the benefit of the present disclosure. The steam in the liners or the annular dome helps to increase a life of the liners or the annular dome as compared to liners and annular domes without the benefit of the present disclosure.

Referring now to the drawings, FIG. 1 is a schematic cross-sectional diagram of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27, including a high pressure (HP) turbine 28, followed downstream by a low pressure (LP) turbine 30, and a jet exhaust nozzle section 32. A high pressure (HP) shaft 34 or a spool drivingly connects the HP turbine 28 to the HP compressor 24 to rotate the HP turbine 28 and the HP compressor 24 in unison. A low pressure (LP) shaft 36 drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flow path.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and at least a portion of the core turbine engine 16. The nacelle 50 is supported relative to the core turbine engine 16 by a plurality of outlet guide vanes 52 that is spaced circumferentially about the nacelle 50. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 or the fan section 14. As the volume of air 58 passes across the fan blades 40, a first portion of air 62 is directed or routed into the bypass airflow passage 56, and a second portion of air 64 is directed or is routed into the upstream section of the core air flow path, or, more specifically, into the annular inlet 20 of the LP compressor 22. The ratio between the first portion of air 62 and the second portion of air 64 is commonly known as a bypass ratio. The pressure of the second portion of air 64 is then increased, forming compressed air 65, and the compressed air 65 is routed through the HP compressor 24 and into the combustion section 26, where the compressed air 65 is mixed with fuel and burned to provide combustion gases 66.

The combustion gases 66 are routed into the HP turbine 28 and expanded through the HP turbine 28 where a portion of thermal energy or kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of thermal energy or the kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and rotation of the fan 38 via the gearbox assembly 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

As detailed above, the second portion of air 64 is mixed with fuel 67 in the combustion section 26 to produce the combustion gases 66. The turbine engine 10 also includes a fuel system 80 for providing the fuel 67 to the combustion section 26. The fuel system 80 includes a fuel tank (not shown) for storing fuel therein and one or more fuel injector lines 82 to provide the fuel 67 to the combustion section 26, as detailed further below. The fuel system 80 can include one or more valves for controlling an amount of the fuel 67 provided to the combustion section 26. The fuel 67 can be any type of fuel used for turbine engines, such as, for example, JetA, sustainable aviation fuels (SAF) including biofuels, hydrogen-based fuel ($H_2$), or the like. Preferably, the fuel 67 is a hydrogen-based fuel ($H_2$) that produces a greater amount of water as compared to fossil fuels or other types of fuels used in turbine engines. In this way, a greater amount of steam can be generated from the combustion gases 66 of the hydrogen-based fuel as compared to other types of fuels for turbine engines.

The turbine engine 10 includes a steam system 90 in fluid communication with the jet exhaust nozzle section 32. The steam system 90 generates steam 69 from exhaust in the jet exhaust nozzle section 32. The steam system 90 includes one or more steam lines 92 to provide the steam 69 to the combustion section 26, as detailed further below.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, or turboshaft engines.

Figure 2:
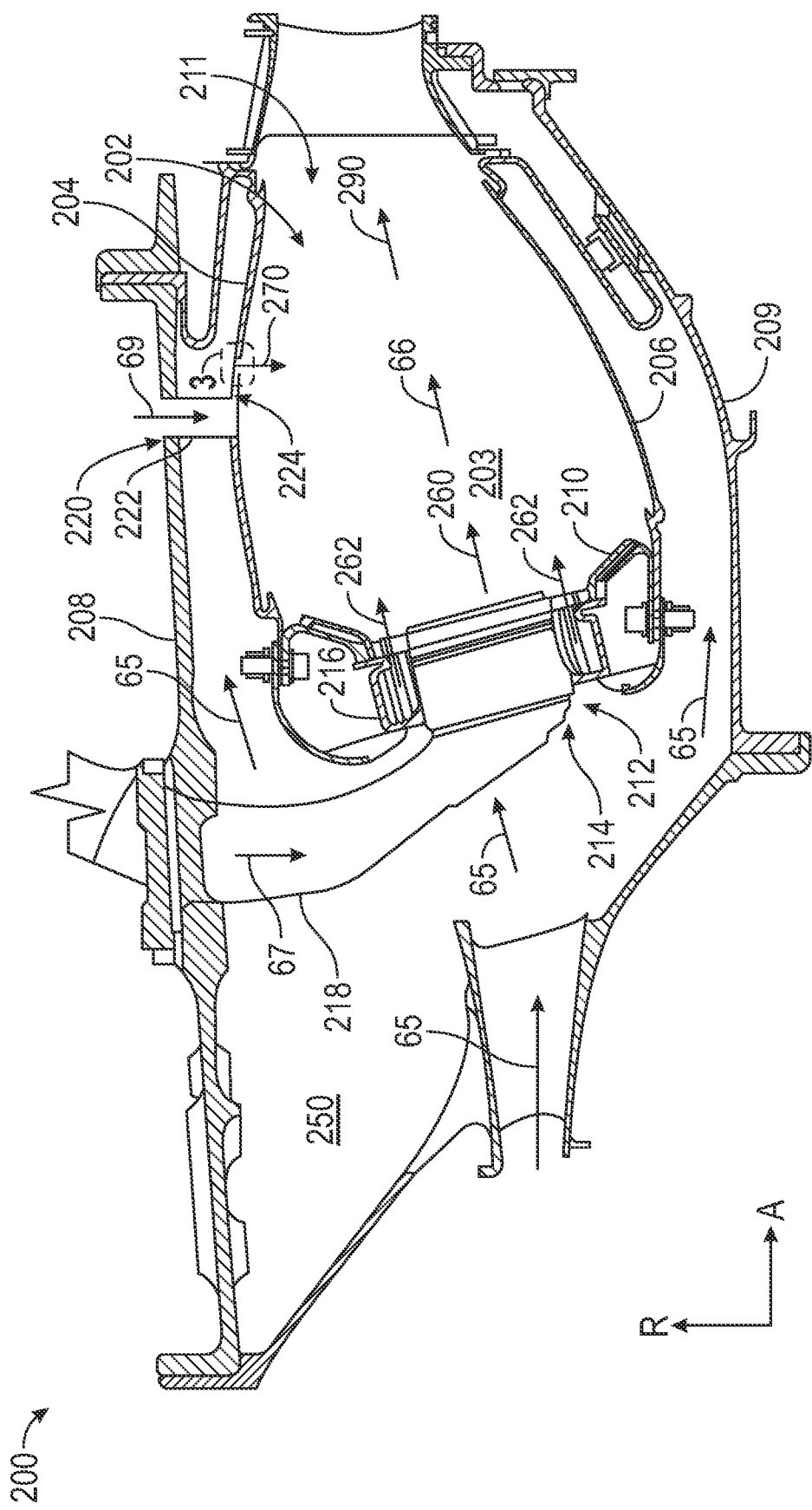
FIG. 2 is a schematic cross-sectional diagram of a combustor for the turbine engine of FIG. 1, taken along a longitudinal centerline axis of the turbine engine, according to the present disclosure.

FIG. 2 is a schematic cross-sectional diagram of a combustor 200 for the turbine engine 10 (FIG. 1), taken along the longitudinal centerline axis 12 (FIG. 1) of the turbine engine 10 (FIG. 1), according to the present disclosure. In the exemplary embodiment, the combustion section 26 (FIG. 1) includes the combustor 200 having a combustion chamber 202 defined by an outer liner 204 and an inner liner 206. The combustor 200 is an annular combustor. The combustor 200, however, can include any type of combustor, such as, for example, annular combustors, double annular combustors, can-annular combustors, or the like.

The outer liner 204 and the inner liner 206 are annular about the longitudinal centerline axis 12 of the turbine engine 10 (FIG. 1). The outer liner 204 defines a radially outer boundary of the combustion chamber 202, and the inner liner 206 defines a radially inner boundary of the combustion chamber 202. The outer liner 204 and the inner liner 206 are spaced radially inward from an outer combustor casing 208 and an inner combustor casing 209, respectively, that extend circumferentially about the outer liner 204 and the inner liner 206. At least one of the outer liner 204 or the inner liner 206 includes one or more air dilution holes 205 that operably direct the compressed air 65 through the at least one of the outer liner 204 or the inner liner 206, and into the combustion chamber 202 to cool the at least one of the outer liner 204 or the inner liner 206 (e.g., by film cooling). The combustor 200 also includes an annular dome 210 coupled to the outer liner 204 and the inner liner 206. The annular dome 210 defines an upstream end, or a forward end, of the combustion chamber 202. The combustion chamber 202 extends from the annular dome 210 to a combustion chamber outlet 211.

A plurality of mixing assemblies 212 (only one is illustrated in FIG. 2) is spaced circumferentially about the annular dome 210 to deliver a mixture of fuel and air to the combustion chamber 202. For example, the plurality of mixing assemblies 212 delivers the mixture of fuel and air into a combustion zone 203 of the combustion chamber 202, as detailed further below. In FIG. 2, each mixing assembly 212 includes a mixer 214 and a mixing assembly swirler 216. A plurality of fuel injectors 218 (only one is illustrated in FIG. 2) is coupled in flow communication with the plurality of mixing assemblies 212. The plurality of fuel injectors 218 is spaced circumferentially about the annular dome 210 and extends radially from the outer combustor casing 208 to the mixer 214 of each of the plurality of mixing assemblies 212. In some embodiments, the plurality of fuel injectors 218 extends from the inner combustor casing 209, or can extend from both the outer combustor casing 208 and the inner combustor casing 209.

The combustor 200 includes a combustor steam system 220 that is in fluid communication with the steam system 90 (FIG. 1) for receiving the steam 69 from the steam system 90. The combustor steam system 220 includes one or more steam injectors 222 and a steam path 224. The one or more steam injectors 222 are disposed at the outer liner 204 or the inner liner 206 and are in fluid communication with the steam line 92 (FIG. 1) of the steam system 90 such that the steam system 90 supplies the steam 69 to the one or more steam injectors 222. The one or more steam injectors 222 can include discrete steam injectors that are spaced circumferentially about the combustion chamber 202, or can include a single steam injector that is annular about the combustion chamber 202.

The steam path 224 is defined by the outer liner 204. For example, the steam path 224 is disposed within the outer liner 204. The one or more steam injectors 222 supply the steam 69 to the steam path 224 for cooling the outer liner 204. While the steam path 224 is defined by the outer liner 204, the steam path 224 can be defined by the inner liner 206, or can be defined by both the outer liner 204 and the inner liner 206. The steam path 224 is also in fluid communication with the combustion chamber 202 such that the steam path 224 supplies the steam 69 into the combustion chamber 202, as detailed further below.

In operation, the combustor 200 receives the compressed air 65 that is discharged from the HP compressor 24 (FIG. 1) in a diffuser section 250 at a location upstream of the combustion chamber 202. A portion of the compressed air 65 is channeled through the plurality of mixing assemblies 212. For example, the compressed air 65 is channeled through the mixing assembly swirler 216 of each of the plurality of mixing assemblies 212, and the mixing assembly swirler 216 swirls the compressed air 65. At the plurality of mixing assemblies 212, the compressed air 65 is mixed with the fuel 67 from the plurality of fuel injectors 218 and discharged into the combustion chamber 202. The plurality of fuel injectors 218 injects the fuel 67 axially aftward into the combustion zone 203 of the combustion chamber 202 to generate a fuel stream 260. At the mixer 214 of each of the plurality of mixing assemblies 212, the fuel stream 260 is mixed with a first compressed air stream 262 to generate a fuel-air mixture. The fuel-air mixture is fuel-rich (e.g., higher fuel-to-air ratios within the mixture) or fuel-lean (e.g., lower fuel-to-air ratios within the mixture). The fuel-air mixture is ignited by an igniter (not shown in FIG. 2 for clarity) for generating a flame within the combustion chamber 202 that burns the fuel-air mixture and provides combustion gases 66 that are channeled downstream to first stage turbine nozzles of the HP turbine 28 (FIG. 1). The flame burns within the combustion zone 203 (e.g., adjacent to the mixer 214 and within an area of the annular dome 210) and generates the combustion gases 66 within the combustion chamber 202.

The steam system 90 (FIG. 1) operably supplies the steam 69 to the combustor steam system 220 through the one or more steam lines 92 (FIG. 1). For example, the steam system 90 supplies the steam 69 to the one or more steam injectors 222. The one or more steam injectors 222 operably direct the steam 69 into the steam path 224 within the outer liner 204 or the inner liner 206 to cool the outer liner 204 or the inner liner 206. The combustor steam system 220 then operably injects the steam 69 from the steam path 224 into the combustion chamber 202 to generate a steam injection stream 270. The combustor steam system 220 operably injects the steam 69 to generate the steam injection stream 270 downstream of the combustion zone 203. In this way, the steam injection stream 270 does not directly interact with the flame generated by the fuel-gas mixture, thereby reducing the risk of flameout, while also providing the steam 69 into the combustion chamber to reduce the specific fuel consumption (SFC) of the turbine engine 10 (FIG. 1), as compared to turbine engines and to combustors without the benefit of the present disclosure.

The combustion chamber 202 operably directs the combustion gases 66 from the combustion zone 203 downstream within the combustion chamber 202. The combustion gases 66 from the combustion zone 203 mix with the steam injection stream 270 to generate a steam-combustion gases mixture 290 within the combustion chamber 202. The combustion chamber 202 then operably directs the steam-combustion gases mixture 290 to exit the combustion chamber 202 through the combustion chamber outlet 211, and the steam-combustion gases mixture 290 is channeled downstream to the first stage turbine nozzle of the HP turbine 28 (FIG. 1).

The steam system 90 can vary the steam injection into the combustion chamber 202 during various operating conditions of a mission cycle of the turbine engine 10 (FIG. 1). The mission cycle includes, for example, a low-power operation, a mid-level power operation, and a high-power operation. The low-power operation includes, for example, engine start, idle, taxiing, and approach. The mid-level power operation includes, for example, cruise. The high-power operation includes, for example, takeoff and climb. During the low-power operation, the combustor steam system 220 does not inject the steam 69 into the combustion chamber 202. During the mid-power operation and the high-power operation, the combustor steam system 220 operably injects the steam 69. During the high-power operation, the combustor steam system 220 operably injects a greater amount of the steam 69 than during the mid-power operation.

Injecting the steam 69 downstream of the combustion zone 203 (e.g., downstream of the flame) provides for flame stability, and the steam 69 in the combustion chamber 202 reduces a temperature of the combustion gases 66 in the combustion chamber 202. In this way, the flame operates at a higher temperature and the steam 69 reduces the temperature of the flame. The combustor steam system 220 enables a water-to-air ratio (WAR) up to 60% of the steam 69 to the compressed air 65 within the combustion chamber 202. For example, the WAR is 0.0% to 60%, and preferably is 5% to 60%. In some embodiments, the WAR is 0.0% to 60% based on the operating conditions of the turbine engine (e.g., startup, idle, taxi, takeoff, climb, cruise, descent). For example, the WAR in the combustion chamber 202 is zero percent to thirty percent (0% to 30%) during low-power conditions, is one percent to forty percent (1% to 40%) during mid-power conditions, and is two percent to sixty percent (2% to 60%) during high-power conditions. In this way, the steam 69 is injected into the combustion chamber 202 during any operating condition of the turbine engine 10 (FIG. 1) that is above an idle condition. Accordingly, the steam 69 injected into the combustion chamber 202 downstream of the combustion zone 203 enables reduced emissions ($NO_x$ emissions, nvPM emissions, CO emissions, noise) and reduced specific fuel capacity (SFC) while avoiding flameout of the flame within the combustion zone 203, as compared to turbine engines and combustors without the benefit of the present disclosure.

Figure 3:
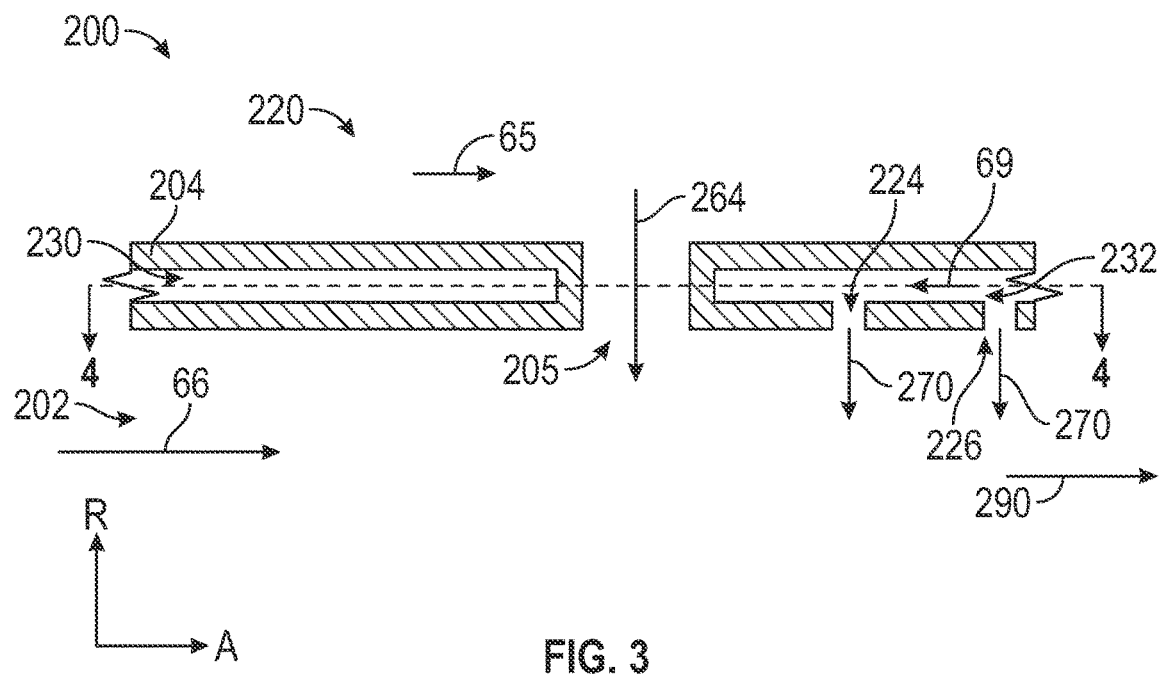
FIG. 3 is a schematic cross-sectional diagram of a portion of the outer liner of the combustor of FIG. 2, taken at detail 3 in FIG. 2, according to the present disclosure.
Figure 4:
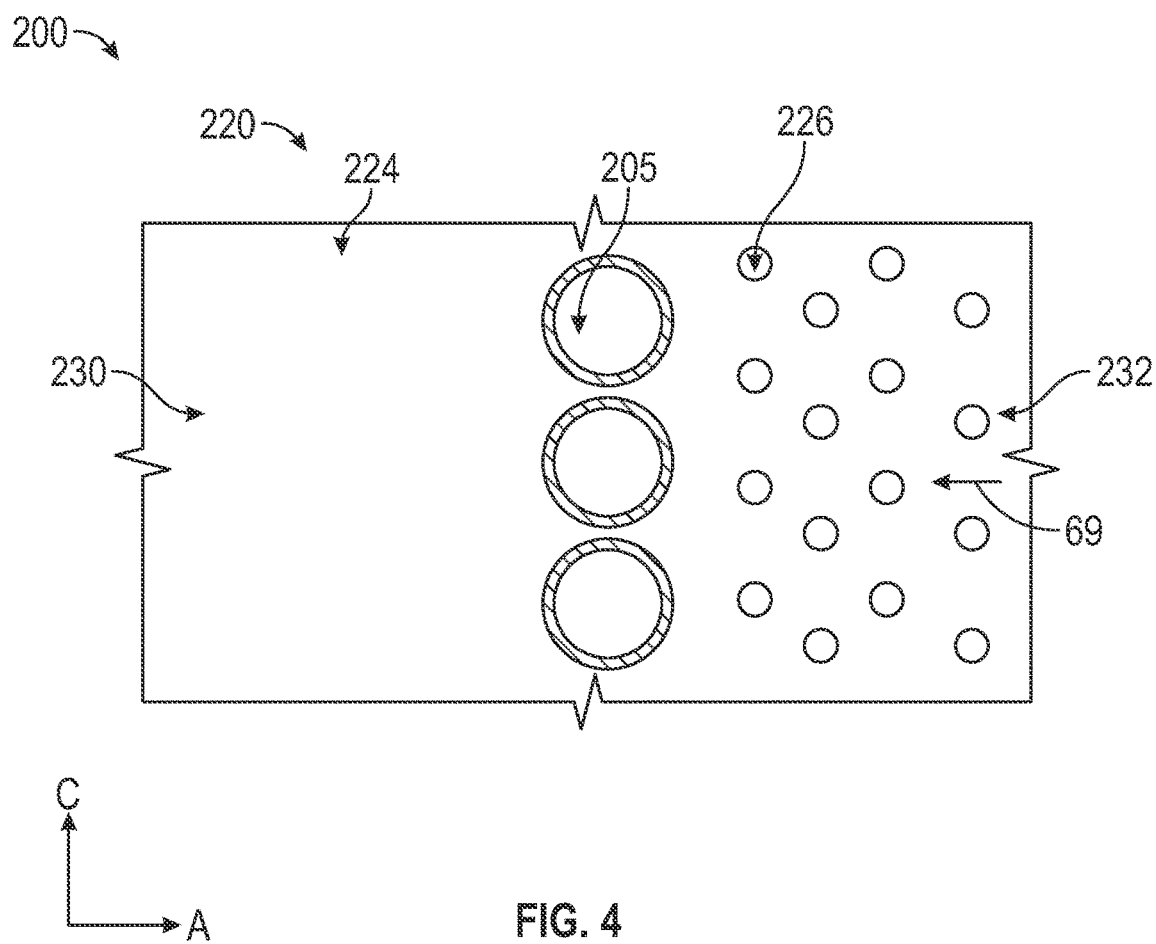
FIG. 4 is a schematic cross-sectional plan view of the portion of the outer liner of FIG. 3, taken at detail 4-4 in FIG. 3, according to the present disclosure.

FIG. 3 is a schematic cross-sectional diagram of a portion of the outer liner 204 of the combustor 200, taken at detail 3 in FIG. 2, according to the present disclosure. FIG. 4 is a schematic cross-sectional plan view of the portion of the outer liner 204 of FIG. 3, taken at detail 4-4 in FIG. 3, according to the present disclosure. As shown in FIG. 3, the steam path 224 extends axially within the outer liner 204 and includes a forward portion 230 that is axially forward of the one or more air dilution holes 205 and an aft portion 232 that is axially aft of the one or more air dilution holes 205. As shown in FIG. 4, the steam path 224 extends circumferentially within the outer liner 204. In this way, the steam path 224 is annular about the longitudinal centerline axis 12 (FIG. 1).

The outer liner 204 includes one or more air dilution holes 205 for operably directing the compressed air 65 through the outer liner 204 into the combustion chamber 202. The one or more air dilution holes 205 are spaced circumferentially about the outer liner 204. The combustor steam system 220 also includes one or more steam injection holes 226 defined through the outer liner 204 (or the inner liner 206). The one or more steam injection holes 226 provide fluid communication between the steam path 224 and the combustion chamber 202. The one or more steam injection holes 226 operably direct the steam 69 from the steam path 224 through the outer liner 204 into the combustion chamber 202.

The one or more steam injection holes 226 are positioned downstream of the one or more air dilution holes 205. For example, the one or more steam injection holes 226 are positioned axially aft of the one or more air dilution holes 205. In some embodiments, the one or more steam injection holes 226 are positioned at an axial position that is at least 20% of a total length of the combustion chamber 202. In this way, the one or more steam injection holes 226 are positioned downstream (e.g., axially aft) of the combustion zone 203. A size of each of the one or more steam injection holes 226, a number of the one or more steam injection holes 226, and the circumferential spacing between respective ones of the one or more steam injection holes 226 is based on a desired amount of steam flow desired to generate steam injection stream 270 within the combustion chamber 202. In addition, while FIG. 4 depicts the one or more steam injection holes 226 as being generally circular openings, other shapes can be implemented for the openings instead. For example, the one or more steam injection holes 226 can be oval-shaped slots, or the like.

In operation, the combustor 200 and the combustor steam system 220 operate as detailed above. In particular, the combustor 200 operably directs the compressed air 65 through the one or more air dilution holes 205 to generate a second compressed air stream 264 in the combustion chamber 202. The second compressed air stream 264 helps to cool the combustion gases 66 from the combustion zone 203 as the combustion gases 66 are directed downstream through the combustion chamber 202. The combustor steam system 220 operably directs the steam 69 from the steam path 224 through the one or more steam injection holes 226 and into the combustion chamber 202 downstream of the combustion zone 203, thereby generating the steam injection stream 270 within the combustion chamber 202. In this way, the steam injection stream 270 is downstream of the combustion zone 203. The one or more steam injection holes 226 operably direct the steam 69 radially into the combustion chamber 202. The steam injection stream 270 operably mixes with the combustion gases 66 from the combustion zone 203 to generate the steam-combustion gases mixture 290, as detailed above.

Figure 5:
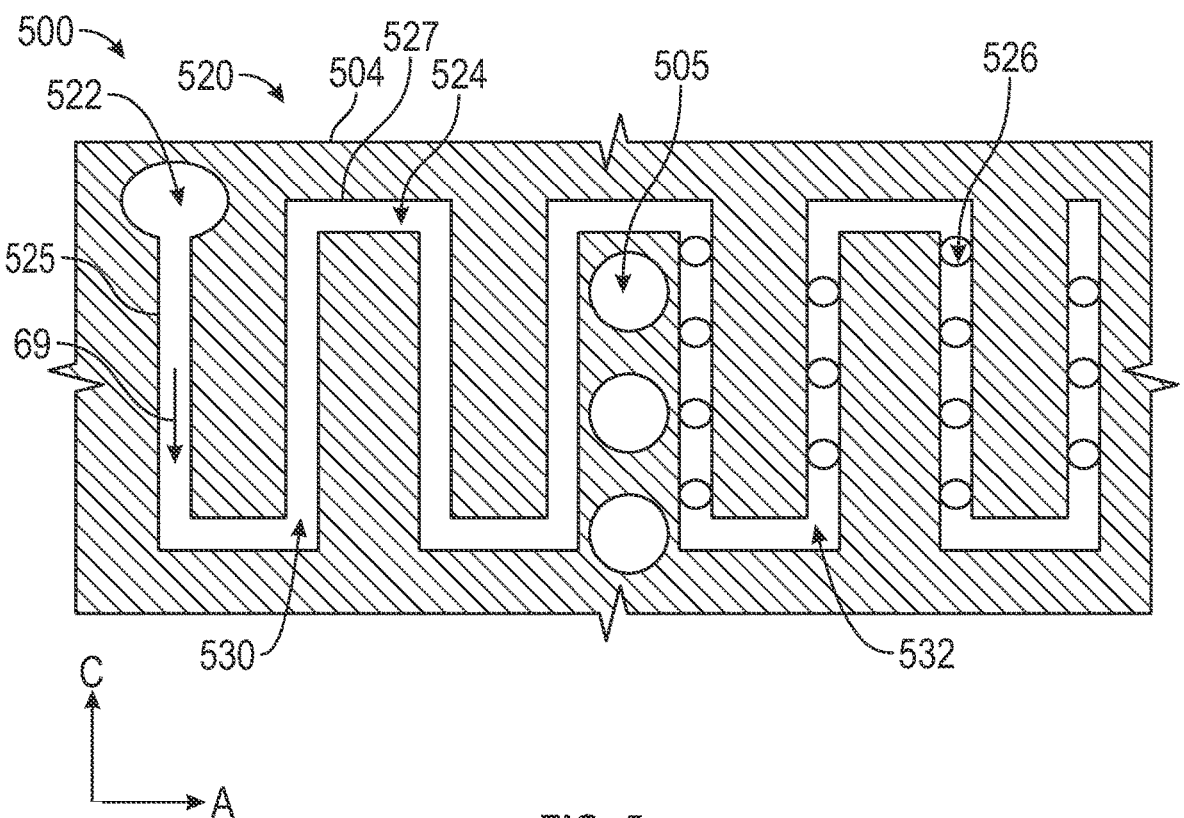
FIG. 5 is a schematic cross-sectional plan view of a portion of an outer liner for a combustor, according to another embodiment.

FIG. 5 is a schematic cross-sectional plan view of a portion of an outer liner 504 for a combustor 500, according to another embodiment. The combustor 500 is substantially similar to the combustor 200 of FIG. 2, and includes many of the same or similar components as the combustor 200. The outer liner 504 includes one or more air dilution holes 505 and a combustor steam system 520. The combustor steam system 520 includes one or more steam injectors 522, a steam path 524 defined by (e.g., disposed within) the outer liner 504, and one or more steam injection holes 526. The one or more steam injectors 522 are positioned upstream (e.g., axially forward) of the one or more air dilution holes 505. The steam path 524 is different than the steam path 224 of FIG. 2. In particular, the steam path 524 does not extend annularly about the outer liner 504. Rather, the steam path 524 includes one or more discrete steam paths 524 that include one or more circumferential extending portions 525 and one or more axial extending portions 527 that are fluidly coupled with the one or more circumferential extending portions 525. In this way, the steam path 524 defines one or more channels within the outer liner 504, rather than a continuously extending steam path such as the steam path 224 of FIG. 2.

The steam path 524 has a generally zigzag shape that extends axially aftward from the one or more steam injectors 522. For example, the one or more circumferential extending portions 525 and the one or more axial extending portions 527 are fluidly coupled to each other to form the generally zigzag shape of the steam path 524. The steam path 524 extends axially aftward of the one or more air dilution holes 505. In this way, the steam path 524 includes a forward portion 530 that is axially forward of the one or more air dilution holes 505 and an aft portion 532 that is axially aft of the one or more air dilution holes 505. The one or more steam injection holes 526 are in fluid communication with the steam path 524. The one or more steam injection holes 526 are positioned in the outer liner 504 at the aft portion 532 of the steam path 524 such that the one or more steam injection holes 526 are axially aft of the one or more air dilution holes 505. The one or more steam injection holes 526 are positioned on one or more of the one or more circumferential extending portions 525 of the steam path 524. The one or more steam injection holes 526 can be positioned on one or more of the one or more axial extending portions 527, or can be positioned on the one or more circumferential extending portions 525 of the steam path 524 and the one or more axial extending portions 527 of the steam path 524.

The combustor 500 and the combustor steam system 520 operate substantially similar to the combustor 200 and the combustor steam system 220 of FIG. 2, respectively. In particular, the combustor steam system 520 operably directs the steam 69 into the steam path 524 through the one or more steam injectors 522. The steam path 524 operably directs the steam 69 about the generally zigzag shape of the steam path 524. The one or more steam injection holes 526 operably direct the steam 69 therethrough to generate a steam injection stream within the combustion chamber (e.g., the combustion chamber 202 of FIG. 2). The generally zigzag shape of the steam path 524 allows the steam 69 to cool various locations of the outer liner 504, rather than an entirety of the outer liner such as by the steam path 224 of FIG. 2. Various shapes of the steam path 524 can be selected to cool the outer liner 504 at various locations, as desired.

Figure 6:
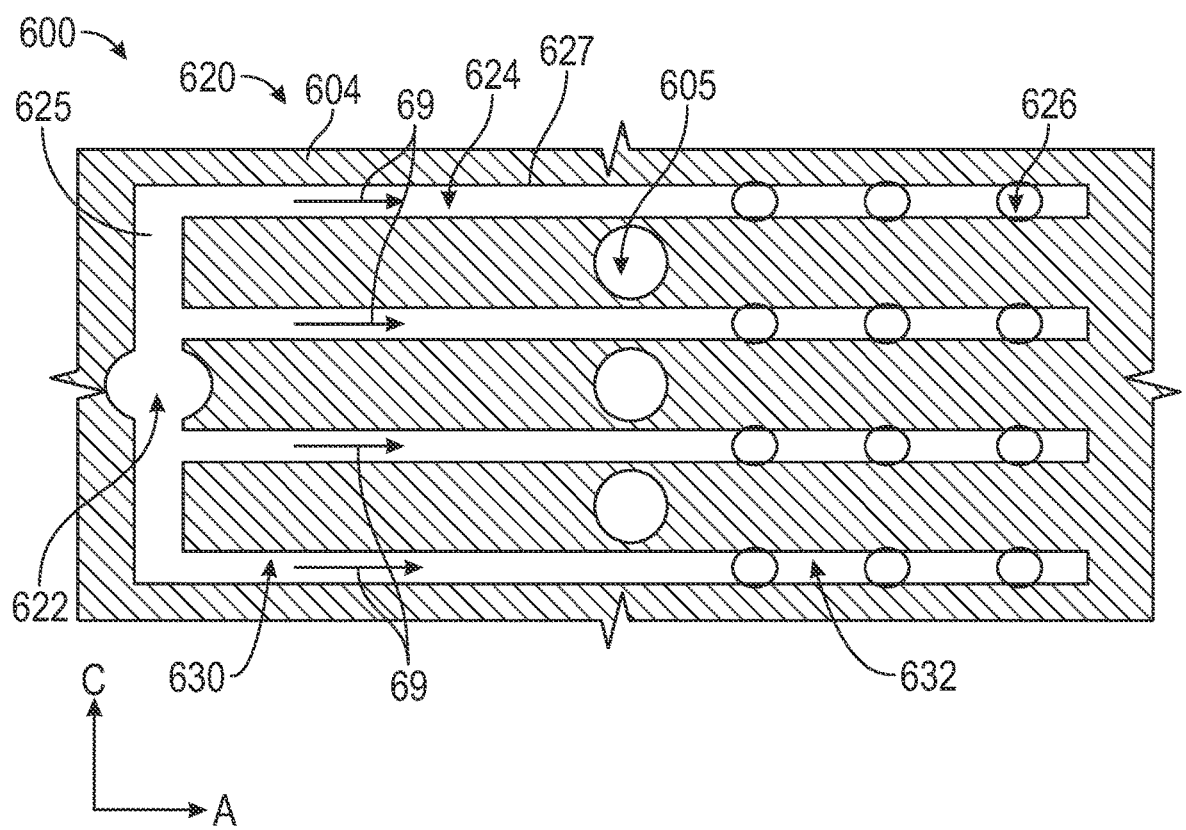
FIG. 6 is a schematic cross-sectional bottom view of a portion of an outer liner for a combustor, according to another embodiment.

FIG. 6 is a schematic cross-sectional plan view of a portion of an outer liner 604 for a combustor 600, according to another embodiment. The combustor 600 is substantially similar to the combustor 200 of FIG. 2, and includes many of the same or similar components as the combustor 200. The outer liner 604 includes one or more air dilution holes 605 and a combustor steam system 620. The combustor steam system 620 includes one or more steam injectors 622, a steam path 624 defined by (e.g., disposed within) the outer liner 604, and one or more steam injection holes 626. The one or more steam injectors 622 are positioned upstream (e.g., axially forward) of the one or more air dilution holes 605. The steam path 624 is different than the steam path 224 of FIG. 2. In particular, the steam path 624 does not extend annularly about the outer liner 604. Rather, the steam path 624 includes one or more discrete steam paths 624 that include one or more circumferential extending portions 625 and one or more axial extending portions 627 that are fluidly coupled with the one or more circumferential extending portions 625. In this way, the steam path 624 defines one or more channels within the outer liner 604, rather than a continuously extending steam path such as the steam path 224 of FIG. 2.

The one or more circumferential extending portions 625 extend circumferentially from the one or more steam injectors 622. The one or more axial extending portions 627 are fluidly coupled to the one or more circumferential extending portions 625. The one or more axial extending portions 627 extend axially aftward from the one or more circumferential extending portions 625. The one or more axial extending portions 627 extend axially aftward of the one or more air dilution holes 605. In this way, the steam path 624 includes a forward portion 630 that is axially forward of the one or more air dilution holes 605 and an aft portion 632 that is axially aft of the one or more air dilution holes 605. The one or more axial extending portions 627 are spaced circumferentially about the outer liner 604.

The one or more steam injection holes 626 are in fluid communication with the steam path 624. The one or more steam injection holes 626 are positioned in the outer liner 604 at the aft portion 632 of the steam path 624 such that the one or more steam injection holes 626 are axially aft of the one or more air dilution holes 605. The one or more steam injection holes 626 are positioned on one or more of the one or more axial extending portions 627 of the steam path 624. For example, each of the one or more axial extending portions 627 includes one or more of the one or more steam injection holes 626.

The combustor 600 and the combustor steam system 620 operate substantially similar to the combustor 200 and the combustor steam system 220 of FIG. 2, respectively. In particular, the combustor steam system 620 operably directs the steam 69 into the steam path 624 through the one or more steam injectors 622. The steam path 624 operably directs the steam 69 through the one or more circumferential extending portions 625 and through the one or more axial extending portions 627. The one or more steam injection holes 626 operably direct the steam 69 therethrough to generate a steam injection stream within the combustion chamber (e.g., the combustion chamber 202 of FIG. 2) downstream of the combustion zone. The one or more axial extending portions 627 allow the steam 69 to cool various locations of the outer liner 604, rather than an entirety of the outer liner such as by the steam path 224 of FIG. 2. Various shapes of the steam path 624 can be selected to cool the outer liner 604 at various locations, as desired.

Figure 7:
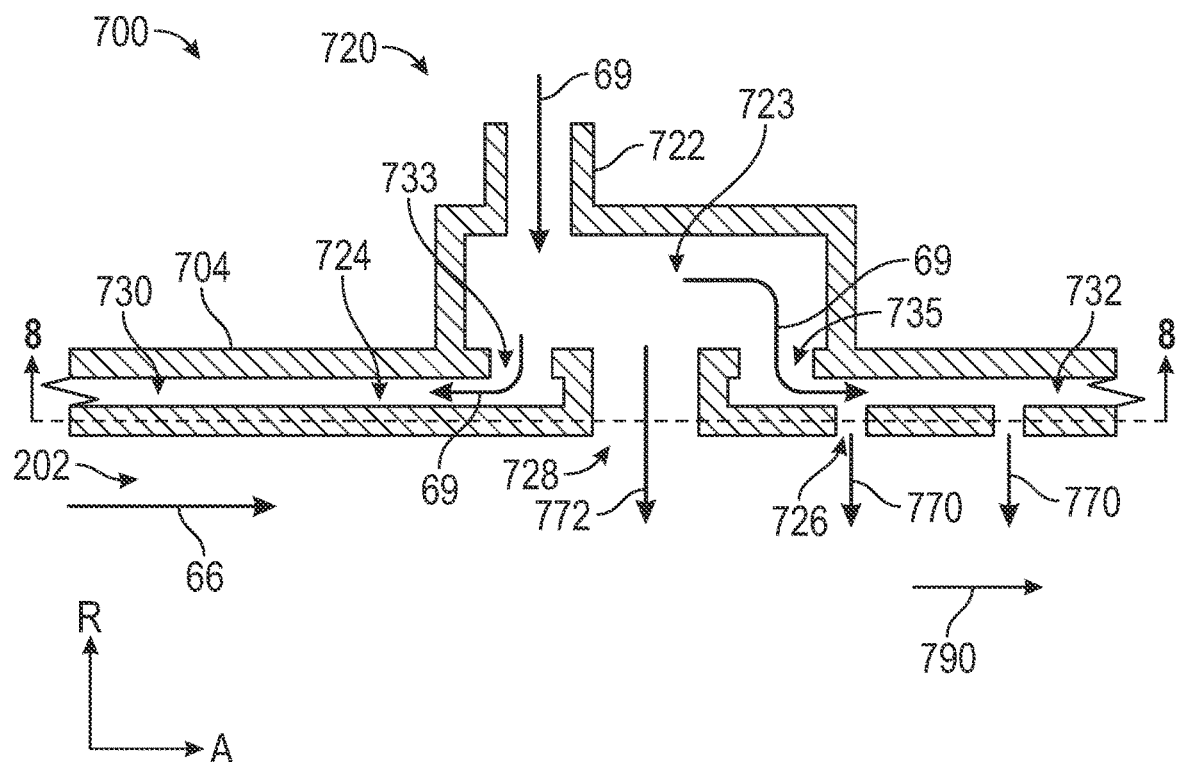
FIG. 7 is a schematic cross-sectional diagram of a portion of an outer liner of a combustor, taken along a longitudinal centerline axis of the combustor, according to another embodiment.
Figure 8:
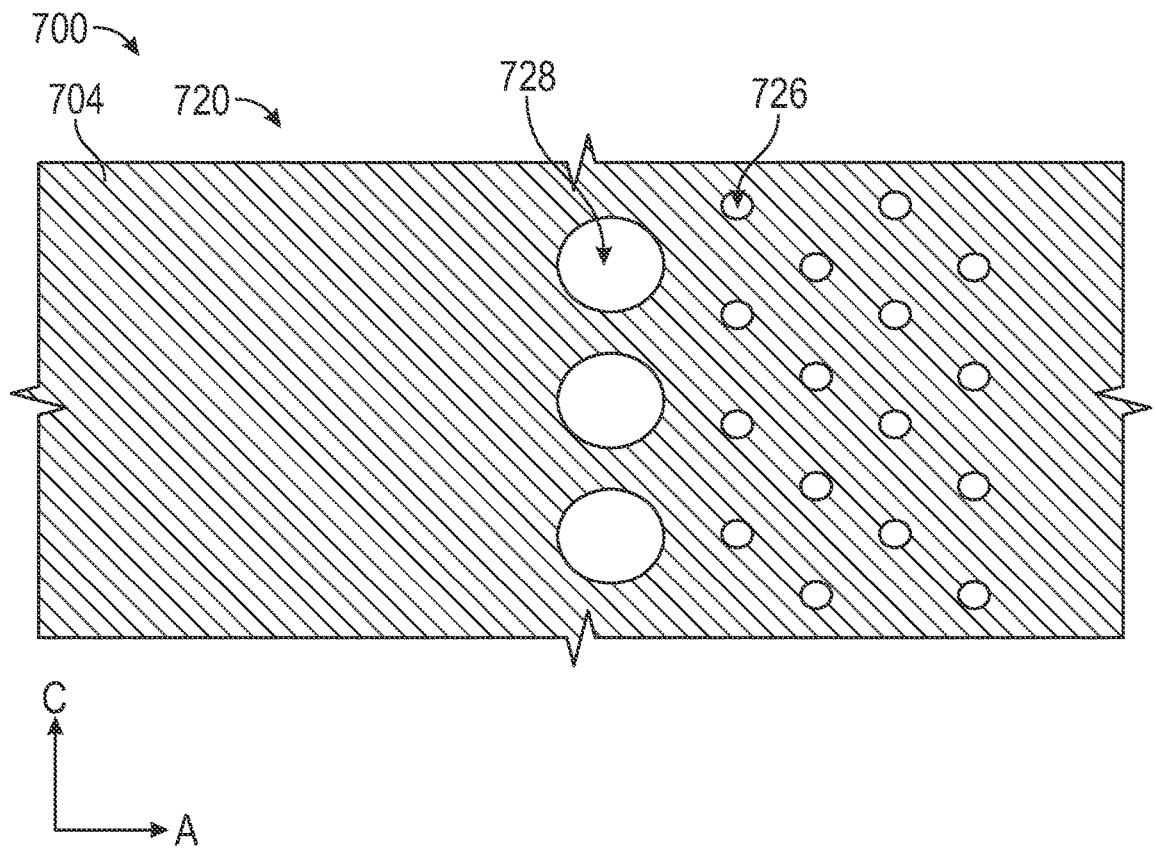
FIG. 8 is a schematic cross-sectional bottom view of the portion of the outer liner of FIG. 7, taken at detail 8-8 in FIG. 7, according to the present disclosure.

FIG. 7 is a schematic cross-sectional diagram of a portion of an outer liner 704 of a combustor 700, taken along a longitudinal centerline axis of the combustor 700, according to another embodiment. FIG. 8 is a schematic cross-sectional bottom view of the portion of the outer liner 704, taken at detail 8-8 in FIG. 7, according to the present disclosure. The combustor 700 is substantially similar to the combustor 200 of FIG. 2. The same reference numerals will be used for components of the combustor 700 that are the same as or similar to the components of the combustor 200 discussed above. The description of these components above also applies to this embodiment, and a detailed description of these components is omitted here. The combustor includes a combustor steam system 720. The combustor steam system 720 includes one or more steam injectors 722, a steam path 724 defined by (e.g., disposed within) the outer liner 704, and one or more steam injection holes 726. As shown in FIG. 7, the steam path 724 extends axially within the outer liner 704. The steam path 724 can be annular about the longitudinal centerline axis similar to the steam path 224 of FIG. 2, or can include one or more discrete steam paths similar to the steam paths 524, 624. The outer liner 704 does not include one or more air dilution holes.

The combustor steam system 720 includes a steam manifold 723 and one or more steam dilution holes 728. The steam manifold 723 is fluidly coupled radially between the one or more steam injectors 722 and the steam path 724. The steam manifold 723 allows a pressure of the steam 69 to be reduced prior to the steam 69 flowing to the steam path 724. The steam manifold 723 is sized and is shaped to provide a substantially uniform distribution of the steam 69 to the one or more steam injection holes 726 and to the one or more steam dilution holes 728. In this way, the steam manifold 723 ensures a controlled and stable feed of the steam 69 to the various locations within the combustor steam system 720 and at a desired pressure. The steam manifold 723 can include a plurality of discrete steam manifolds that are spaced circumferentially about the combustion chamber 202, or can include a single steam manifold that is annular about the combustion chamber 202.

The one or more steam dilution holes 728 are spaced circumferentially about the outer liner 704 and operably direct the steam 69 therethrough into the combustion chamber 202. The one or more steam dilution holes 728 are larger than the one or more steam injection holes 726. In this way, the one or more steam dilution holes 728 operably direct a greater amount of the steam 69 into the combustion chamber 202 than the one or more steam injection holes 726. A size of each of the one or more steam dilution holes 728, a number of the one or more steam dilution holes 728, and the circumferential spacing between respective ones of the one or more steam dilution holes 728 is based on a desired amount of steam flow within the combustion chamber 202. In addition, while FIGS. 7 and 8 depict the one or more steam dilution holes 728 as being generally circular openings, other shapes can be implemented for the openings instead. For example, the one or more steam dilution holes 728 can be oval-shaped slots, or the like.

The one or more steam injection holes 726 are positioned downstream of the one or more steam dilution holes 728. For example, the one or more steam injection holes 726 are positioned axially aft of the one or more steam dilution holes 728. In some embodiments, the one or more steam injection holes 726 are positioned at least 25% of a total length of the combustion chamber 202.

The steam path 724 includes a forward portion 730 that is forward of the one or more steam dilution holes 728 and an aft portion 732 that is aft of the one or more steam dilution holes 728. The outer liner 704 includes one or more forward steam inlet holes 733 and one or more aft steam inlet holes 735. The one or more forward steam inlet holes 733 are positioned forward of the one or more steam dilution holes 728 and provide fluid communication from the steam manifold 723 to the forward portion 730 of the steam path 724. The one or more aft steam inlet holes 735 are positioned aft of the one or more steam dilution holes 728 and provide fluid communication from the steam manifold 723 to the aft portion 733 of the steam path 724.

The combustor 700 and the combustor steam system 720 operate substantially similar to the combustor 200 and the combustor steam system 220 of FIG. 2, respectively. In particular, the combustor steam system 720 operably directs the steam 69 through the one or more steam injectors 722, through the steam manifold 723, and into the steam path 724 to cool the outer liner 704. For example, the steam 69 flows through the one or more forward steam inlet holes 733 and into the forward portion 730 of the steam path 724. The steam 69 also flows through the one or more aft steam inlet holes 735 and into the aft portion 733 of the steam path 724. The one or more forward steam inlet holes 733 and the one or more aft steam inlet holes 735 can be sized to control a pressure drop between the forward portion 730 and the aft portion 733 (e.g., forward of the one or more steam dilution holes 728 and aft of the one or more steam dilution holes 728). In some embodiments, the one or more forward steam inlet holes 733 and the one or more aft steam inlet holes 735 include a substantially equal size such that that there is a single pressure drop forward of the one or more steam dilution holes 728 and aft of the one or more steam dilution holes 728. For example, the pressure drop through the one or more forward steam inlet holes 733 is substantially equal to the pressure drop through the one or more aft steam inlet holes 735. In some embodiments, the one or more forward steam inlet holes 733 are sized differently (e.g., larger or smaller) than the one or more aft steam inlet holes 735 such that the pressure drop forward of the one or more steam dilution holes 728 is different than the pressure drop aft of the one or more steam dilution holes 728 such that there are multiple pressure drops across the one or more steam dilution holes 728.

The one or more steam injection holes 726 operably direct the steam 69 therethrough to generate a first steam injection stream 770 within the combustion chamber 202. The one or more steam dilution holes 728 operably direct the steam 69 therethrough to generate a second steam injection stream 772 and into the combustion chamber 202. The second steam injection stream 772 includes a greater amount of the steam 69 than the first steam injection stream 770. For example, the one or more steam dilution holes 728 and the one or more steam injection holes 726 are sized such that the second steam injection stream includes greater than 50% of the steam 69 that is injected into the combustion chamber 202 and the first steam injection stream includes less than 50% of the steam 69 that is injected into the combustion chamber 202. In some embodiments, the second steam injection stream includes 40% to 100% of the steam 69 and the first steam injection stream includes 0.0% to 60% of the steam 69. The combustion gases 66 from the combustion zone mix with the first steam injection stream 770 and the second steam injection stream 772 to generate a steam-combustion gases mixture 790 that is channeled downstream and out of the combustion chamber 202.

Figure 9:
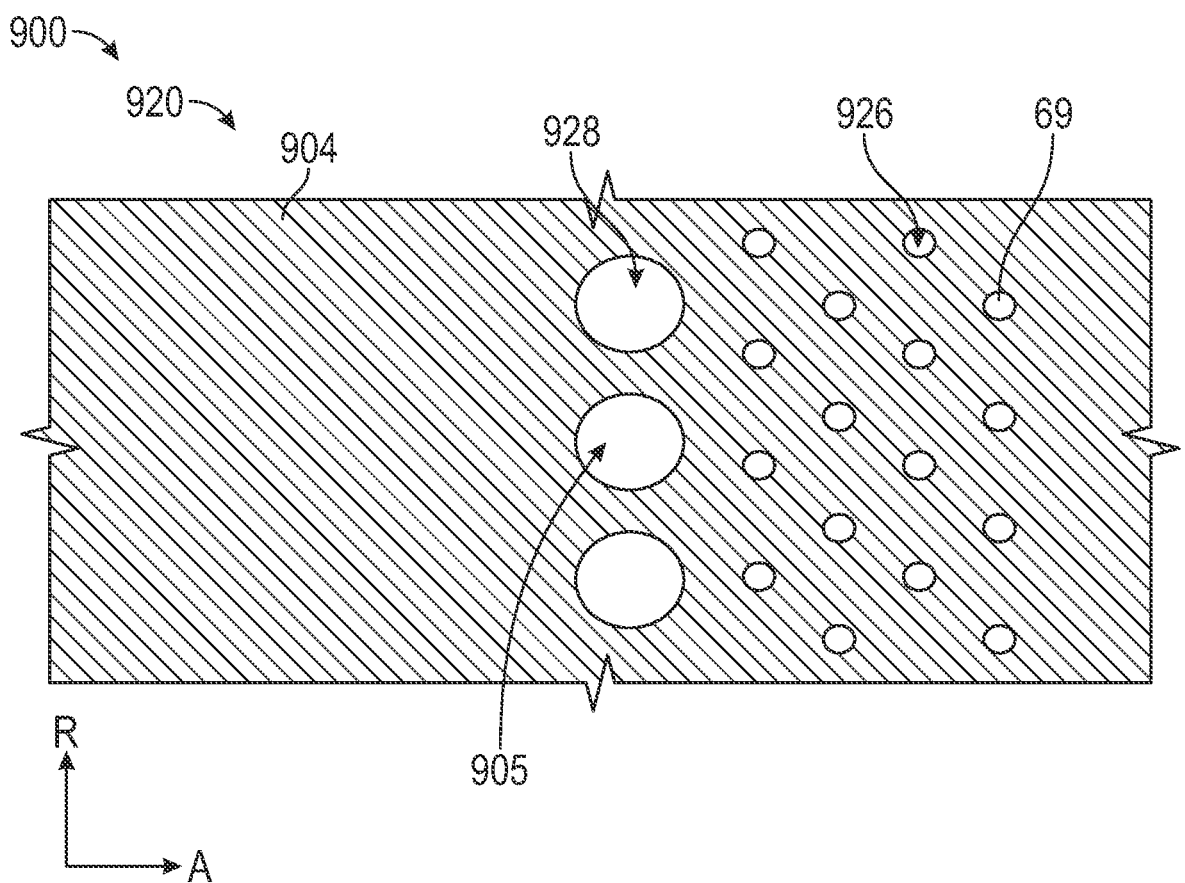
FIG. 9 is a schematic cross-sectional bottom view of a portion of an outer liner of a combustor, according to another embodiment.

FIG. 9 is a schematic cross-sectional bottom view of a portion of an outer liner 904 of a combustor 900, according to another embodiment. The combustor 900 is substantially similar to the combustors 200, 700 of FIGS. 2 and 7, respectively. The same reference numerals will be used for components of the combustor 900 that are the same as or similar to the components of the combustors 200, 700 discussed above. The description of these components above also applies to this embodiment, and a detailed description of these components is omitted here. The combustor 900 includes a combustor steam system 920 that is substantially similar to the combustor steam system 720 of FIG. 7. The combustor steam system 920 includes one or more steam injection holes 926 and one or more steam dilution holes 928. The combustor 900 also includes one or more air dilution holes 905. The one or more steam dilution holes 928 and the one or more air dilution holes 905 are spaced and alternate circumferentially about the outer liner 904.

The combustor 900 and the combustor steam system 920 operate substantially similar to the combustors 200, 700 and the combustor steam systems 220, 720 of FIGS. 2 and 7, respectively. In particular, the one or more air dilution holes 905 operably direct the compressed air 65 (FIG. 2) into the combustion chamber 202 (FIG. 2). The one or more steam injection holes 926 and the one or more steam dilution holes 928 operably direct the steam 69 into the combustion chamber 202, as detailed above with respect to FIG. 7.

Figure 10:
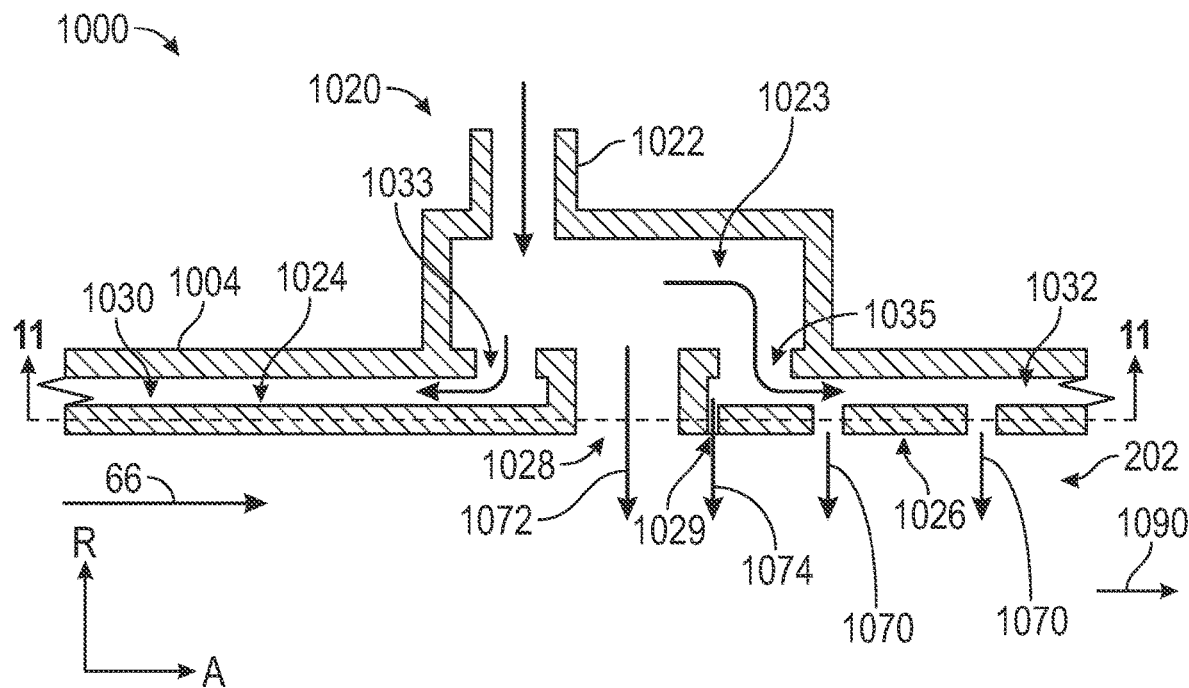
FIG. 10 is a schematic cross-sectional diagram of a portion of an outer liner of a combustor, taken along a longitudinal centerline axis of the combustor, according to another embodiment.
Figure 11:
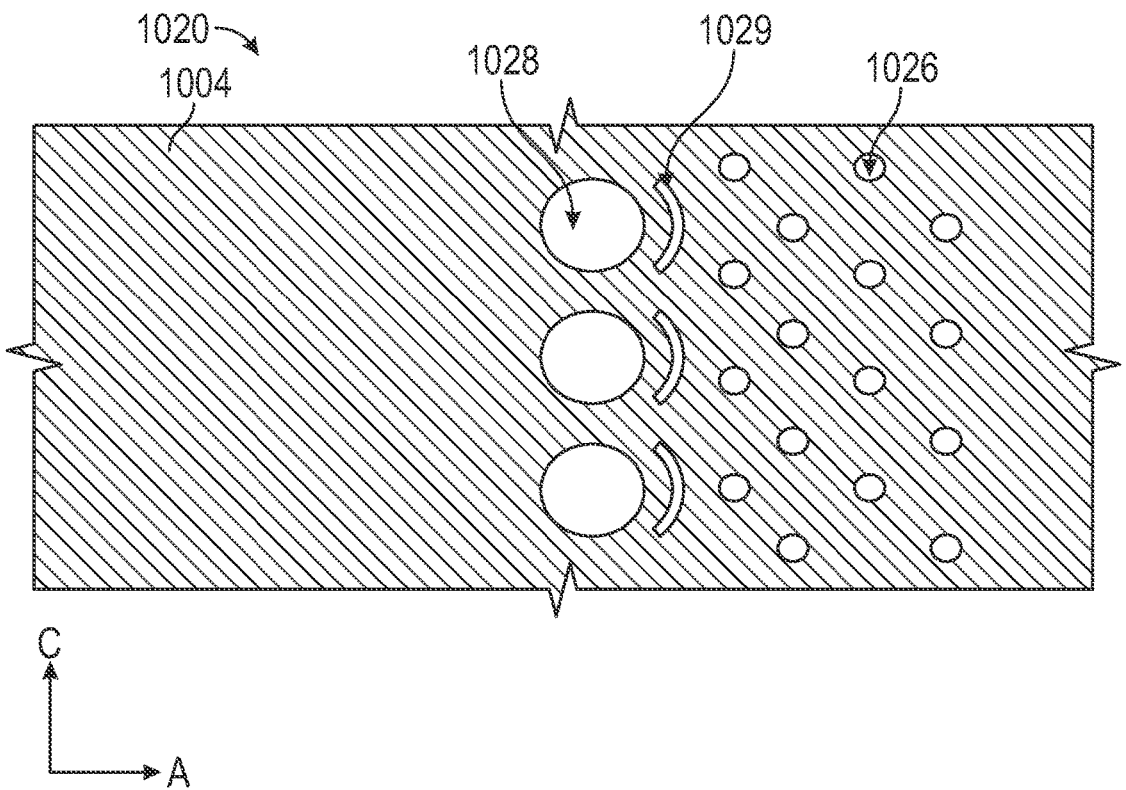
FIG. 11 is a schematic cross-sectional bottom view of the portion of the outer liner of FIG. 10, taken at detail 11-11 in FIG. 10, according to the present disclosure.

FIG. 10 is a schematic cross-sectional diagram of a portion of an outer liner 1004 of a combustor 1000, taken along a longitudinal centerline axis of the combustor 1000, according to another embodiment. FIG. 11 is a schematic cross-sectional bottom view of the portion of the outer liner 1004, taken at detail 11-11 in FIG. 10, according to the present disclosure. The combustor 1000 is substantially similar to the combustors 200, 700 of FIGS. 2 and 7, respectively. The same reference numerals will be used for components of the combustor 1000 that are the same as or similar to the components of the combustors 200, 700 discussed above. The description of these components above also applies to this embodiment, and a detailed description of these components is omitted here. The combustor 1000 includes a combustor steam system 1020. The combustor steam system 1020 includes one or more steam injectors 1022, a steam path 1024 defined by (e.g., disposed within) the outer liner 1004, a steam manifold 1023, one or more steam injection holes 1026, and one or more steam dilution holes 1028.

The combustor steam system 1020 also includes one or more steam slots 1029 positioned axially aft of the one or more steam dilution holes 1028 and axially forward of the one or more steam injection holes 1026. The one or more steam slots 1029 are arc-shaped slots that operably direct the steam 69 therethrough and into the combustion chamber 202. A size of each of the one or more steam slots 1029, a number of the one or more steam slots 1029, and the circumferential spacing between respective ones of the one or more steam slots 1029 is based on a desired amount of steam flow within the combustion chamber 202. In addition, while FIGS. 10 and 11 depict the one or more steam slots 1029 as being generally arc-shaped openings, other shapes can be implemented for the openings instead. For example, the one or more steam slots 1029 can be generally straight slots, or the like.

The steam path 1024 includes a forward portion 1030 that is forward of the one or more steam dilution holes 1028 and an aft portion 1032 that is aft of the one or more steam dilution holes 1028. The outer liner 1004 includes one or more forward steam inlet holes 1033 and one or more aft steam inlet holes 1035. The one or more forward steam inlet holes 1033 are positioned forward of the one or more steam dilution holes 1028 and provide fluid communication from the steam manifold 1023 to the forward portion 1030 of the steam path 1024. The one or more aft steam inlet holes 1035 are positioned aft of the one or more steam dilution holes 1028 and provide fluid communication from the steam manifold 1023 to the aft portion 1033 of the steam path 1024

The combustor 1000 and the combustor steam system 1020 operate substantially similar to the combustors 200, 700 and the combustor steam systems 220, 720 of FIGS. 2 and 7, respectively. In particular, the combustor steam system 1020 operably directs the steam 69 through the one or more steam injectors 1022, through the steam manifold 1023, and into the steam path 1024 to cool the outer liner 1004. For example, the steam 69 flows through the one or more forward steam inlet holes 1033 and into the forward portion 1030 of the steam path 1024. The steam 69 also flows through the one or more aft steam inlet holes 1035 and into the aft portion 1033 of the steam path 1024.

The one or more steam injection holes 1026 operably direct the steam 69 therethrough to generate a first steam injection stream 1070 within the combustion chamber 202. The one or more steam dilution holes 1028 operably direct the steam 69 therethrough to generate a second steam injection stream 1072 and into the combustion chamber 202. The one or more steam slots 1029 operably direct the steam 69 therethrough to generate a third steam injection stream 1074 within the combustion chamber 202. The third steam injection stream 1074 helps to suppress wakes or turbulence generated by the second steam injection stream 1072 through the one or more steam dilution holes 1028. The combustion gases 66 from the combustion zone mix with the first steam injection stream 1070, the second steam injection stream 1072, and the third steam injection stream 1074 to generate a steam-combustion gases mixture 1090 that is channeled downstream and out of the combustion chamber 202.

Figure 12:
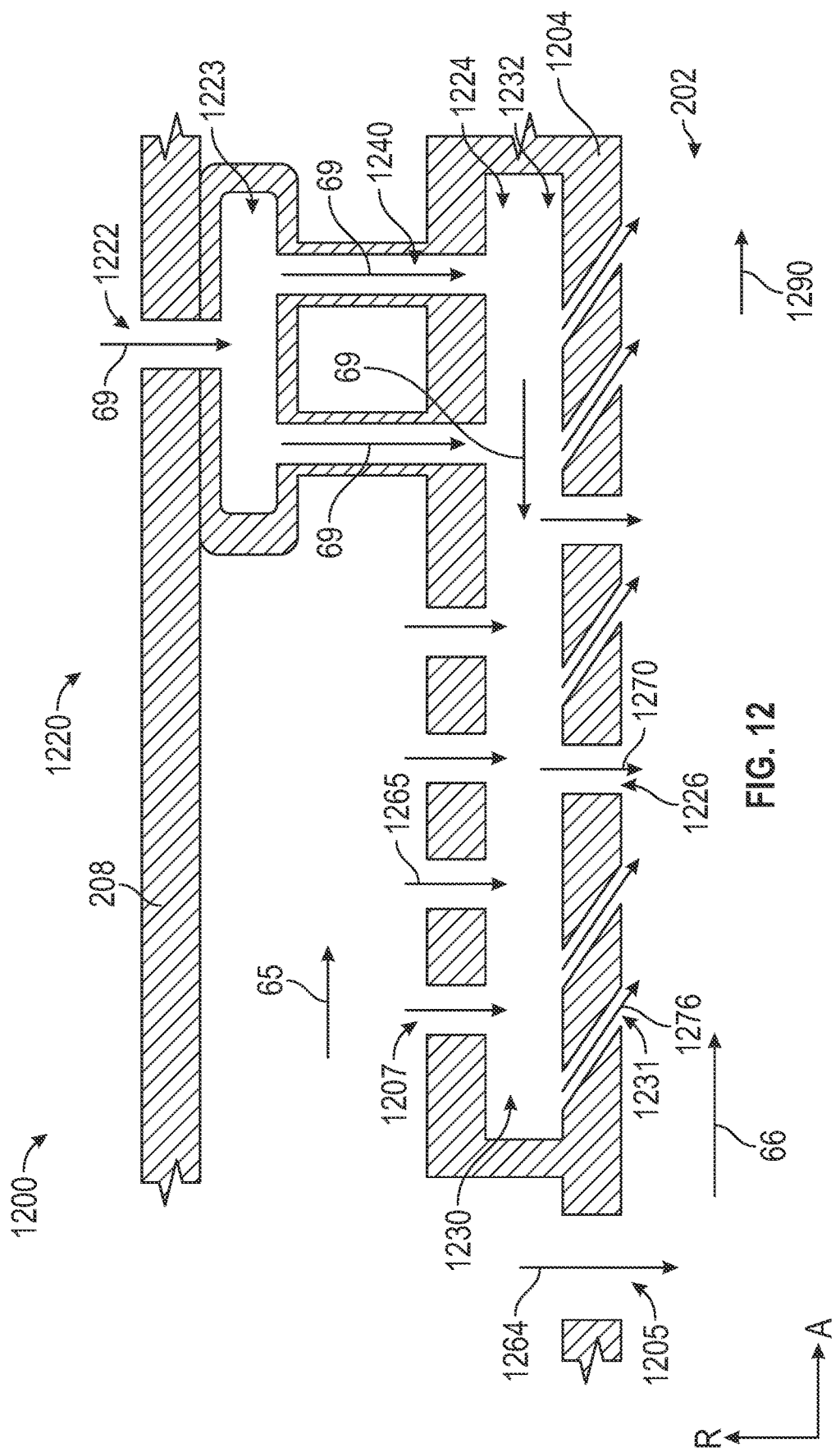
FIG. 12 is a schematic cross-sectional diagram of a portion of an outer liner of a combustor, taken along a longitudinal centerline axis of the combustor, according to another embodiment.

FIG. 12 is a schematic cross-sectional diagram of a portion of an outer liner 1204 of a combustor 1200, taken along a longitudinal centerline axis of the combustor 1200, according to another embodiment. The combustor 1200 is substantially similar to the combustor 200 of FIG. 2, and includes many of the same or similar components as the combustor 200. The same reference numerals will be used for components of the combustor 1200 that are the same as or similar to the components of the combustor 200 discussed above. The description of these components above also applies to this embodiment, and a detailed description of these components is omitted here. The combustor 1200 includes a combustor steam system 1220. The combustor steam system 1220 includes one or more steam injectors 1222, a steam path 1224 defined by (e.g., disposed within) the outer liner 1204, and one or more steam injection holes 1226. As shown in FIG. 12, the steam path 1224 extends axially within the outer liner 1204. The steam path 1224 can be annular about the longitudinal centerline axis similar to the steam path 224 of FIG. 2, or can include one or more discrete steam paths similar to the steam paths 524, 624 of FIGS. 5 and 6, respectively. The steam path 1224 includes aa forward portion 1230 and an aft portion 1232.

The outer liner 1204 includes one or more air dilution holes 1205 and one or more air impingement holes 1207. The one or more air dilution holes 1205 operably direct the compressed air 65 into the combustion chamber 202. The one or more air impingement holes 1207 operably direct the compressed air 65 into the steam path 1224, as detailed further below. The one or more air impingement holes 1207 are disposed through a radially outer portion of the outer liner 1204 to operably direct the compressed air 65 into the steam path 1224. In some embodiments, the outer liner 1204 does not include the one or more air impingement holes 1207.

The combustor steam system 1220 includes a steam manifold 1223 fluidly coupled with the one or more steam injectors 1222 downstream of the one or more steam injectors 1222. The combustor steam system 1220 also includes one or more steam injector lines 1240 fluidly coupled with the steam manifold 1223 downstream of the steam manifold 1223. The one or more steam injector lines 1240 are fluidly coupled to the steam path 1224 for operably directing the steam 69 from the steam manifold 1223 to the steam path 1224. For example, the one or more steam injector lines 1240 are disposed at the aft portion 1232 of the steam path 1224. The steam path 1224 is disposed within the outer liner 1204 axially aftward of the one or more air dilution holes 1205. The one or more air impingement holes 1207 are disposed axially forward of the one or more steam injector lines 1240 such that the one or more air impingement holes 1207 are disposed at the forward portion 1230 of the steam path 1224.

The combustor steam system 1220 includes one or more steam cooling holes 1231 disposed through the outer liner 1204 that provide fluid communication from the steam path 1224 and the combustion chamber 202. The one or more steam cooling holes 1231 are angled axially aftward with respect to the longitudinal centerline axis of the combustor 1200 such that the steam 69 flows through the one or more steam cooling holes 1231 axially aftward to provide film cooling on the outer liner 1204. In this way, the one or more steam cooling holes 1231 direct the steam 69 axially along the outer liner 1204 to film cool the outer liner 1204. In some embodiments, the one or more steam cooling holes 1231 are angled axially forward such that the steam 69 flows through the one or more steam cooling holes 1231 axially forward into the combustion chamber 202. In some embodiments, the one or more steam cooling holes 1231 includes one or more steam cooling holes 1231 that are angled axially aft and one or more steam cooling holes 1231 that are angled axially forward.

The one or more steam cooling holes 1231 are spaced circumferentially about the outer liner 1204 and are spaced axially on the outer liner 1204. The one or more steam cooling holes 1231 include one or more steam cooling holes 1231 disposed axially forward of the one or more steam injection holes 1226. The one or more steam cooling holes 1231 also include one or more steam cooling holes 1231 disposed axially aft of the one or more steam injection holes 1226. A size of each of the one or more steam cooling holes 1231, a number of the one or more steam cooling holes 1231, and the circumferential spacing between respective ones of the one or more steam cooling holes 1231 is based on a desired amount of steam flow to film cool the outer liner 1204. In addition, while FIG. 12 depicts the one or more steam cooling holes 1231 as being generally circular openings, other shapes can be implemented for the openings instead. For example, the one or more steam cooling holes 1231 can be oval-shaped slots, or the like.

The combustor 1200 and the combustor steam system 1220 operate substantially similar to the combustor 200 and the combustor steam system 220 of FIG. 2, respectively. In particular, the combustor 1200 operably directs the compressed air 65 through the one or more air dilution holes 1205 into the combustion chamber 202 to generate a second compressed air stream 1264 within the combustion chamber 202. The combustor 1200 operably directs the compressed air 65 through the one or more air impingement holes 1207 into the steam path 1224 to generate an impingement air flow 1265 in the steam path 1224. The impingement air flow 1265 helps to cool the steam 69 within the steam path 1224 as the steam 69 within the steam path 1224 absorbs heat of the outer liner 1204 to cool the outer liner 1204.

The combustor steam system 1220 operably directs the steam 69 through the one or more steam injectors 1222, through the steam manifold 1223, through the one or more steam injector lines 1240, and into the steam path 1224 to cool the outer liner 1204. The steam path 1224 operably directs the steam 69 axially forward such that the steam 69 flows within the steam path 1224 in a direction opposite to the combustion gases 66 within the combustion chamber 202. For example, the steam 69 flows from the aft portion 1232 to the forward portion 1230. The one or more steam injection holes 1226 operably direct the steam 69 therethrough to generate a steam injection stream 1270 within the combustion chamber 202. The one or more steam cooling holes 1231 operably direct the steam 69 therethrough to generate a steam cooling stream 1276 and into the combustion chamber 202 to film cool the outer liner 1204. The combustion gases 66 from the combustion zone mix with the steam injection stream 1270 and the steam cooling stream 1276 to generate a steam-combustion gases mixture 1290 that is channeled downstream and out of the combustion chamber 202.

Figure 13:
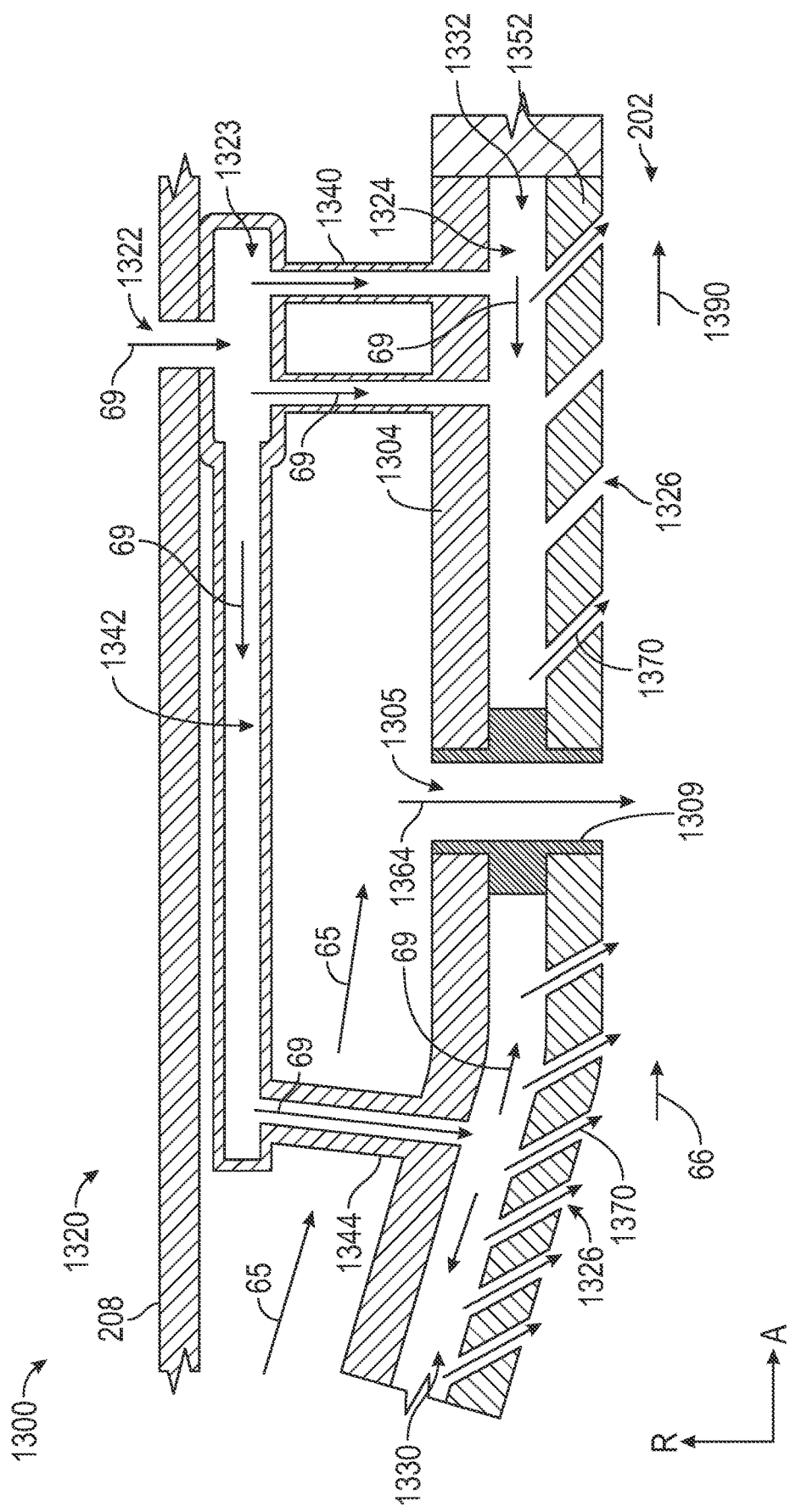
FIG. 13 is a schematic cross-sectional diagram of a portion of an outer liner of a combustor, taken along a longitudinal centerline axis of the combustor, according to another embodiment.

FIG. 13 is a schematic cross-sectional diagram of a portion of an outer liner 1304 of a combustor 1300, taken along a longitudinal centerline axis of the combustor 1300, according to another embodiment. The combustor 1300 is substantially similar to the combustor 200 of FIG. 2, and includes many of the same or similar components as the combustor 200. The combustor 1300 includes one or more air dilution holes 1305 that operably direct the compressed air 65 therethrough. The combustor 1300 includes a heat shield 1352 coupled to the outer liner 1304 for protecting the outer liner 1304 from the hot combustion gases 66. The heat shield 1352 is coupled to the outer liner 1304 by one or more fasteners (not shown in the view of FIG. 13), such as, for example, bolts, or the like.

The combustor 1300 includes a combustor steam system 1320. The combustor steam system 1320 includes one or more steam injectors 1322, a steam path 1324, and one or more steam injection holes 1326. The steam path 1324 is defined by the outer liner 1304 and the heat shield 1352. For example, the steam path 1324 extends axially between the outer liner 1304 and the heat shield 1352. The steam path 1324 can be annular about the longitudinal centerline axis similar to the steam path 224 of FIG. 2, or can include one or more discrete steam paths similar to the steam paths 524, 624 of FIGS. 5 and 6, respectively. The steam path 1324 includes a forward portion 1330 and an aft portion 1332. The forward portion 1330 is axially forward of the one or more air dilution holes 1305, and the aft portion 1332 is axially aft of the one or more air dilution holes 1305. The forward portion 1330 is fluidly separate from the aft portion 1332 such that the steam 69 is prevented from flowing from the aft portion 1332 to the forward portion 1330.

The one or more air dilution holes 1305 include a dilution hole insert 1309 disposed within the one or more air dilution holes 1305. The dilution hole insert 1309 prevents the compressed air 65 from flowing into the steam path 1324 and prevents, or minimizes, the steam 69 from flowing from the steam path 1324 through the one or more air dilution holes 1305.

The combustor steam system 1320 includes a steam manifold 1323 fluidly coupled with the one or more steam injectors 1322 downstream of the one or more steam injectors 1322. The combustor steam system 1320 also includes one or more first steam injector lines 1340 fluidly coupled with the steam manifold 1323 downstream of the steam manifold 1323. The one or more first steam injector lines 1340 are fluidly coupled with the aft portion 1332 of the steam path 1324 for operably directing the steam 69 from the steam manifold 1323 to the steam path 1324. The combustor steam system 1320 includes one or more steam manifold lines 1342 and one or more second steam injector lines 1344. The one or more steam manifold lines 1342 are fluidly coupled with the steam manifold 1323 and the one or more second steam injector lines 1344 for operably directing the steam 69 from the steam manifold 1323 axially forward to the one or more second steam injector lines 1344. The one or more second steam injector lines 1344 are fluidly coupled with the forward portion 1330 of the steam path 1324 for operably directing the steam 69 from the one or more steam manifold lines 1342 to the forward portion 1330 of the steam path 1324.

The combustor steam system 1320 includes one or more steam injection holes 1326 disposed through the heat shield 1352 that provide fluid communication from the steam path 1324 to the combustion chamber 202. The one or more steam injection holes 1326 are angled with respect to the longitudinal centerline axis of the combustor 1300 to provide film cooling on the heat shield 1352. The one or more steam injection holes 1326 are spaced circumferentially about the heat shield 1352 and are spaced axially on the heat shield 1352. The one or more steam injection holes 1326 are disposed at the forward portion 1330 and at the aft portion 1332 of the steam path 1324.

The combustor 1300 and the combustor steam system 1320 operate substantially similar to the combustor 200 and the combustor steam system 220 of FIG. 2, respectively. In particular, the combustor 1300 operably directs the compressed air 65 through the one or more air dilution holes 1305 into the combustion chamber 202 to generate a second compressed air stream 1364 within the combustion chamber 202.

The combustor steam system 1320 operably directs the steam 69 through the one or more steam injectors 1322, through the steam manifold 1323, through the one or more first steam injector lines 1340, and into the aft portion 1332 of the steam path 1324 to cool the outer liner 1304 and the heat shield 1352 at the aft portion 1332. The steam path 1324 operably directs the steam 69 axially forward such that the steam 69 flows within the steam path 1324 in a direction opposite to the combustion gases 66 within the combustion chamber 202. The steam manifold 1323 operably directs the steam 69 through the one or more steam manifold lines 1342, through the one or more second steam injector lines 1344 and into the forward portion 1330 of the steam path 1324 to cool the outer liner 1304 and the heat shield 1352 at the forward portion 1330.

The one or more steam injection holes 1326 operably direct the steam 69 therethrough to generate a steam injection stream 1370 within the combustion chamber 202 at the forward portion 1330 and at the aft portion 1332 of the steam path 1324. The steam injection stream 1370 from the aft portion 1332 includes a greater amount of the steam 69 than the steam injection stream 1370 from the forward portion 1330. For example, the steam 69 injected from the aft portion 1332 includes 50% to 80% of the steam 69 from the steam path 1324 and the steam 69 injected from the forward portion 1330 includes 20% to 50% of the steam 69 from the steam path 1324. The combustion gases 66 from the combustion zone mix with the steam injection stream 1370 to generate a steam-combustion gases mixture 1390 that is channeled downstream and out of the combustion chamber 202.

Figure 14:
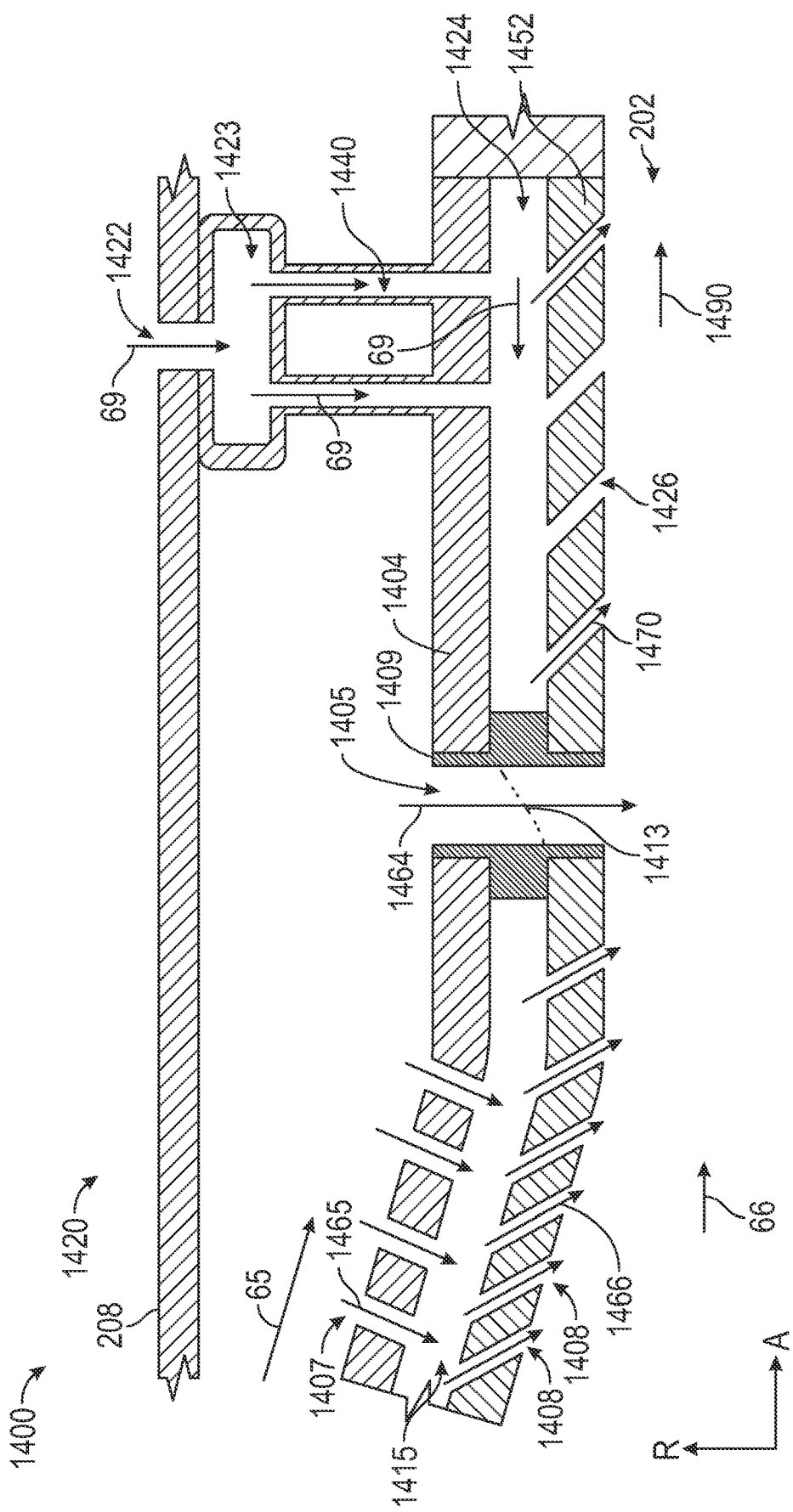
FIG. 14 is a schematic cross-sectional diagram of a portion of an outer liner of a combustor, taken along a longitudinal centerline axis of the combustor, according to another embodiment.

FIG. 14 is a schematic cross-sectional diagram of a portion of an outer liner 1404 of a combustor 1400, taken along a longitudinal centerline axis of the combustor 1400, according to another embodiment. The combustor 1400 is substantially similar to the combustor 200 of FIG. 2, and includes many of the same or similar components as the combustor 200. The same reference numerals will be used for components of the combustor 1400 that are the same as or similar to the components of the combustor 200 discussed above. The description of these components above also applies to this embodiment, and a detailed description of these components is omitted here. The combustor 1400 includes one or more air dilution holes 1405 that operably direct the compressed air 65 therethrough. The combustor 1400 includes a heat shield 1452 coupled to the outer liner 1404 for protecting the outer liner 1404 from the hot combustion gases 66. The one or more air dilution holes 1405 include a dilution hole insert 1409 disposed within the one or more air dilution holes 1405. The one or more air dilution holes 1405 also include a dilution hole support 1413 that extends axially through the one or more air dilution holes 1405 to absorb thermal expansion between the heat shield 1452 and the outer liner 1404. In this way, the dilution hole support 1413 helps to prevent the one or more air dilution holes 1405 from closing due to thermal expansion of the outer liner 1404 or of the heat shield 1452. The dilution hole support 1413 also helps to prevent, or to minimize, mixing of the steam 69 from a steam path 1424 and the compressed air 65 from an air path 1415 of the combustor 1400.

The air path 1415 is defined by the outer liner 1404 and the heat shield 1452. For example, the air path 1415 is defined between the outer liner 1404 and the heat shield 1452 axially forward of the one or more air dilution holes 1405. The combustor 1400 includes one or more air impingement holes 1407 disposed through the outer liner 1404 and in fluid communication with the air path 1415. The one or more air impingement holes 1407 are disposed axially forward of the one or more air dilution holes 1405. The combustor 1400 includes one or more air injection holes 1408 disposed through the heat shield 1452 for providing fluid communication between the air path 1415 and the combustion chamber 202 upstream of the one or more air dilution holes 1405. The one or more air injection holes 1408 are angled axially aftward with respect to the longitudinal centerline axis of the combustor 1400 such that the compressed air 65 flows through the one or more air injection holes 1408 axially aftward to provide air film cooling on the heat shield 1452. In this way, one or more air injection holes 1408 direct the compressed air 65 axially along the heat shield 1452 to film cool the heat shield 1452. In some embodiments, the one or more air injection holes 1408 are angled axially forward such that the compressed air 65 flows through the one or more air injection holes 1408 axially forward into the combustion chamber 202. In some embodiments, the one or more air injection holes 1408 includes one or more air injection holes 1408 that are angled axially aft and one or more air injection holes 1408 that are angled axially forward.

The combustor 1400 includes a combustor steam system 1420. The combustor steam system 1420 includes one or more steam injectors 1422, the steam path 1424 disposed between the outer liner 1404 and the heat shield 1452, and one or more steam injection holes 1426. As shown in FIG. 14, the steam path 1424 extends axially between the outer liner 1404 and the heat shield 1452. The steam path 1424 can be annular about the longitudinal centerline axis similar to the steam path 224 of FIG. 2, or can include one or more discrete steam paths similar to the steam paths 524, 624 of FIGS. 5 and 6, respectively. The steam path 1424 is disposed axially aft of the one or more air dilution holes 1405. The steam path 1424 is fluidly separate from the air path 1415 such that the steam 69 is prevented from flowing from the steam path 1424 to the air path 1415.

The combustor steam system 1420 includes a steam manifold 1423 and one or more steam injector lines 1440. The one or more steam injector lines 1440 are fluidly coupled with the steam path 1424 for operably directing the steam 69 from the steam manifold 1423 to the steam path 1424. The combustor steam system 1420 includes one or more steam injection holes 1426 disposed through the heat shield 1452 that provide fluid communication from the steam path 1424 to the combustion chamber 202 axially aft of the one or more air dilution holes 1405. The one or more steam injection holes 1426 are angled axially aftward with respect to the longitudinal centerline axis of the combustor 1400 to provide steam film cooling on the heat shield 1452. In some embodiments, the one or more steam injection holes 1426 are angled axially forward or include one or more steam injection holes 1426 that are angled axially aftward and one or more steam injection holes 1426 that are angled axially forward.

The combustor 1400 and the combustor steam system 1420 operate substantially similar to the combustor 200 and the combustor steam system 220 of FIG. 2, respectively. In particular, the combustor 1400 operably directs the compressed air 65 through the one or more air dilution holes 1405 into the combustion chamber 202 to generate a second compressed air stream 1464 within the combustion chamber 202. The combustor 1400 operably directs the compressed air 65 through the one or more air impingement holes 1407 into the air path 1415 to generate an impingement air flow 1465 within the air path 1415. The one or more air injection holes 1408 operably direct the compressed air 65 (e.g., the impingement air flow 1465) from the air path 1415 into the combustion chamber 202 to generate an air injection stream 1466 to cool the heat shield 1452 by film cooling.

The combustor steam system 1420 operably directs the steam 69 through the one or more steam injectors 1422, through the steam manifold 1423, through the one or more steam injector lines 1440, and into the steam path 1424 to cool the outer liner 1404 and the heat shield 1452 axially aft of the one or more air dilution holes 1405. The steam path 1424 operably directs the steam 69 axially forward such that the steam 69 flows within the steam path 1424 in a direction opposite to the combustion gases 66 within the combustion chamber 202. The one or more steam injection holes 1426 operably direct the steam 69 therethrough to generate a steam injection stream 1470 within the combustion chamber 202 downstream of the one or more air dilution holes 1405. The combustion gases 66 from the combustion zone mix with the second compressed air stream 1464, the air injection stream 1466, and the steam injection stream 1470 to generate an air-steam-combustion gases mixture 1490 that is channeled downstream and out of the combustion chamber 202.

Figure 15:
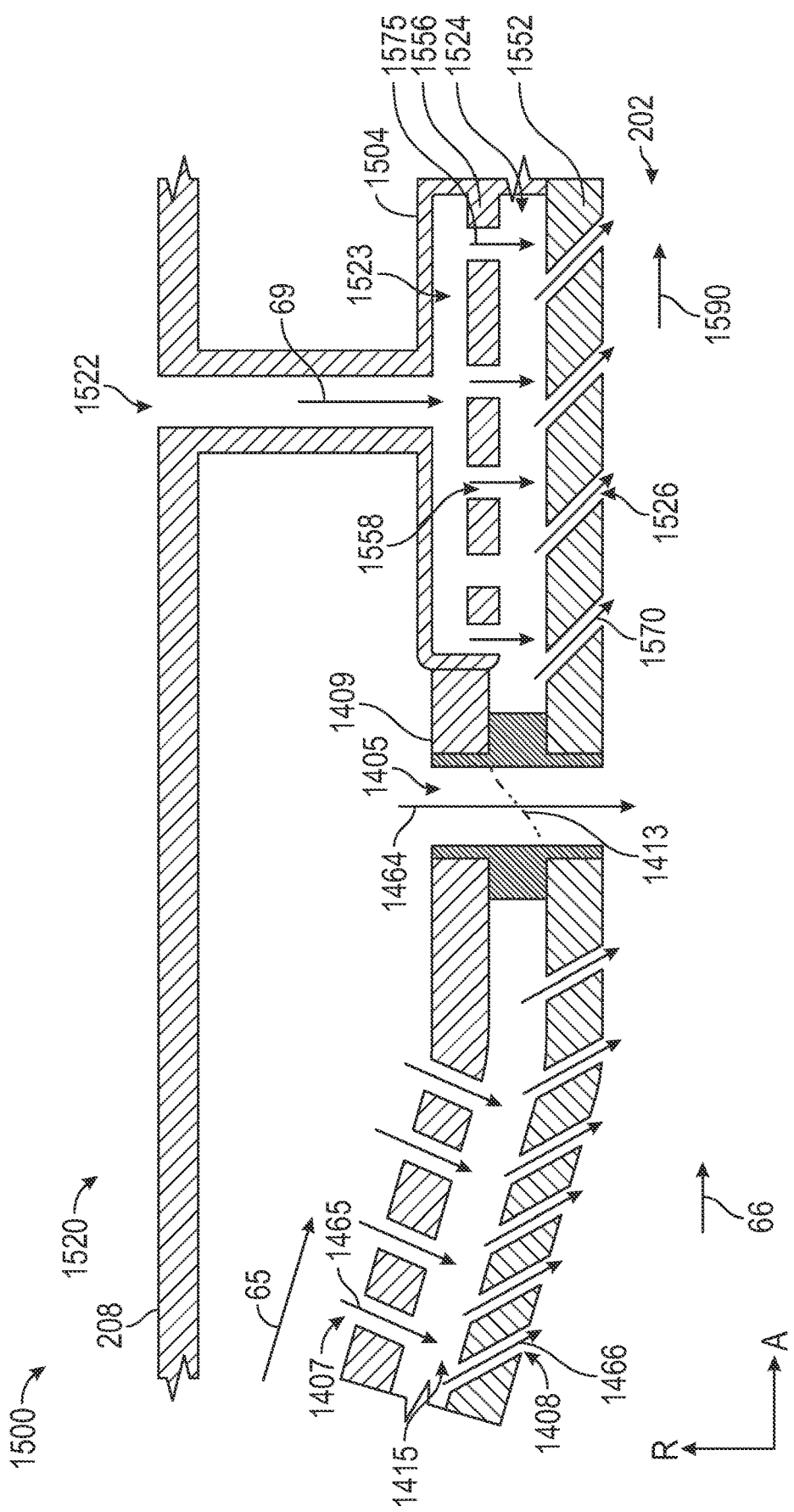
FIG. 15 is a schematic cross-sectional diagram of a portion of an outer liner of a combustor, taken along a longitudinal centerline axis of the combustor, according to another embodiment.

FIG. 15 is a schematic cross-sectional diagram of a portion of an outer liner 1504 of a combustor 1500, taken along a longitudinal centerline axis of the combustor 1500, according to another embodiment. The combustor 1500 is substantially similar to the combustors 200, 1400 of FIGS. 2 and 14, respectively, and includes many of the same or similar components as the combustors 200, 1400. The same reference numerals will be used for components of the combustor 1500 that are the same as or similar to the components of the combustors 200, 1400 discussed above. The description of these components above also applies to this embodiment, and a detailed description of these components is omitted here. The combustor 1500 includes a heat shield 1552 coupled to the outer liner 1504 for protecting the outer liner 1504 from the hot combustion gases 66.

The combustor 1500 includes a combustor steam system 1520. The combustor steam system 1520 includes one or more steam injectors 1522, a steam path 1524 defined by (e.g., disposed between) the outer liner 1504 and the heat shield 1552, and one or more steam injection holes 1526. As shown in FIG. 15, the steam path 1524 extends axially between the outer liner 1504 and the heat shield 1552. The steam path 1524 can be annular about the longitudinal centerline axis similar to the steam path 224 of FIG. 2, or can include one or more discrete steam paths similar to the steam paths 524, 624 of FIGS. 5 and 6, respectively. The steam path 1524 is disposed axially aft of the one or more air dilution holes 1405. The steam path 1524 is fluidly separate from the air path 1415 such that the steam 69 is prevented from flowing from the steam path 1524 to the air path 1415.

The combustor steam system 1520 includes a steam manifold 1523. The steam manifold 1523 includes a steam manifold wall 1556 disposed radially between the steam manifold 1523 and the steam path 1524. The steam manifold wall 1556 includes one or more steam impingement holes 1558 disposed therethrough that operably direct the steam 69 from the steam manifold 1523 to the steam path 1524, as detailed further below.

The combustor 1500 and the combustor steam system 1520 operate substantially similar to the combustors 200, 1400 and the combustor steam systems 220, 1420 of FIGS. 2 and 14, respectively. In particular, the combustor steam system 1520 operably directs the steam 69 through the one or more steam injectors 1522, through the steam manifold 1523, and through the one or more steam impingement holes 1558 to generate a steam impingement stream 1575 within the steam path 1524. In this way, the steam impingement stream 1575 impinges on the heat shield 1552 within the steam path 1524 to cool the heat shield 1552. The one or more steam injection holes 1526 operably direct the steam 69 therethrough to generate a steam injection stream 1570 within the combustion chamber 202 downstream of the one or more air dilution holes 1405. The combustion gases 66 from the combustion zone mix with the air injection stream 1466 and the steam injection stream 1570 to generate an air-steam-combustion gases mixture 1590 that is channeled downstream and out of the combustion chamber 202.

Figure 16:
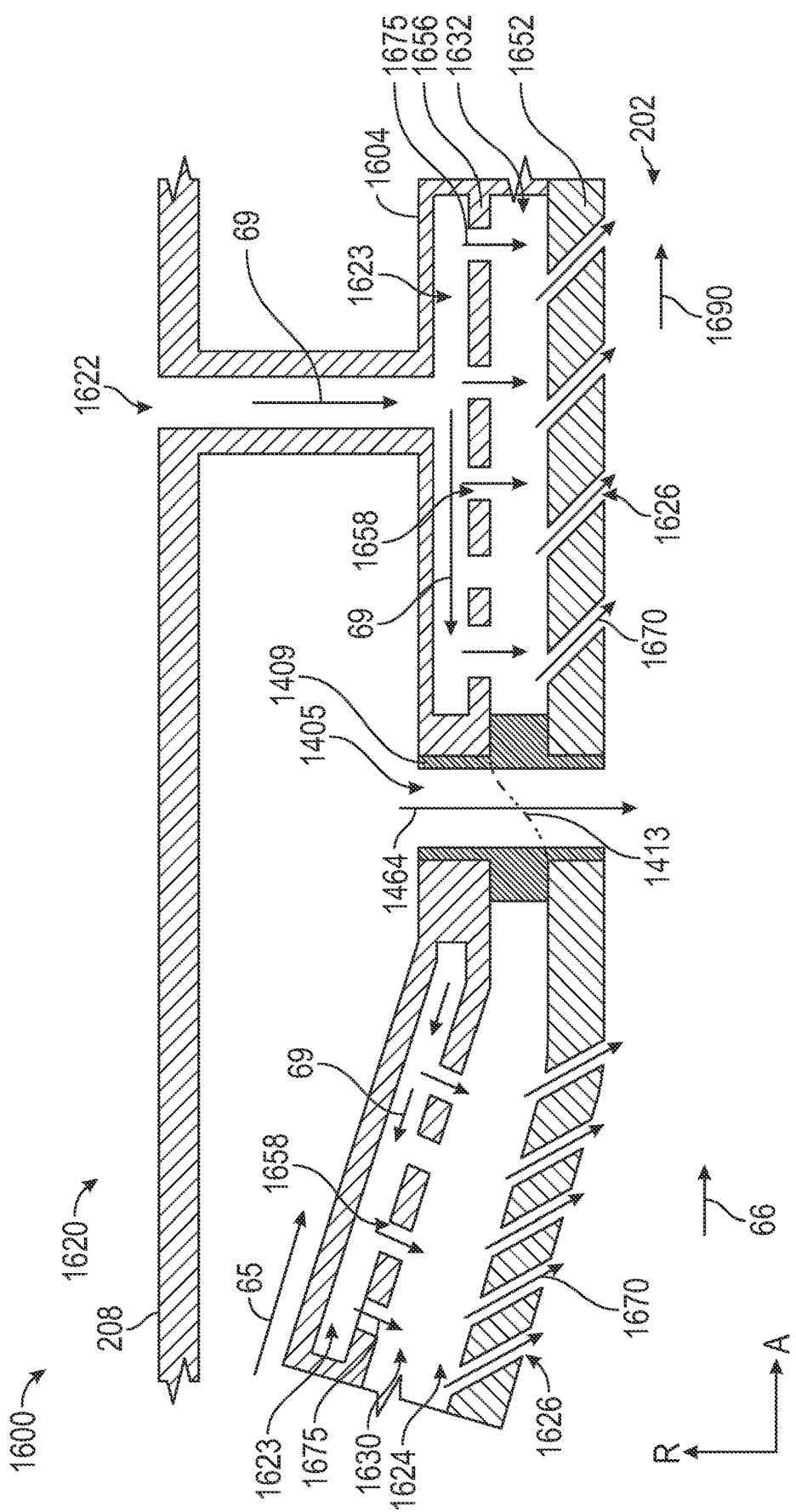
FIG. 16 is a schematic cross-sectional diagram of a portion of an outer liner of a combustor, taken along a longitudinal centerline axis of the combustor, according to another embodiment.

FIG. 16 is a schematic cross-sectional diagram of a portion of an outer liner 1604 of a combustor 1600, taken along a longitudinal centerline axis of the combustor 1600, according to another embodiment. The combustor 1600 is substantially similar to the combustors 200, 1400, 1500 of FIGS. 2, 14, and 15, respectively, and includes many of the same or similar components as the combustors 200, 1400, 1500. The same reference numerals will be used for components of the combustor 1600 that are the same as or similar to the components of the combustors 200, 1400, 1500 discussed above. The description of these components above also applies to this embodiment, and a detailed description of these components is omitted here. The combustor 1600 includes a heat shield 1652 coupled to the outer liner 1604 for protecting the outer liner 1604 from the hot combustion gases 66. The combustor 1600, however, does not include an air path similar to the air path 1415 of FIG. 14.

The combustor 1600 includes a combustor steam system 1620. The combustor steam system 1620 includes one or more steam injectors 1622, a steam path 1624 defined by (e.g., disposed between) the outer liner 1604 and the heat shield 1652, and one or more steam injection holes 1626. As shown in FIG. 16 the steam path 1624 extends axially between the outer liner 1604 and the heat shield 1652. The steam path 1624 can be annular about the longitudinal centerline axis similar to the steam path 224 of FIG. 2, or can include one or more discrete steam paths similar to the steam paths 524, 624 of FIGS. 5 and 6, respectively. The steam path 1624 includes a forward portion 1630 axially forward of the one or more air dilution holes 1405, and an aft portion 1632 axially aft of the one or more air dilution holes 1405. The aft portion 1632 is fluidly coupled with the forward portion 1630 such that the steam 69 flows from the aft portion 1632 to the forward portion 1630, as detailed further below. The combustor steam system 1620 includes a steam manifold 1623 that extends in the forward portion 1630 and the aft portion 1632. The steam manifold 1623 includes a steam manifold wall 1656 disposed radially between the steam manifold 1623 and the steam path 1624. The steam manifold wall 1656 includes one or more steam impingement holes 1658 disposed therethrough that operably direct the steam 69 from the steam manifold 1623 to the forward portion 1630 and the aft portion 1632 of the steam path 1624, as detailed further below.

The combustor 1600 and the combustor steam system 1620 operate substantially similar to the combustors 200, 1400, 1500 and the combustor steam systems 220, 1420, 1520 of FIGS. 2, 14, and 15, respectively. In particular, the combustor steam system 1620 operably directs the steam 69 through the one or more steam injectors 1622, through the steam manifold 1623, and through the one or more steam impingement holes 1658 to generate a steam impingement stream 1675 within the aft portion 1632 of the steam path 1624. The steam manifold 1623 operably directs the steam 69 from the aft portion 1632 to the forward portion 1630. For example, although not shown in the view of FIG. 16, the forward portion 1630 and the aft portion 1632 are fluidly coupled around the one or more air dilution holes 1405 such that the steam 69 flows around the one or more air dilution holes 1405 from the aft portion 1632 to the forward portion 1630. The steam 69 then flows through the one or more steam impingement holes 1658 to generate the steam impingement stream 1675 within the forward portion 1630 of the steam path 1624. In this way, the steam impingement stream 1675 impinges on the heat shield 1652 within the steam path 1624 to cool the heat shield 1652. The one or more steam injection holes 1626 operably direct the steam 69 therethrough to generate a steam injection stream 1670 from the forward portion 1630 and the aft portion 1632 within the combustion chamber 202 upstream and downstream of the one or more air dilution holes 1405. The steam injection stream 1670 from the aft portion 1632 includes a greater amount of the steam 69 than the steam injection stream 1670 from the forward portion 1630. For example, the steam 69 injected from the aft portion 1632 includes 50% to 80% of the steam 69 from the steam path 1624 and the steam 69 injected from the forward portion 1630 includes 20% to 50% of the steam 69 from the steam path 1624. The combustion gases 66 from the combustion zone mix with the steam injection stream 1670 to generate an air-steam-combustion gases mixture 1690 that is channeled downstream and out of the combustion chamber 202.

Figure 17:
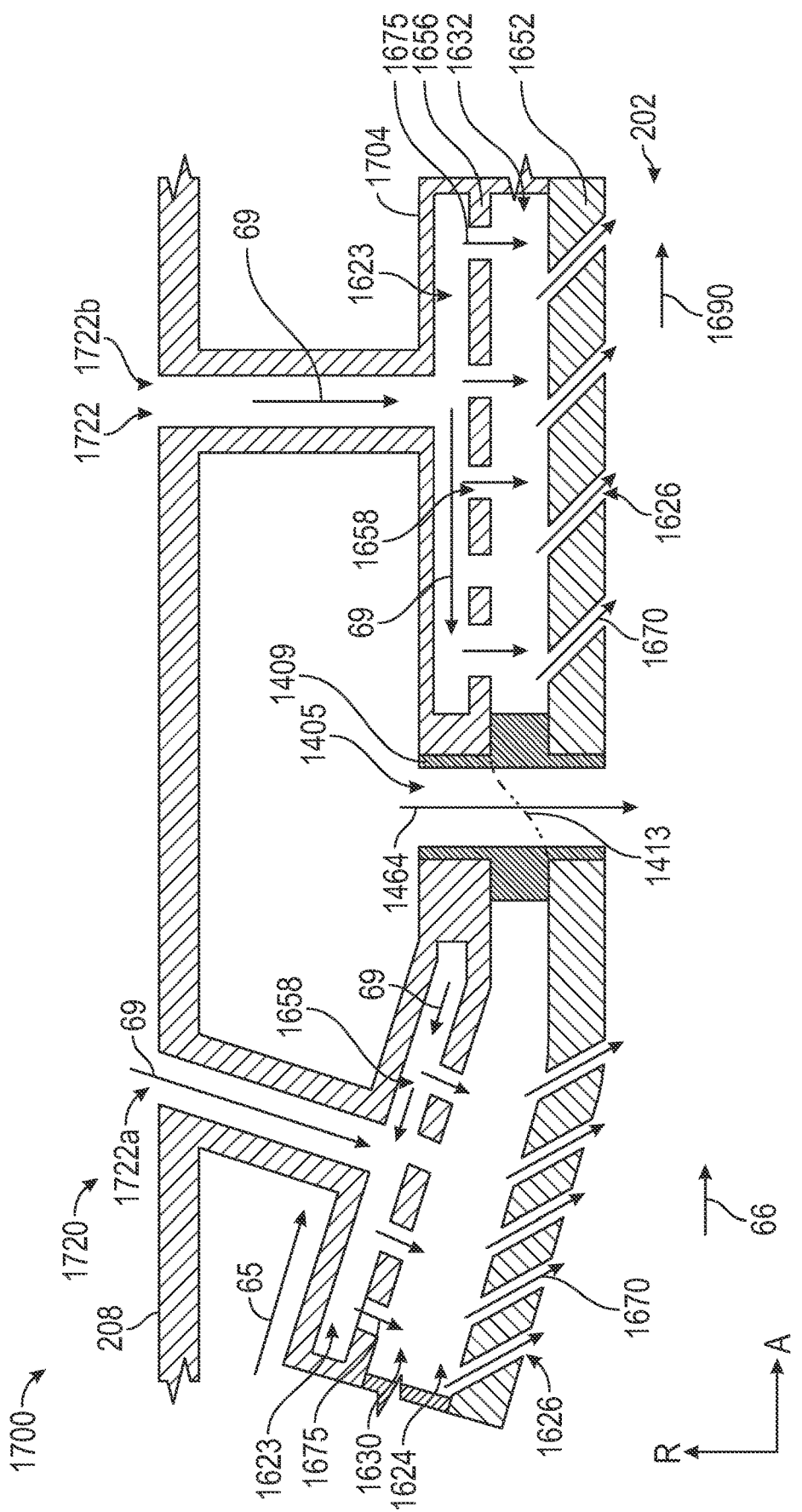
FIG. 17 is a schematic cross-sectional diagram of a portion of an outer liner of a combustor, taken along a longitudinal centerline axis of the combustor, according to another embodiment.

FIG. 17 is a schematic cross-sectional diagram of a portion of an outer liner 1704 of a combustor 1700, taken along a longitudinal centerline axis of the combustor 1700, according to another embodiment. The combustor 1700 is substantially similar to the combustors 200, 1600 of FIGS. 2 and 16, respectively, and includes many of the same or similar components as the combustors 200, 1600. The same reference numerals will be used for components of the combustor 1700 that are the same as or similar to the components of the combustors 200, 1600 discussed above. The description of these components above also applies to this embodiment, and a detailed description of these components is omitted here.

The combustor 1700 includes a combustor steam system 1720. The combustor steam system 1720 is substantially similar to the combustor steam system 1620 of FIG. 16. The combustor steam system 1720 includes one or more steam injectors 1722 including a first steam injector 1722a and a second steam injector 1722b disposed at the outer liner 1704. The first steam injector 1722a is in fluid communication with the forward portion 1630. The second steam injector 1722b is in fluid communication with the aft portion 1632. The combustor 1700 and the combustor steam system 1720 operate substantially similar to the combustor 1600 and the combustor steam system 1620, respectively. In particular, the combustor steam system 1720 operably directs the steam 69 through the first steam injector 1722a and into the forward portion 1630. The combustor steam system 1720 operably directs the steam 69 through the second steam injector 1722b and into the aft portion 1632.

Figure 18:
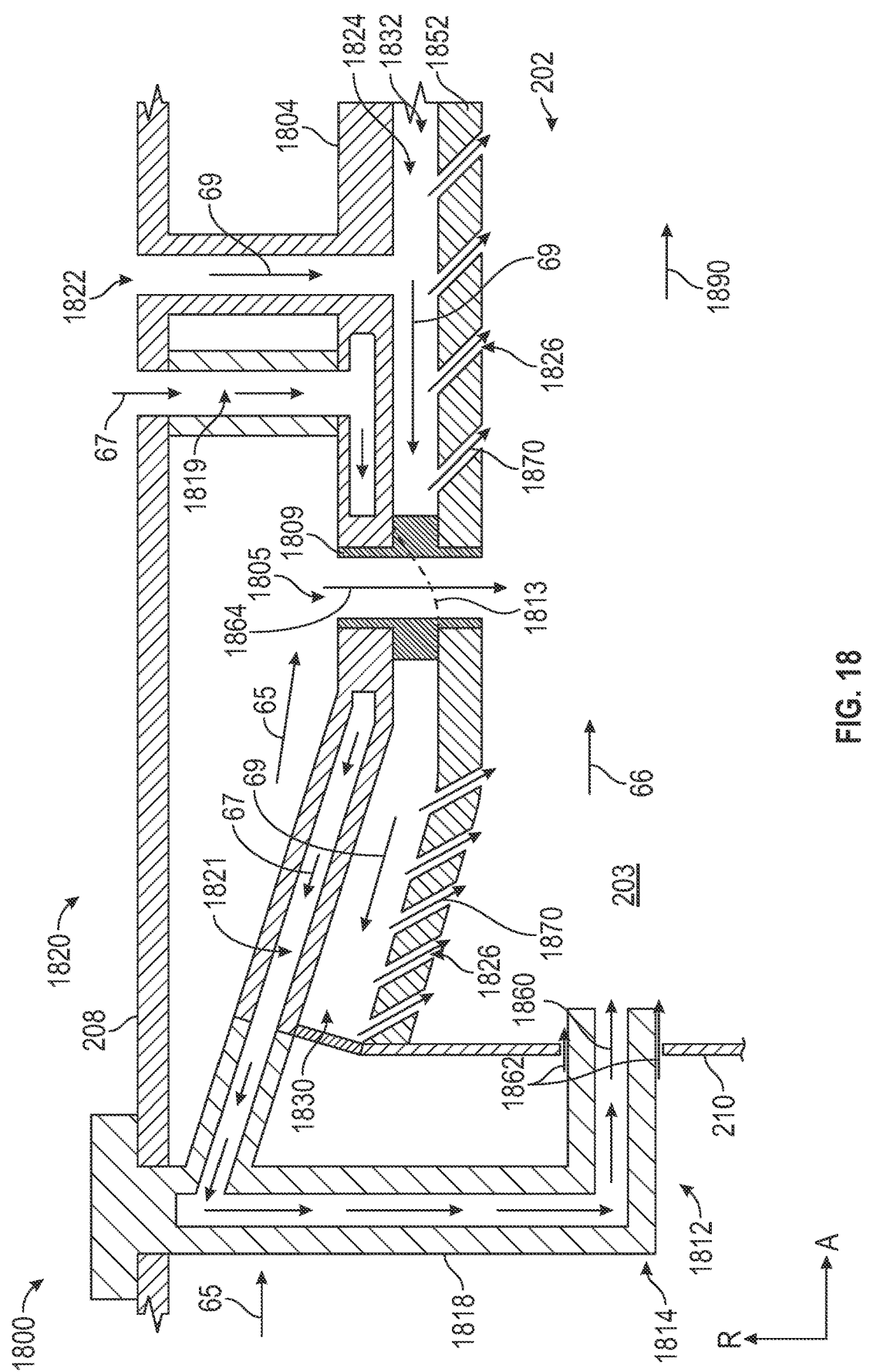
FIG. 18 is a schematic cross-sectional diagram of a portion of an outer liner of a combustor, taken along a longitudinal centerline axis of the combustor, according to another embodiment.

FIG. 18 is a schematic cross-sectional diagram of a portion of an outer liner 1804 of a combustor 1800, taken along a longitudinal centerline axis of the combustor 1800, according to another embodiment. The combustor 1800 is substantially similar to the combustor 200 of FIG. 2, and includes many of the same or similar components as the combustor 200. The same reference numerals will be used for components of the combustor 1800 that are the same as or similar to the components of the combustor 200 discussed above. The description of these components above also applies to this embodiment, and a detailed description of these components is omitted here. The combustor 1800 includes one or more air dilution holes 1805 that operably direct the compressed air 65 therethrough. The one or more air dilution holes 1805 include a dilution hole insert 1809 and a dilution hole support 1813. The combustor 1800 includes a heat shield 1852 coupled to the outer liner 1804 for protecting the outer liner 1804 from the hot combustion gases 66.

The combustor 1800 includes a plurality of mixing assemblies 1812 including a mixer 1814 and a fuel injector 1818 disposed through the annular dome 210. The fuel injector 1818 includes a fuel supply line 1819 and a fuel path 1821. The fuel supply line 1819 is positioned axially aft of the one or more air dilution holes 1805 and extends radially to the outer liner 1804. The fuel path 1821 is disposed within the outer liner 1804 and is in fluid communication with the fuel supply line 1819 and the fuel injector 1818. The fuel path 1821 extends substantially axially from the fuel supply line 1819 to the fuel injector 1818 through the outer liner 1804. For example, although not shown in the view of FIG. 18, the fuel path 1821 is fluidly coupled around the one or more air dilution holes 1805 such that the fuel 67 flows around the one or more air dilution holes 1805 within the fuel path 1821.

The combustor 1800 includes a combustor steam system 1820. The combustor steam system 1820 includes one or more steam injectors 1822, a steam path 1824 defined by (e.g., disposed between) the outer liner 1804 and the heat shield 1852, and one or more steam injection holes 1826. As shown in FIG. 18, the steam path 1824 extends axially between the outer liner 1804 and the heat shield 1852. The steam path 1824 can be annular about the longitudinal centerline axis similar to the steam path 224 of FIG. 2, or can include one or more discrete steam paths similar to the steam paths 524, 624 of FIGS. 5 and 6, respectively. The steam path 1824 includes a forward portion 1830 and an aft portion 1832. The forward portion 1830 is fluidly coupled with the aft portion 1832 such that the steam 69 flows from the aft portion 1832 to the forward portion 1830. For example, although not shown in the view of FIG. 18, the forward portion 1830 and the aft portion 1832 of the steam path 1824 are fluidly coupled around the one or more air dilution holes 1805 such that the steam 69 flows around the one or more air dilution holes 1805 from the aft portion 1832 to the forward portion 1830. The combustor steam system 1820 includes one or more steam injection holes 1826 disposed through the heat shield 1852 that provide fluid communication from the steam path 1824 to the combustion chamber 202. The one or more steam injection holes 1826 are angled with respect to the longitudinal centerline axis of the combustor 1800 to provide film cooling on the heat shield 1852.

The combustor 1800 and the combustor steam system 1820 operate substantially similar to the combustor 200 and the combustor steam system 220 of FIG. 2, respectively. In particular, the combustor 1800 operably directs the compressed air 65 through the annular dome 210 to generate a first compressed air stream 1862 within the combustion zone 203 of the combustion chamber 202. The combustor 1800 operably directs the compressed air 65 through the one or more air dilution holes 1805 into the combustion chamber 202 to generate a second compressed air stream 1864 within the combustion chamber 202. The fuel supply line 1819 operably directs the fuel 67 into the fuel path 1821, and then into the fuel injector 1818. The fuel 67 flows axially forward within the fuel path 1821 in a direction opposite to the combustion gases 66 within the combustion chamber 202. The fuel injector 1818 operably injects the fuel 67 to generate a fuel stream 1860 within the combustion zone 203 of the combustion chamber 202.

The combustor steam system 1820 operably directs the steam 69 through the one or more steam injectors 1822 and into the steam path 1824 to cool the outer liner 1804 and the heat shield 1852 at the aft portion 1832. The steam path 1824 operably directs the steam 69 axially forward such that the steam 69 flows within the steam path 1824 in a direction opposite to the combustion gases 66 within the combustion chamber 202. The steam path 1824 operably directs the steam 69 from the aft portion 1832 to the forward portion 1830. As the steam 69 flows from the aft portion 1832 to the forward portion 1830, the steam 69 absorbs heat in the outer liner 1804 to cool the outer liner 1804. At the same time, the fuel 67 in the fuel path 1821 absorbs heat from the steam 69 in the steam path 1824 such that a temperature of the fuel 67 increases as the fuel 67 flows through the fuel path 1821. Increasing the temperature of the fuel 67 allows for more efficient combustion within the combustion zone 203 as compared to combustors without the benefit of the present disclosure.

The one or more steam injection holes 1826 operably direct the steam 69 therethrough to generate a steam injection stream 1870 within the combustion chamber 202 at the forward portion 1830 and at the aft portion 1832 of the steam path 1824. The steam injection stream 1870 from the aft portion 1832 includes a greater amount of the steam 69 than the steam injection stream 1870 from the forward portion 1830. For example, the steam 69 injected from the aft portion 1832 includes 50% to 80% of the steam 69 from the steam path 1824 and the steam 69 injected from the forward portion 1830 includes 20% to 50% of the steam 69 from the steam path 1824. The combustion gases 66 from the combustion zone mix with the steam injection stream 1870 to generate a steam-combustion gases mixture 1890 that is channeled downstream and out of the combustion chamber 202.

Figure 20:
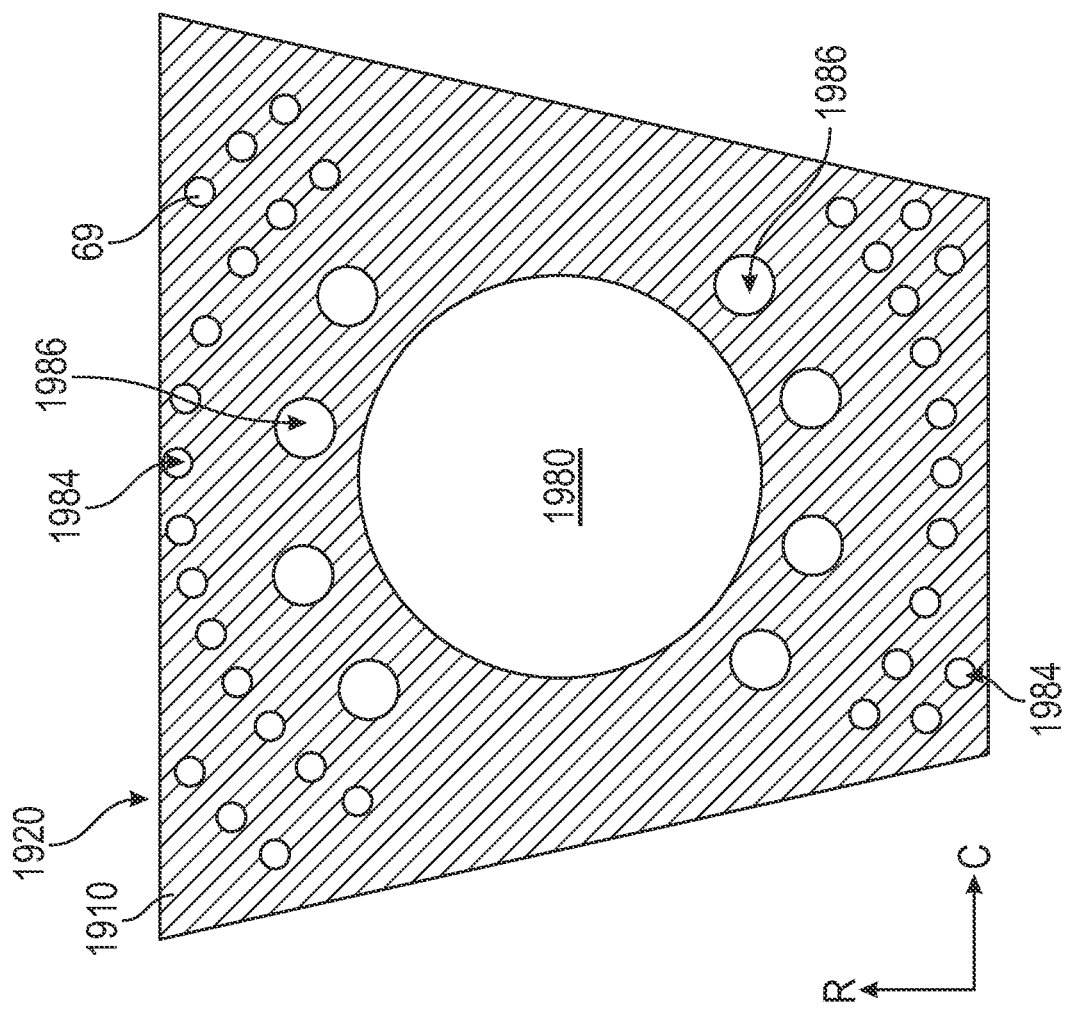
FIG. 20 is a schematic cross-sectional aft view of the portion of the annular dome of FIG. 19, according to the present disclosure.
Figure 19:
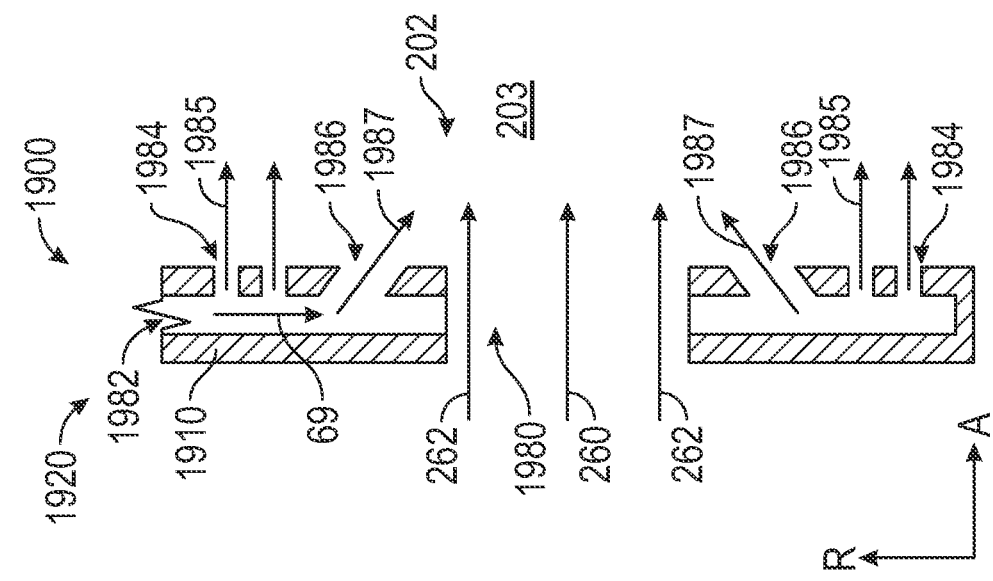
FIG. 19 is a schematic cross-sectional diagram of a portion of an annular dome of a combustor, taken along a longitudinal centerline axis of the combustor, according to another embodiment.

FIG. 19 is a schematic cross-sectional diagram of a portion of an annular dome 1910 of a combustor 1900, taken along a longitudinal centerline axis of the combustor 1900, according to another embodiment. FIG. 20 is a schematic cross-sectional aft view of the portion of the annular dome 1910 of FIG. 19, according to the present disclosure. The combustor 1900 is substantially similar to the combustor 200 of FIG. 2, and includes many of the same or similar components as the combustor 200. The same reference numerals will be used for components of the combustor 1900 that are the same as or similar to the components of the combustor 200 discussed above. The description of these components above also applies to this embodiment, and a detailed description of these components is omitted here. The annular dome 1910 includes one or more mixing assembly holes 1980 that receive a respective mixing assembly (e.g., the plurality of mixing assemblies 212). The combustor 1900 includes a combustor steam system 1920. The combustor steam system 1920 includes a steam path 1982 defined by (e.g., disposed within) the annular dome 1910. For example, the steam path 1982 extends substantially radially within the annular dome 1910.

The combustor steam system 1920 includes one or more steam injection holes 1984 and one or more flame shaping holes 1986 disposed through the annular dome 1910. The one or more steam injection holes 1984 and the one or more flame shaping holes 1986 provide fluid communication from the steam path 1982 to the combustion chamber 202. The one or more steam injection holes 1984 are positioned substantially at a radially outer periphery or a radially inner periphery of the annular dome 1910 and extend substantially axially through the annular dome 1910. In some embodiments, the one or more steam injection holes 1984 are angled with respect to the axial direction A to provide film cooling on the annular dome 1910. In this way, the one or more steam injection holes 1984 can be steam cooling holes. The one or more flame shaping holes 1986 are positioned radially between the one or more mixing assembly holes 1980 and the one or more steam injection holes 1984. The one or more flame shaping holes 1986 are angled toward the one or more mixing assembly holes 1980.

The combustor 1900 and the combustor steam system 1920 operate substantially similar to the combustor 1900 and the combustor steam system 1920, respectively. In particular, the combustor steam system 1920 operably directs the steam 69 within the steam path 1982 to cool the annular dome 1910. The one or more steam injection holes 1984 operably inject the steam 69 from the steam path 1982 and into the combustion chamber 202 to generate a steam injection stream 1985 in an area of the combustion zone 203 of the combustion chamber 202. The one or more flame shaping holes 1986 operably direct the steam 69 into the combustion chamber 202 to generate a steam flame shaping stream 1987 within the combustion zone 203 of the combustion chamber 202. The steam flame shaping stream 1987 is angled toward the flame generated in the combustion zone 203 such that the steam flame shaping stream 1987 keeps the flame within a radial center of the portion of the annular dome 1910. In this way, the steam flame shaping stream 1987 prevents the flame from undesirably expanding radially beyond the steam flame shaping stream 1987.

Figure 21:
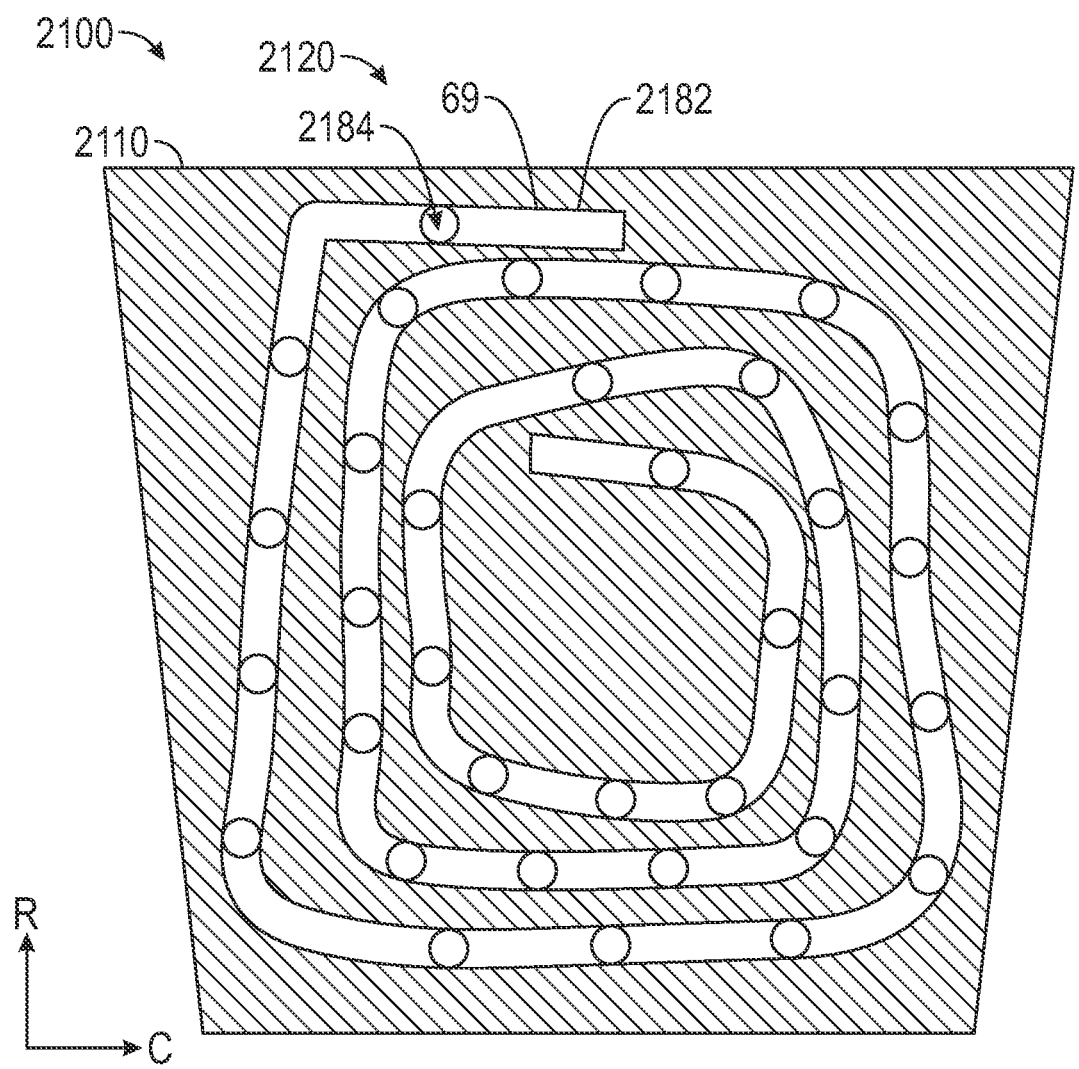
FIG. 21 is a schematic aft view of a portion of an annular dome of a combustor, according to the present disclosure.

FIG. 21 is a schematic cross-sectional aft view of a portion of an annular dome 2110 of a combustor 2100, according to the present disclosure. The combustor 2100 is substantially similar to the combustors 200, 1900 of FIGS. 2 and 19, respectively, and includes many of the same or similar components as the combustors 200, 1900. The combustor 2100 includes a combustor steam system 2120 including a steam path 2182 defined by (e.g., within) the annular dome 2110 and one or more steam injection holes 2184. The steam path 2182 has a discrete flowpath within the annular dome 2110. In particular, the steam path 2182 defines a generally swirl shape about the annular dome 2110 for cooling particular areas of the annular dome 2110. The one or more steam injection holes 2184 are spaced along the steam path 2182. The combustor steam system 2120 operates substantially similar to the combustor steam systems 220, 1920 of FIGS. 2 and 19, respectively. In particular, the steam path 2182 operably directs the steam 69 about the steam path 2182 to cool the annular dome 2110. The one or more steam injection holes 2184 operably direct the steam 69 therethrough and into the combustion chamber.

Figure 22:
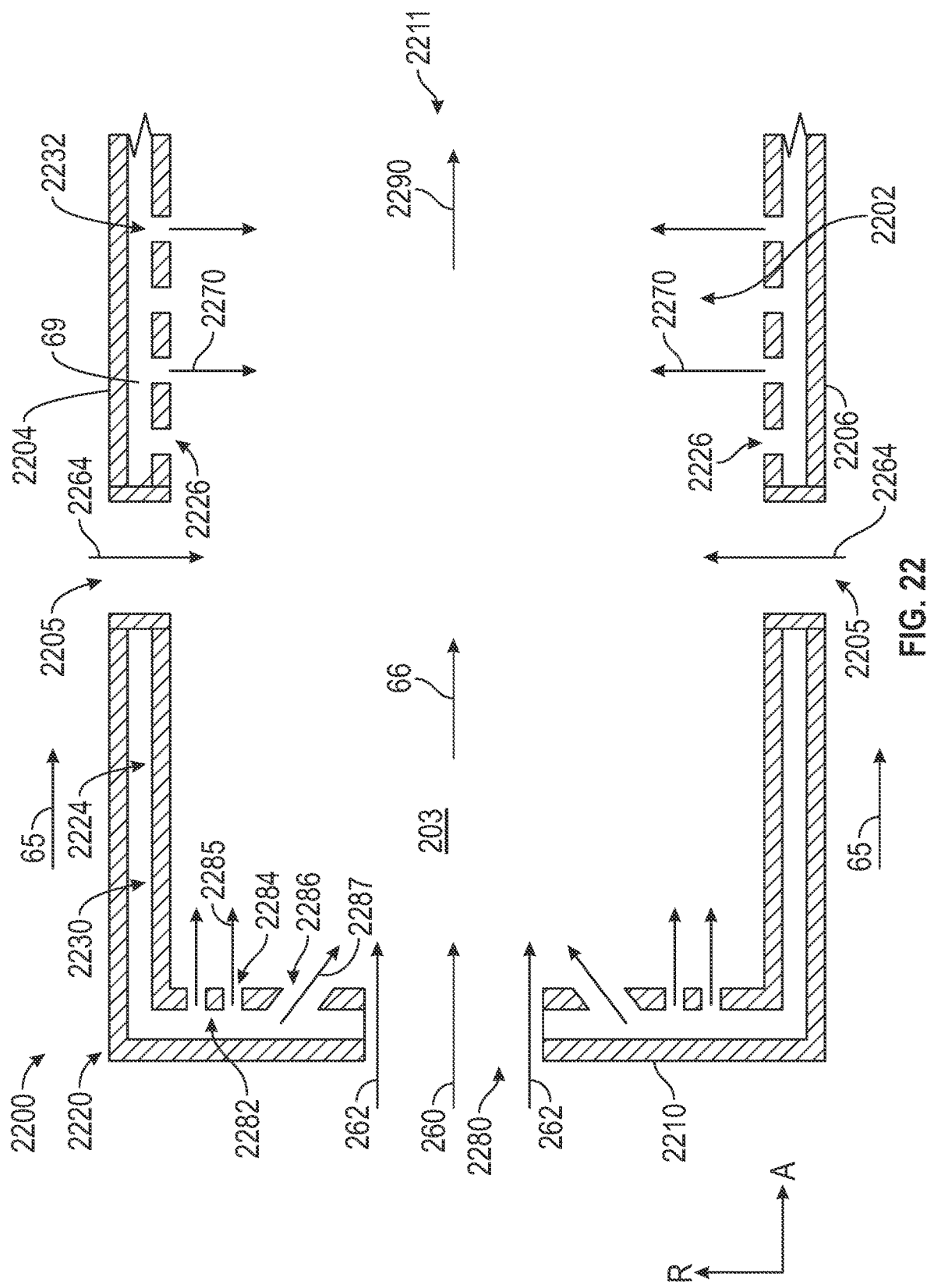
FIG. 22 is a schematic cross-sectional view of a combustor, taken along a longitudinal centerline axis of the combustor, according to another embodiment.

FIG. 22 is a schematic cross-sectional view of a combustor 2200, taken along a longitudinal centerline axis of the combustor 2200, according to another embodiment. The combustor 2200 is substantially similar to the combustor 200 of FIG. 2, and includes many of the same or similar components as the combustor 200. The same reference numerals will be used for components of the combustor 2200 that are the same as or similar to the components of the combustor 200 discussed above. The description of these components above also applies to this embodiment, and a detailed description of these components is omitted here. The combustor 2200 includes a combustion chamber 2202 defined by an outer liner 2204, an inner liner 2206, and an annular dome 2210. The combustion chamber 2202 extends to a combustion chamber outlet 2211. The annular dome 2210 includes one or more mixing assembly holes 2280 for receiving a respective mixing assembly (e.g., a respective mixing assembly 212 of FIG. 2). The outer liner 2204, the inner liner 2206, and the annular dome 2210 form a single, unitary component. The combustor 2200 includes one or more air dilution holes 2205 defined through at least one of the outer liner 2204 or the inner liner 2206.

The combustor 2200 includes a combustor steam system 2220. The combustor steam system 2220 includes a steam path 2224, 2282 defined by (e.g., within) at least one of the outer liner 2204, the inner liner 2206, or the annular dome 2210. The steam path 2224, 2282 includes a liner steam path 2224 defined by (e.g., disposed within) the outer liner 2204 and the inner liner 2206, and a dome steam path 2282 defined by (e.g., within) the annular dome 2210. The liner steam path 2224 and the dome steam path 2282 can be any of the steam paths detailed herein, respectively. The liner steam path 2224 is fluidly coupled with the dome steam path 2282. The liner steam path 2224 includes a forward portion 2230 and an aft portion 2232. The combustor steam system 2220 includes one or more steam injection holes 2226, 2284 defined through at least one of the outer liner 2204, the inner liner 2206, or the annular dome 2210. The one or more steam injection holes 2226, 2284 include one or more liner steam injection holes 2226 and one or more dome steam injection holes 2284. The one or more liner steam injection holes 2226 are positioned axially aft the one or more air dilution holes 2205. The one or more dome steam injection holes 2284 are disposed through the annular dome 2210. The combustor steam system 2220 also includes one or more flame shaping holes 2286 disposed through the annular dome 2210.

The combustor 2200 and the combustor steam system 2220 operate substantially similar to the combustor 200 and the combustor steam system 220 of FIG. 2, respectively. In particular, the combustor 2200 operably directs the compressed air 65 through the one or more air dilution holes 2205 to generate a second compressed air stream 2264 within the combustion chamber 2202. The liner steam path 2224 operably directs the steam 69 about the outer liner 2204 and the inner liner 2206 to cool the outer liner 2204 and the inner liner 2206. The liner steam path 2224 operably directs the steam 69 to the dome steam path 2282, and the dome steam path 2282 operably directs the steam 69 within the annular dome 2210 to cool the annular dome 2210. The liner steam injection holes 2226 operably direct the steam 69 into the combustion chamber 2202 to generate a liner steam injection stream 2270 downstream of the one or more air dilution holes 2205. The one or more dome steam injection holes 2284 operably direct the steam 69 from the dome steam path 2282 into the combustion chamber 2202 to generate a dome steam injection stream 2285 within the combustion chamber 2202 in an area of the annular dome 2210. The liner steam injection stream 2270 includes a larger amount of the steam 69 than the dome steam injection stream 2285. For example, the liner steam injection stream 2270 includes 70% to 90% of the steam 69 from the steam path 2224, 2282 and dome stream injection stream 2285 includes 10% to 30% of the steam 69 from the steam path 2224, 2282. The one or more flame shaping holes 2286 operably direct the steam 69 into the combustion chamber 2202 to generate a steam flame shaping stream 2287 to shape the flame within the combustion zone 203. The combustion gases 66 from the combustion zone 203 mix with the dome steam injection stream 2285, the steam flame shaping stream 2287, and the liner steam injection stream 2270 to generate a steam-combustion gases mixture 2290 within the combustion chamber 2202 that is channeled downstream and out of the combustion chamber 2202.

Figure 23:
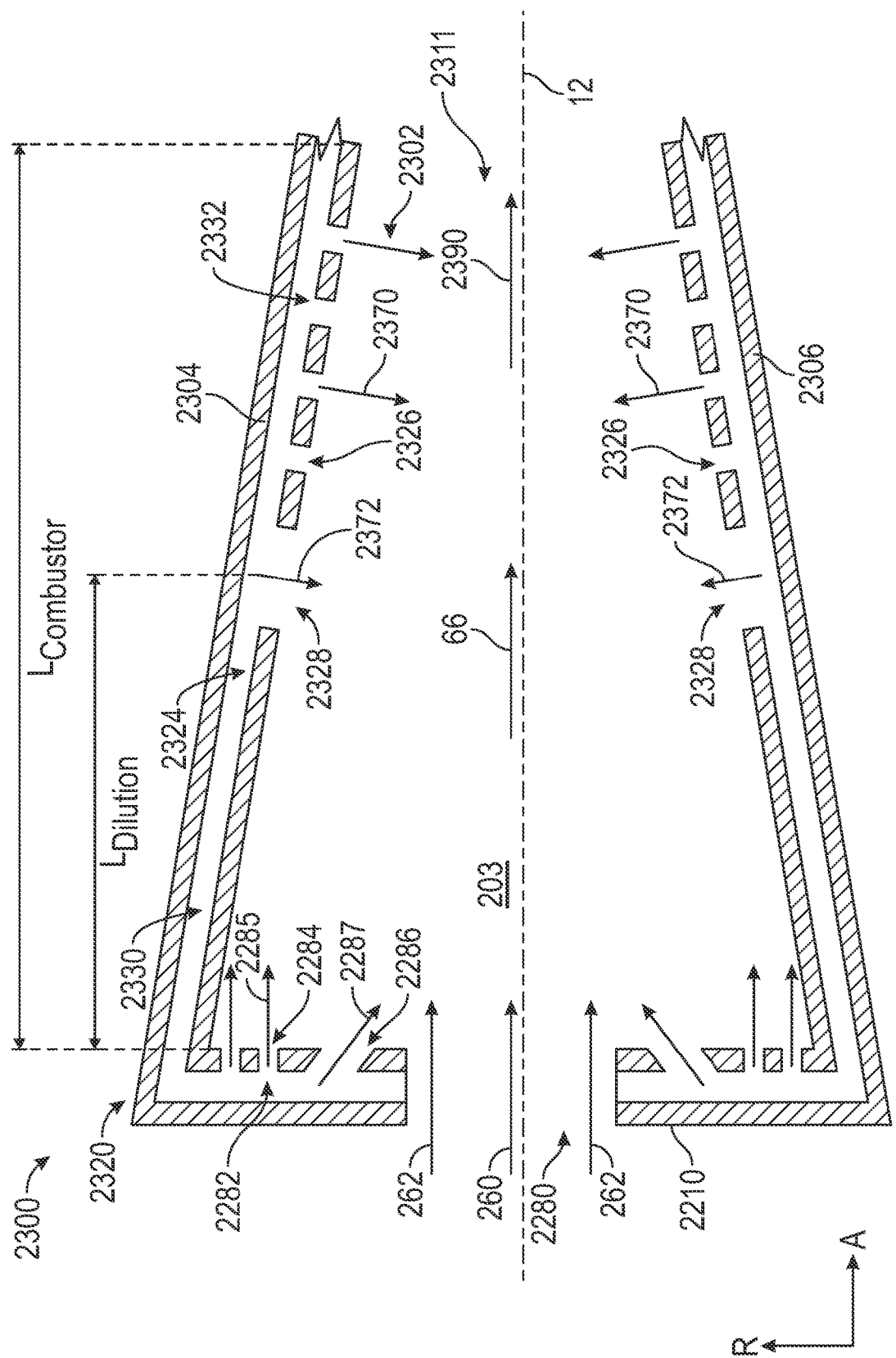
FIG. 23 is a schematic cross-sectional view of a combustor, taken along a longitudinal centerline axis of the combustor, according to another embodiment.

FIG. 23 is a schematic cross-sectional view of a combustor 2300, taken along a longitudinal centerline axis 12 of the combustor 2300, according to another embodiment. The combustor 2300 is substantially similar to the combustors 200, 2200 of FIGS. 2 and 22, and includes many of the same or similar components as the combustors 200, 2200, respectively. The same reference numerals will be used for components of the combustor 2300 that are the same as or similar to the components of the combustors 200, 2200 discussed above. The description of these components above also applies to this embodiment, and a detailed description of these components is omitted here. The combustor 2300 includes a combustion chamber 2302 defined by an outer liner 2304, an inner liner 2306, and the annular dome 2210. The combustion chamber 2202 extends to a combustion chamber outlet 2311. The outer liner 2304 and the inner liner 2306 extend from the annular dome 2210 to the combustion chamber outlet 2311. The outer liner 2304 and the inner liner 2306 are angled from the annular dome 2210 toward the longitudinal centerline axis 12 such that the combustion chamber 2302 defines a converging nozzle that accelerates the combustion gases 66 through the combustion chamber outlet 2311.

The combustor 2300 includes a combustor steam system 2320. The combustor steam system 2320 includes a steam path 2324, 2282 defined by (e.g., within) at least one of the outer liner 2304, the inner liner 2306, or the annular dome 2210. The steam path 2324, 2282 includes a liner steam path 2324 defined by (e.g., within) the outer liner 2304 and the inner liner 2306, and the dome steam path 2282 defined by (e.g., within) the annular dome 2210. The liner steam path 2324 includes a forward portion 2330 and an aft portion 2332. The combustor steam system 2320 includes one or more steam injection holes 2326, 2284 defined through at least one of the outer liner 2304, the inner liner 2306, or the annular dome 2210. The one or more steam injection holes 2326, 2284 include one or more liner steam injection holes 2326 and the one or more dome steam injection holes 2284. The combustor steam system 2320 also includes one or more steam dilution holes 2328 defined in the outer liner 2304 or the inner liner 2306. The one or more liner steam injection holes 2326 are positioned axially aft of the one or more steam dilution holes 2328. For example, the one or more liner steam injection holes 2326 are positioned at the aft portion 2332 of the liner steam path 2324.

The combustion chamber 2302 includes a total combustion chamber length $L_{combustor}$ defined axially from a downstream surface of the annular dome 2110 to the combustion chamber outlet 2311. The one or more steam dilution holes 2328 are positioned on the outer liner 2304 or the inner liner 2306 at a dilution hole length $L_{dilution}$ measured from the downstream surface of the annular dome 2110 to an axial center of the one or more steam dilution holes 2328. The dilution hole length $L_{dilution}$ is in a range of 10% to 90% of the total combustion chamber length $L_{combustor}$. In this way, the steam 69 is injected through the outer liner 2304 or the inner liner 2306 in a range of 10% to 90% of the total combustion chamber length $L_{combustor}$.

The combustor 2300 and the combustor steam system 2320 operate substantially similar to the combustors 200, 2200 and the combustor steam systems 220, 2220 of FIGS. 2 and 22, respectively. In particular, one or more liner steam injection holes 2326 operably direct the steam 69 from the steam path 2324 to generate a first steam injection stream 2370 through the outer liner 2304 and the inner liner 2306 within the combustion chamber 2302 downstream of the one or more steam dilution holes 2328. The one or more steam dilution holes 2328 operably direct the steam 69 from the steam path 2324 to generate a second steam injection stream 2372 from the outer liner 2304 and the inner liner 2306 within the combustion chamber 2302. The combustion gases 66 from the combustion zone 203 mix with the dome steam injection stream 2285, the steam flame shaping stream 2287, the first liner steam injection stream 2370, and the second liner steam injection stream 2372 to generate a steam-combustion gases mixture 2390 within the combustion chamber 2302 that is channeled downstream and out of the combustion chamber 2302.

Accordingly, the embodiments of the present disclosure detailed herein provide for a flame in a combustion zone within the combustion chamber, and injecting steam into the combustion chamber away from the combustion zone. The steam systems detailed herein enable a greater amount of steam to be injected into the combustor without sacrificing operability of the combustor, as compared to combustors without the benefit of the present disclosure. For example, typically a high amount of steam injected into the combustor leads to flameout of the flame, but the present disclosure provides for the steam to be injected into the combustion chamber, away from the combustion zone (e.g., downstream of the combustion zone), to avoid flameout of the flame in the combustion zone. Such a configuration of injecting the steam away from the flame enables a greater amount of steam that can be injected into the combustor, as compared to combustors without the benefit of the present disclosure. For example, injecting steam downstream of the combustion zone prevents the steam from flowing near the flame within the combustion zone. In this way, the present disclosure allows for a greater amount of steam to be injected into the combustor, while preventing the steam from choking the flame, thereby reducing emissions (e.g., $NO_x$ emissions, nvPM emissions, CO, and noise) and reducing SFC, while providing for flame stability (e.g., avoiding flameout), as compared to combustors without the benefit of the present disclosure. Such a configuration of flowing the steam through a steam path that is defined by at least one of the outer liner, the inner liner, or the annular dome also increases a life of the outer liner, the inner liner, or the annular dome as compared to outer liners, inner liners, and annular domes without the benefit of the present disclosure.

Further aspects of the present disclosure are provided by the subject matter of the following clauses.

A combustor comprises a combustion chamber including an outer liner and an inner liner and having a combustion zone, and an annular dome coupled to the outer liner and the inner liner at a forward end of the combustion chamber, a plurality of mixing assemblies that operably injects a fuel-air mixture into the combustion zone of the combustion chamber to produce combustion gases, and a combustor steam system in fluid communication with the combustion chamber, the combustor steam system including a steam path defined by at least one of the outer liner, the inner liner, or the annular dome, the combustor steam system operably directing steam through the steam path from the at least one of the outer liner, the inner liner, or the annular dome and into the combustion chamber.

The combustor of the preceding clause, the combustor steam system operably directing the steam away from the combustion zone.

The combustor of any preceding clause, a water-to-air ratio of the steam and compressed air in the combustion chamber being 0.0% to 60%.

The combustor of any preceding clause, further including at least one of one or more air dilution holes or one or more steam dilution holes in the outer liner or the inner liner, the combustor steam system operably injecting at least a portion of the steam into the combustion chamber axially aft of the at least one of the one or more air dilution holes or the one or more steam injection holes.

The combustor of any preceding clause, the combustor steam system including one or more steam cooling holes in the at least one of the outer liner, the inner liner, or the annular dome, the one or more steam cooling holes operably directing the steam therethrough to cool the at least one of the outer liner, the inner liner, or the annular dome.

The combustor of any preceding clause, the combustor steam system including one or more steam injectors in fluid communication with the steam path, and the one or more steam injectors operably injecting the steam into the steam path.

The combustor of any preceding clause, the one or more steam injectors being annular about the combustion chamber.

The combustor of any preceding clause, the combustor steam system including one or more steam injection holes in the at least one of the outer liner, the inner liner, or the annular dome, and the one or more steam injection holes operably direct the steam from the steam path into the combustion chamber.

The combustor of any preceding clause, the one or more steam injection holes being positioned on the outer liner or the inner liner at least 25% of a total combustion chamber length of the combustion chamber.

The combustor of any preceding clause, the one or more steam injection holes being positioned on the outer liner or the inner liner in a range of 10% to 90% of a total combustion chamber length of the combustion chamber.

The combustor of any preceding clause, further comprising a steam system operably supplying the steam to the combustor steam system.

The combustor of any preceding clause, the steam system including one or more steam lines providing the steam to the combustor steam system.

The combustor of the preceding clause, the one or more steam lines providing the steam to the one or more steam injectors.

The combustor of any preceding clause, the steam system generating steam from exhaust of the turbine engine.

The combustor of any preceding clause, the plurality of mixing assemblies including a plurality of fuel injectors for supplying fuel to the plurality of mixing assemblies.

The combustor of the preceding clause, the plurality of mixing assemblies including a mixer that mixes compressed air with the fuel from the plurality of fuel injectors.

The combustor of any preceding clause, the one or more dilution holes being one or more air dilution holes that operably direct the compressed air into the combustion chamber.

The combustor of any preceding clause, the steam path including a forward portion and an aft portion that is aft of the forward portion, the one or more steam injection holes being positioned at the forward portion.

The combustor of any preceding clause, the steam path being annular about the at least one of the outer liner, the inner liner, or the annular dome.

The combustor of any preceding clause, the steam path including one or more discrete steam paths within the at least one of the outer liner, the inner liner, or the annular dome.

The combustor of any preceding clause, the steam path including one or more circumferential extending portions and one or more axial extending portions that are fluidly coupled with the one or more circumferential extending portions.

The combustor of any preceding clause, the steam path having a generally zigzag shape.

The combustor of the preceding clause, the one or more circumferential extending portions and the one or more axial extending portions fluidly coupled to form the generally zigzag shape.

The combustor of any preceding clause, the steam path extending axially aft of the one or more dilution holes.

The combustor of any preceding clause, the one or more steam injectors being positioned axially forward of the one or more dilution holes.

The combustor of any preceding clause, the one or more steam injectors being positioned axially aft of the one or more dilution holes.

The combustor of any preceding clause, the one more steam injection holes being positioned on the one or more circumferential extending portions of the steam path.

The combustor of any preceding clause, the one or more circumferential extending portions extending circumferentially from the one or more steam injectors, and the one or more axial extending portions extending axially aftward from the one or more circumferential extending portions.

The combustor of any preceding clause, the one or more axial extending portions including one or more discrete axial extending portions that are spaced circumferentially about the at least one of the outer liner, the inner liner, or the annular dome.

The combustor of any preceding clause, the one or more axial extending portions extending axial aft of the one or more dilution holes.

The combustor of any preceding clause, the steam path being in the outer liner or the inner liner.

The combustor of any preceding clause, the one or more dilution holes including one or more steam dilution holes that are in fluid communication with the steam path, the one or more steam dilution holes operably directing the steam from the steam path into the combustion chamber.

The combustor of any preceding clause, the one or more dilution holes including one or more air dilution holes and one or more steam dilution holes that alternate circumferentially about the outer liner or the inner liner.

The combustor of any preceding clause, the combustor steam system further comprising one or more steam slots disposed through the outer liner or the inner, the one or more steam slots operably directing the steam into the combustion chamber.

The combustor of the preceding clause, the one or more steam slots being positioned axially aft of the one or more dilution holes.

The combustor of any preceding clause, the one or more steam slots being positioned axially forward of the one or more steam injection holes.

The combustor of any preceding clause, the one or more steam slots being generally arc-shaped slots.

The combustor of any preceding clause, the combustor steam system further comprising a steam manifold fluidly coupled between the one or more steam injectors and the steam path.

The combustor of any preceding clause, the steam manifold including one or
more discrete steam manifolds.

The combustor of any preceding clause, the steam manifold being annular about the combustion chamber.

The combustor of any preceding clause, further comprising a heat shield coupled to the at least of the outer liner, the inner liner, or the annular dome.

The combustor of any preceding clause, the steam path defined between the heat shield and the at least one of the outer liner, the inner liner, or the annular dome.

The combustor of any preceding clause, further comprising one or more air impingement holes disposed through the at least one of the outer liner, the inner liner, or the annular dome, the one or more air impingement holes operably directing the compressed air into the steam path to impinge on the heat shield.

The combustor of any preceding clause, the combustor steam system further including one or more steam cooling holes disposed through the heat shield, the one or more steam cooling holes operably directing the steam from the steam path into the combustion chamber to cool the heat shield.

The combustor of any preceding clause, the one or more steam cooling holes being angled aftward with respect to the longitudinal centerline axis of the combustor.

The combustor of any preceding clause, the combustor steam system further including one or more steam injector lines fluidly coupled between the steam manifold and the steam path for operably directing the steam from the steam manifold to the steam path.

The combustor of any preceding clause, the steam path including a forward portion that is forward of the at least one of the one or more air dilution holes or the one or more steam dilution holes, and an aft portion that is aft of the at least one of the one or more air dilution holes or the one or more steam dilution holes.

The combustor of any preceding clause, the forward portion being fluidly coupled with the aft portion.

The combustor of any preceding clause, the combustor steam system further comprising one or more forward steam inlet holes positioned forward of the one or more steam dilution holes and providing fluid communication from the steam manifold to the forward portion of the steam path.

The combustor of any preceding clause, the combustor steam system further comprising one or more aft steam inlet holes positioned aft of the one or more steam dilution holes and providing fluid communication from the steam manifold to the aft portion of the steam path.

The combustor of any preceding clause, the one or more forward steam inlet holes and the one or more aft steam inlet holes include a substantially equal size such that a pressure drop through the one or more forward steam inlet holes is substantially equal to a pressure drop through the one or more aft steam inlet holes.

The combustor of any preceding clause, the one or more forward steam inlet holes are sized differently than the one or more aft steam inlet holes such that a pressure drop through the one or more forward steam inlet holes is different than a pressure drop through the one or more aft steam inlet holes.

The combustor of any preceding clause, the one or more steam dilution holes and the one or steam injection holes being sized such that the one or more steam dilution holes operably direct greater than 50% of the steam into the combustion chamber and the one or more steam injection holes operably direct less than 50% of the steam into the combustion chamber.

The combustor of any preceding clause, the one or more steam dilution holes and the one or steam injection holes being sized such that the one or more steam dilution holes operably direct 40% to 100% of the steam into the combustion chamber and the one or more steam injection holes operably 0.0% to 60% of the steam into the combustion chamber.

The combustor of any preceding clause, the one or more steam injectors being positioned to direct the steam to the aft portion of the steam path.

The combustor of any preceding clause, the steam path operably directing the steam from the aft portion to the forward portion.

The combustor of any preceding clause, the forward portion being fluidly separate from the aft portion.

The combustor of any preceding clause, the combustor steam system including one or more first steam injectors lines in fluid communication with the aft portion, and one or more second steam injector lines in fluid communication with the forward portion.

The combustor of any preceding clause, the one or more steam injection holes being at the forward portion such that the steam is injected from the forward portion and at the aft portion such that the steam injected from the aft portion.

The combustor of any preceding clause, the steam injected from the aft portion including a greater amount of the steam than the steam injected from the forward portion.

The combustor of any preceding clause, the steam injected from the aft portion including 50% to 80% of the steam injected into the combustion chamber and the steam injected from the forward portion including 20% to 50% of the steam injected into the combustion chamber.

The combustor of any preceding clause, the combustor steam system further comprising one or more steam manifold lines fluidly coupled between the steam manifold and the one or more second steam injector lines to operably direct the steam to the one or more second steam injector lines.

The combustor of any preceding clause, the one or more air dilution holes including a dilution hole insert disposed within the one or more air dilution holes.

The combustor of any preceding clause, the one or more air dilution holes including a dilution hole support disposed within the one or more air dilution holes for preventing the one or more air dilution holes from closing during thermal expansion of the heat shield and the at least one of the outer liner, the inner liner, or the annular dome.

The combustor of any preceding clause, the combustor further including an air path positioned axially forward of the one or more dilution holes.

The combustor of any preceding clause, the air path being defined between the heat shield and the at least one of the outer liner, the inner liner, or the annular dome.

The combustor of any preceding clause, the one or more air impingement holes operably directing the compressed air into the air path to impinge on the heat shield.

The combustor of any preceding clause, the combustor further including one or more air injection holes disposed through the heat shield, the one or more air injection holes operably directing the compressed air from the air path to the combustion chamber to cool the heat shield.

The combustor of any preceding clause, the steam path being positioned axially aft of the one or more dilution holes.

The combustor of any preceding clause, the steam manifold including one or more steam impingement holes disposed in the steam manifold, the one or more steam impingement holes operably directing the steam from the steam manifold into the steam path to impinge on the heat shield.

The combustor of any preceding clause, the steam manifold including a forward portion axially forward of the one or more dilution holes, and an aft portion that is axially aft of the one or more dilution holes.

The combustor of any preceding clause, the steam manifold operably directing the steam from the aft portion to the forward portion.

The combustor of any preceding clause, the one or more steam injectors including one or more first steam injectors that operably direct the steam into the aft portion, and one or more second steam injectors that operably direct the steam into the forward portion.

The combustor of any preceding clause, the plurality of fuel injectors including a fuel supply line positioned axially aft of the one or more dilution holes, the fuel supply line operably directing the fuel to the plurality of fuel injectors.

The combustor of any preceding clause, further comprising a fuel path disposed within the outer liner or the inner liner that provides fluid communication from the fuel supply line to the plurality of fuel injectors.

The combustor of any preceding clause, the fuel path extending substantially axially from the fuel supply line to the plurality of fuel injectors.

The combustor of any preceding clause, the fuel path operably directing the fuel from the fuel supply line to the fuel injector.

The combustor of any preceding clause, the fuel in the fuel path absorbing heat from the steam in the steam path as the fuel flows through the fuel path.

The combustor of any preceding clause, the steam flowing through the steam path in a direction opposite to a direction of flow of the combustion gases.

The combustor of any preceding clause, the fuel flowing through the fuel path in a direction opposite to the direction of flow of the combustion gases.

The combustor of any preceding clause, the steam path being disposed in the outer liner or the inner liner.

The combustor of any preceding clause, the one or more steam injection holes being disposed in the outer liner or the inner liner.

The combustor of any preceding clause, the steam path being disposed in the annular dome.

The combustor of any preceding clause, the one or more steam injection holes being disposed in the annular dome.

The combustor of any preceding clause, the combustor steam system further comprising one or more flame shaping holes disposed through the annular dome, the one or more flame shaping holes operably directing the steam through the annular dome and into the combustion chamber to prevent the flame from expanding radially beyond the steam from the one or more flame shaping holes.

The combustor of any preceding clause, the one or more flame shaping holes being angled toward the flame.

The combustor of any preceding clause, the annular dome comprising one or more mixing assembly holes for receiving the plurality of mixing assemblies, the one or more flame shaping holes being positioned radially between the one or more mixing assembly holes and the one or more steam injection holes.

The combustor of any preceding clause, the one or more flame shaping holes being larger than the one or more steam injection holes.

The combustor of any preceding clause, the steam path having a generally swirl shape.

The combustor of any preceding clause, the outer liner, the inner liner, and the annular dome forming a single, unitary component.

The combustor of any preceding clause, the steam path including a liner steam path disposed within the outer liner or the inner liner, and a dome steam path disposed within the annular dome.

The combustor of any preceding clause, the liner steam path being fluidly coupled with the dome steam path.

The combustor of any preceding clause, the steam injected from the outer liner or the inner liner being 70% to 90% of the steam injected into the combustion chamber and the steam injected from the annular dome being 10% to 30% of the steam injected into the combustion chamber.

The combustor of any preceding clause, the outer liner and the inner liner being angled towards the longitudinal centerline axis to define a converging nozzle that accelerates the combustion gases through a combustion chamber outlet of the combustion chamber.

The combustor of any preceding clause, the combustion chamber including a total combustion chamber length defined axially from a downstream surface of the annular dome to the combustion chamber outlet.

The combustor of any preceding clause, the one or more dilution holes being positioned on the outer liner or the inner liner at a dilution hole length measured from the downstream surface of the annular dome to an axial center of the one or more dilution holes.

The combustor of any preceding clause, the dilution hole length being in a range of 10% to 90% of the total combustion chamber length.

A turbine engine comprises a fan and a core turbine engine comprising a compressor section, a combustion section, and a turbine section. The combustion section comprises a combustor comprising a combustion chamber including an outer liner and an inner liner and having a combustion zone, and an annular dome coupled to the outer liner and the inner liner at a forward end of the combustion chamber, a plurality of mixing assemblies that operably injects a fuel-air mixture into the combustion zone of the combustion chamber to produce combustion gases, and a combustor steam system in fluid communication with the combustion chamber, the combustor steam system including a steam path defined by at least one of the outer liner, the inner liner, or the annular dome, the combustor steam system operably directing steam through the steam path from the at least one of the outer liner, the inner liner, or the annular dome and into the combustion chamber.

The turbine engine of the preceding clause, the combustor steam system operably directing the steam away from the combustion zone.

The turbine engine of any preceding clause, a water-to-air ratio of the steam and compressed air in the combustion chamber being 0.0% to 60%.

The turbine engine of any preceding clause, further including at least one of one or more air dilution holes or one or more steam dilution holes in the outer liner or the inner liner, the combustor steam system operably injecting at least a portion of the steam into the combustion chamber axially aft of the at least one of the one or more air dilution holes or the one or more steam injection holes.

The turbine engine of any preceding clause, the combustor steam system including one or more steam cooling holes in the at least one of the outer liner, the inner liner, or the annular dome, the one or more steam cooling holes operably directing the steam therethrough to cool the at least one of the outer liner, the inner liner, or the annular dome.

The turbine engine of any preceding clause, the combustor steam system including one or more steam injectors in fluid communication with the steam path, and the one or more steam injectors operably injecting the steam into the steam path.

The turbine engine of any preceding clause, the one or more steam injectors being annular about the combustion chamber.

The turbine engine of any preceding clause, the combustor steam system including one or more steam injection holes in the at least one of the outer liner, the inner liner, or the annular dome, and the one or more steam injection holes operably direct the steam from the steam path into the combustion chamber.

The turbine engine of any preceding clause, the one or more steam injection holes being positioned on the outer liner or the inner liner at least 25% of a total combustion chamber length of the combustion chamber.

The turbine engine of any preceding clause, the one or more steam injection holes being positioned on the outer liner or the inner liner in a range of 10% to 90% of a total combustion chamber length of the combustion chamber.

The turbine engine of any preceding clause, further comprising a steam system operably supplying the steam to the combustor steam system.

The turbine engine of any preceding clause, the steam system including one or more steam lines providing the steam to the combustor steam system.

The turbine engine of the preceding clause, the one or more steam lines providing the steam to the one or more steam injectors.

The turbine engine of any preceding clause, the steam system generating steam from exhaust of the turbine engine.

The turbine engine of any preceding clause, the plurality of mixing assemblies including a plurality of fuel injectors for supplying fuel to the plurality of mixing assemblies.

The turbine engine of the preceding clause, the plurality of mixing assemblies including a mixer that mixes compressed air with the fuel from the plurality of fuel injectors.

The turbine engine of any preceding clause, the one or more dilution holes being one or more air dilution holes that operably direct the compressed air into the combustion chamber.

The turbine engine of any preceding clause, the steam path including a forward portion and an aft portion that is aft of the forward portion, the one or more steam injection holes being positioned at the forward portion.

The turbine engine of any preceding clause, the steam path being annular about the at least one of the outer liner, the inner liner, or the annular dome.

The turbine engine of any preceding clause, the steam path including one or more discrete steam paths within the at least one of the outer liner, the inner liner, or the annular dome.

The turbine engine of any preceding clause, the steam path including one or more circumferential extending portions and one or more axial extending portions that are fluidly coupled with the one or more circumferential extending portions.

The turbine engine of any preceding clause, the steam path having a generally zigzag shape.

The turbine engine of the preceding clause, the one or more circumferential extending portions and the one or more axial extending portions fluidly coupled to form the generally zigzag shape.

The turbine engine of any preceding clause, the steam path extending axially aft of the one or more dilution holes.

The turbine engine of any preceding clause, the one or more steam injectors being positioned axially forward of the one or more dilution holes.

The turbine engine of any preceding clause, the one or more steam injectors being positioned axially aft of the one or more dilution holes.

The turbine engine of any preceding clause, the one more steam injection holes being positioned on the one or more circumferential extending portions of the steam path.

The turbine engine of any preceding clause, the one or more circumferential extending portions extending circumferentially from the one or more steam injectors, and the one or more axial extending portions extending axially aftward from the one or more circumferential extending portions.

The turbine engine of any preceding clause, the one or more axial extending portions including one or more discrete axial extending portions that are spaced circumferentially about the at least one of the outer liner, the inner liner, or the annular dome.

The turbine engine of any preceding clause, the one or more axial extending portions extending axial aft of the one or more dilution holes.

The turbine engine of any preceding clause, the steam path being in the outer liner or the inner liner.

The turbine engine of any preceding clause, the one or more dilution holes including one or more steam dilution holes that are in fluid communication with the steam path, the one or more steam dilution holes operably directing the steam from the steam path into the combustion chamber.

The turbine engine of any preceding clause, the one or more dilution holes including one or more air dilution holes and one or more steam dilution holes that alternate circumferentially about the outer liner or the inner liner.

The turbine engine of any preceding clause, the combustor steam system further comprising one or more steam slots disposed through the outer liner or the inner, the one or more steam slots operably directing the steam into the combustion chamber.

The turbine engine of the preceding clause, the one or more steam slots being positioned axially aft of the one or more dilution holes.

The turbine engine of any preceding clause, the one or more steam slots being positioned axially forward of the one or more steam injection holes.

The turbine engine of any preceding clause, the one or more steam slots being generally arc-shaped slots.

The turbine engine of any preceding clause, the combustor steam system further comprising a steam manifold fluidly coupled between the one or more steam injectors and the steam path.

The turbine engine of any preceding clause, the steam manifold including one or more discrete steam manifolds.

The turbine engine of any preceding clause, the steam manifold being annular about the combustion chamber.

The turbine engine of any preceding clause, further comprising a heat shield coupled to the at least of the outer liner, the inner liner, or the annular dome.

The turbine engine of any preceding clause, the steam path defined between the heat shield and the at least one of the outer liner, the inner liner, or the annular dome.

The turbine engine of any preceding clause, further comprising one or more air impingement holes disposed through the at least one of the outer liner, the inner liner, or the annular dome, the one or more air impingement holes operably directing the compressed air into the steam path to impinge on the heat shield.

The turbine engine of any preceding clause, the combustor steam system further including one or more steam cooling holes disposed through the heat shield, the one or more steam cooling holes operably directing the steam from the steam path into the combustion chamber to cool the heat shield.

The turbine engine of any preceding clause, the one or more steam cooling holes being angled aftward with respect to the longitudinal centerline axis of the combustor.

The turbine engine of any preceding clause, the combustor steam system further including one or more steam injector lines fluidly coupled between the steam manifold and the steam path for operably directing the steam from the steam manifold to the steam path.

The turbine engine of any preceding clause, the steam path including a forward portion that is forward of the at least one of the one or more air dilution holes or the one or more steam dilution holes, and an aft portion that is aft of the at least one of the one or more air dilution holes or the one or more steam dilution holes.

The turbine engine of any preceding clause, the forward portion being fluidly coupled with the aft portion.

The turbine engine of any preceding clause, the combustor steam system further comprising one or more forward steam inlet holes positioned forward of the one or more steam dilution holes and providing fluid communication from the steam manifold to the forward portion of the steam path.

The turbine engine of any preceding clause, the combustor steam system further comprising one or more aft steam inlet holes positioned aft of the one or more steam dilution holes and providing fluid communication from the steam manifold to the aft portion of the steam path.

The turbine engine of any preceding clause, the one or more forward steam inlet holes and the one or more aft steam inlet holes include a substantially equal size such that a pressure drop through the one or more forward steam inlet holes is substantially equal to a pressure drop through the one or more aft steam inlet holes.

The turbine engine of any preceding clause, the one or more forward steam inlet holes are sized differently than the one or more aft steam inlet holes such that a pressure drop through the one or more forward steam inlet holes is different than a pressure drop through the one or more aft steam inlet holes.

The turbine engine of any preceding clause, the one or more steam dilution holes and the one or steam injection holes being sized such that the one or more steam dilution holes operably direct greater than 50% of the steam into the combustion chamber and the one or more steam injection holes operably direct less than 50% of the steam into the combustion chamber.

The turbine engine of any preceding clause, the one or more steam dilution holes and the one or steam injection holes being sized such that the one or more steam dilution holes operably direct 40% to 100% of the steam into the combustion chamber and the one or more steam injection holes operably 0.0% to 60% of the steam into the combustion chamber.

The turbine engine of any preceding clause, the one or more steam injectors being positioned to direct the steam to the aft portion of the steam path.

The turbine engine of any preceding clause, the steam path operably directing the steam from the aft portion to the forward portion.

The turbine engine of any preceding clause, the forward portion being fluidly separate from the aft portion.

The turbine engine of any preceding clause, the combustor steam system including one or more first steam injectors lines in fluid communication with the aft portion, and one or more second steam injector lines in fluid communication with the forward portion.

The turbine engine of any preceding clause, the one or more steam injection holes being at the forward portion such that the steam is injected from the forward portion and at the aft portion such that the steam injected from the aft portion.

The turbine engine of any preceding clause, the steam injected from the aft portion including a greater amount of the steam than the steam injected from the forward portion.

The turbine engine of any preceding clause, the steam injected from the aft portion including 50% to 80% of the steam injected into the combustion chamber and the steam injected from the forward portion including 20% to 50% of the steam injected into the combustion chamber.

The turbine engine of any preceding clause, the combustor steam system further comprising one or more steam manifold lines fluidly coupled between the steam manifold and the one or more second steam injector lines to operably direct the steam to the one or more second steam injector lines.

The turbine engine of any preceding clause, the one or more air dilution holes including a dilution hole insert disposed within the one or more air dilution holes.

The turbine engine of any preceding clause, the one or more air dilution holes including a dilution hole support disposed within the one or more air dilution holes for preventing the one or more air dilution holes from closing during thermal expansion of the heat shield and the at least one of the outer liner, the inner liner, or the annular dome.

The turbine engine of any preceding clause, the combustor further including an air path positioned axially forward of the one or more dilution holes.

The turbine engine of any preceding clause, the air path being defined between the heat shield and the at least one of the outer liner, the inner liner, or the annular dome.

The turbine engine of any preceding clause, the one or more air impingement holes operably directing the compressed air into the air path to impinge on the heat shield.

The turbine engine of any preceding clause, the combustor further including one or more air injection holes disposed through the heat shield, the one or more air injection holes operably directing the compressed air from the air path to the combustion chamber to cool the heat shield.

The turbine engine of any preceding clause, the steam path being positioned axially aft of the one or more dilution holes.

The turbine engine of any preceding clause, the steam manifold including one or more steam impingement holes disposed in the steam manifold, the one or more steam impingement holes operably directing the steam from the steam manifold into the steam path to impinge on the heat shield.

The turbine engine of any preceding clause, the steam manifold including a forward portion axially forward of the one or more dilution holes, and an aft portion that is axially aft of the one or more dilution holes.

The turbine engine of any preceding clause, the steam manifold operably directing the steam from the aft portion to the forward portion.

The turbine engine of any preceding clause, the one or more steam injectors including one or more first steam injectors that operably direct the steam into the aft portion, and one or more second steam injectors that operably direct the steam into the forward portion.

The turbine engine of any preceding clause, the plurality of fuel injectors including a fuel supply line positioned axially aft of the one or more dilution holes, the fuel supply line operably directing the fuel to the plurality of fuel injectors.

The turbine engine of any preceding clause, further comprising a fuel path disposed within the outer liner or the inner liner that provides fluid communication from the fuel supply line to the plurality of fuel injectors.

The turbine engine of any preceding clause, the fuel path extending substantially axially from the fuel supply line to the plurality of fuel injectors.

The turbine engine of any preceding clause, the fuel path operably directing the fuel from the fuel supply line to the fuel injector.

The turbine engine of any preceding clause, the fuel in the fuel path absorbing heat from the steam in the steam path as the fuel flows through the fuel path.

The turbine engine of any preceding clause, the steam flowing through the steam path in a direction opposite to a direction of flow of the combustion gases.

The turbine engine of any preceding clause, the fuel flowing through the fuel path in a direction opposite to the direction of flow of the combustion gases.

The turbine engine of any preceding clause, the steam path being disposed in the outer liner or the inner liner.

The turbine engine of any preceding clause, the one or more steam injection holes being disposed in the outer liner or the inner liner.

The turbine engine of any preceding clause, the steam path being disposed in the annular dome.

The turbine engine of any preceding clause, the one or more steam injection holes being disposed in the annular dome.

The turbine engine of any preceding clause, the combustor steam system further comprising one or more flame shaping holes disposed through the annular dome, the one or more flame shaping holes operably directing the steam through the annular dome and into the combustion chamber to prevent the flame from expanding radially beyond the steam from the one or more flame shaping holes.

The turbine engine of any preceding clause, the one or more flame shaping holes being angled toward the flame.

The turbine engine of any preceding clause, the annular dome comprising one or more mixing assembly holes for receiving the plurality of mixing assemblies, the one or more flame shaping holes being positioned radially between the one or more mixing assembly holes and the one or more steam injection holes.

The turbine engine of any preceding clause, the one or more flame shaping holes being larger than the one or more steam injection holes.

The turbine engine of any preceding clause, the steam path having a generally swirl shape.

The turbine engine of any preceding clause, the outer liner, the inner liner, and the annular dome forming a single, unitary component.

The turbine engine of any preceding clause, the steam path including a liner steam path disposed within the outer liner or the inner liner, and a dome steam path disposed within the annular dome.

The turbine engine of any preceding clause, the liner steam path being fluidly coupled with the dome steam path.

The turbine engine of any preceding clause, the steam injected from the outer liner or the inner liner being 70% to 90% of the steam injected into the combustion chamber and the steam injected from the annular dome being 10% to 30% of the steam injected into the combustion chamber.

The turbine engine of any preceding clause, the outer liner and the inner liner being angled towards the longitudinal centerline axis to define a converging nozzle that accelerates the combustion gases through a combustion chamber outlet of the combustion chamber.

The turbine engine of any preceding clause, the combustion chamber including a total combustion chamber length defined axially from a downstream surface of the annular dome to the combustion chamber outlet.

The turbine engine of any preceding clause, the one or more dilution holes being positioned on the outer liner or the inner liner at a dilution hole length measured from the downstream surface of the annular dome to an axial center of the one or more dilution holes.

The turbine engine of any preceding clause, the dilution hole length being in a range of 10% to 90% of the total combustion chamber length.

A method of operating the turbine engine of any preceding clause, the method comprising generating the fuel-air mixture with the plurality of mixing assemblies, injecting the fuel-air mixture into the combustion zone of the combustion chamber to generate a flame in the combustion zone that produces the combustion gases, directing the steam with the combustor steam system into the steam path defined by the at least one of the outer liner, the inner liner, or the annular dome, and directing the steam from the steam path and into the combustion chamber.

The method of the preceding clause, further comprising directing the steam away from the combustion zone.

The method of any preceding clause, further comprising injecting the steam with the combustor steam system during a mid-power operation of the turbine engine and during a high-power operation of the turbine engine.

The method of any preceding clause, further comprising directing the steam into the combustion chamber such that a water-to-air ratio of the steam to compressed air in the combustion chamber is 0.0% to 60%.

The method of any preceding clause, the combustor including at least one of one or more air dilution holes or one or more steam dilution holes in the outer liner or the inner liner, and the method further comprising directing at least a portion of the steam into the combustion chamber axially aft of the at least one of the one or more air dilution holes or the one or more steam dilution holes.

The method of any preceding clause, the combustor steam system including one or more steam cooling holes in the at least one of the outer liner, the inner liner, or the annular dome, and the method further comprising operably directing the steam through the one or more steam cooling holes to cool the at least one of the outer liner, the inner liner, or the annular dome.

The method of any preceding clause, the combustor steam system including one or more steam injectors in fluid communication with the steam path, and the method further comprising directing the steam through the one or more steam injectors into the steam path.

The method of any preceding clause, the combustor steam system including one or more steam injection holes in the at least one of the outer liner, the inner liner, or the annular dome, and the method further comprising directing the steam from the steam path, through the one or more steam injection holes, and into the combustion chamber.

The method of any preceding clause, further comprising directing the steam from the steam path, through the one or more steam injection holes, and into the combustion chamber at a position that is at least 25% of a total combustion chamber length of the combustion chamber.

The method of any preceding clause, further comprising directing the steam from the steam path, through the one or more steam injection holes, and into the combustion chamber at a position that is in a range of 10% to 90% of a total combustion chamber length of the combustion chamber.

The method of any preceding clause, further comprising supplying the steam to the combustor steam system with a steam system.

The method of any preceding clause, further comprising providing the steam to the combustor steam system through one or more steam lines.

The method of the preceding clause, further comprising providing the steam to the one or more steam injectors.

The method of any preceding clause, further comprising generating steam from exhaust of the turbine engine with the steam system.

The method of any preceding clause, the plurality of mixing assemblies including a plurality of fuel injectors, the method comprising supplying fuel to the plurality of mixing assemblies through the plurality of fuel injectors.

The method of the preceding clause, the plurality of mixing assemblies including a mixer, the method comprising mixing the compressed air with the fuel from the plurality of fuel injectors.

The method of any preceding clause, further comprising directing the compressed air into the combustion chamber through the one or more air dilution holes.

The method of any preceding clause, the steam path including a forward portion and an aft portion that is aft of the forward portion, the one or more steam injection holes being positioned at the forward portion.

The method of any preceding clause, the steam path being annular about the at least one of the outer liner, the inner liner, or the annular dome.

The method of any preceding clause, the steam path including one or more discrete steam paths within the at least one of the outer liner, the inner liner, or the annular dome.

The method of any preceding clause, the steam path including one or more circumferential extending portions and one or more axial extending portions that are fluidly coupled with the one or more circumferential extending portions.

The method of any preceding clause, the steam path having a generally zigzag shape.

The method of the preceding clause, the one or more circumferential extending portions and the one or more axial extending portions fluidly coupled to form the generally zigzag shape.

The method of any preceding clause, the steam path extending axially aft of the one or more dilution holes.

The method of any preceding clause, the one or more steam injectors being positioned axially forward of the one or more dilution holes.

The method of any preceding clause, the one or more steam injectors being positioned axially aft of the one or more dilution holes.

The method of any preceding clause, the one more steam injection holes being positioned on the one or more circumferential extending portions of the steam path.

The method of any preceding clause, the one or more circumferential extending portions extending circumferentially from the one or more steam injectors, and the one or more axial extending portions extend axially aftward from the one or more circumferential extending portions.

The method of any preceding clause, the one or more axial extending portions including one or more discrete axial extending portions that are spaced circumferentially about the at least one of the outer liner, the inner liner, or the annular dome.

The method of any preceding clause, the one or more axial extending portions extending axial aft of the one or more dilution holes.

The method of any preceding clause, the steam path being in the outer liner or the inner liner.

The method of any preceding clause, the one or more dilution holes including one or more steam dilution holes that are in fluid communication with the steam path, the method comprising directing the steam from the steam path into the combustion chamber through the one or more steam dilution holes.

The method of any preceding clause, the one or more dilution holes including one or more air dilution holes in fluid communication with the combustion chamber, the method comprising directing the compressed air into the combustion chamber through the one or more air dilution holes.

The method of any preceding clause, the one or more air dilution holes and the one or more steam dilution holes alternating circumferentially about the outer liner or the inner liner.

The method of any preceding clause, the combustor steam system further comprising one or more steam slots disposed through the outer liner or the inner, the method further comprising directing the steam into the combustion chamber through the one or more steam slots.

The method of the preceding clause, the one or more steam slots being positioned axially aft of the one or more dilution holes.

The method of any preceding clause, the one or more steam slots being positioned axially forward of the one or more steam injection holes.

The method of any preceding clause, the one or more steam slot being generally arc-shaped slots.

The method of any preceding clause, the combustor steam system further comprising a steam manifold fluidly coupled between the one or more steam injectors and the steam path.

The method of any preceding clause, the steam manifold including one or more discrete steam manifolds.

The method of any preceding clause, the steam manifold being annular about the combustion chamber.

The method of any preceding clause, further comprising a heat shield coupled to the at least of the outer liner, the inner liner, or the annular dome.

The method of any preceding clause, the steam path defined between the heat shield and the at least one of the outer liner, the inner liner, or the annular dome.

The method of any preceding clause, further comprising one or more air impingement holes disposed through the at least one of the outer liner, the inner liner, or the annular dome, the method further comprising directing the compressed air into the steam path through the one or more air impingement holes to impinge on the heat shield.

The method of any preceding clause, the combustor steam system further including one or more steam cooling holes disposed through the heat shield, the method further comprising directing the steam from the steam path through the one or more steam cooling holes and into the combustion chamber to cool the heat shield.

The method of any preceding clause, the one or more steam cooling holes being angled with respect to the longitudinal centerline axis of the combustor.

The method of any preceding clause, the combustor steam system further including one or more steam injector lines fluidly coupled between the steam manifold and the steam path, the method further comprising directing the steam from the steam manifold to the steam path through the one or more steam injector lines.

The method of any preceding clause, the steam path including a forward portion that is forward of the at least one of the one or more air dilution holes or the one or more steam dilution holes, and an aft portion that is aft of the at least one of the one or more air dilution holes or the one or more steam dilution holes.

The method of any preceding clause, the forward portion being fluidly coupled with the aft portion.

The method of any preceding clause, the combustor steam system further comprising one or more forward steam inlet holes positioned forward of the one or more steam dilution holes, and the method further comprising directing the steam from the steam manifold to the forward portion of the steam path through the one or more forward steam inlet holes.

The method of any preceding clause, the combustor steam system further comprising one or more aft steam inlet holes positioned aft of the one or more steam dilution holes, and the method further comprising directing the steam from the steam manifold to the aft portion of the steam path through the one or more aft steam inlet holes.

The method of any preceding clause, the one or more forward steam inlet holes and the one or more aft steam inlet holes include a substantially equal size such that a pressure drop through the one or more forward steam inlet holes is substantially equal to a pressure drop through the one or more aft steam inlet holes.

The method of any preceding clause, the one or more forward steam inlet holes are sized differently than the one or more aft steam inlet holes such that a pressure drop through the one or more forward steam inlet holes is different than a pressure drop through the one or more aft steam inlet holes.

The method of any preceding clause, further comprising directing greater than 50% of the steam into the combustion chamber through the one or more steam dilution holes, and directing less than 50% of the steam into the combustion chamber through the one or more steam injection holes.

The method of any preceding clause, further comprising directing 40% to 100% of the steam into the combustion chamber through the one or more steam dilution holes, and directing 0.0% to 60% of the steam into the combustion chamber through the one or more steam injection holes.

The method of any preceding clause, further comprising directing the steam to the aft portion of the steam path through the one or more steam injectors.

The method of any preceding clause, the method further comprising directing the steam from the aft portion to the forward portion.

The method of any preceding clause, the forward portion being fluidly separate from the aft portion.

The method of any preceding clause, the combustor steam system including one or more first steam injectors lines in fluid communication with the aft portion, and one or more second steam injector lines in fluid communication with the forward portion.

The method of any preceding clause, the one or more steam injection holes being at the forward portion such that the steam is injected from the forward portion and at the aft portion such that the steam injected from the aft portion.

The method of any preceding clause, further comprising injecting a greater amount of the steam from the aft portion than from the forward portion.

The method of any preceding clause, the steam injected from the aft portion including 50% to 80% of the steam injected into the combustion chamber and the steam injected from the forward portion including 20% to 50% of the steam injected into the combustion chamber.

The method of any preceding clause, the combustor steam system further comprising one or more steam manifold lines fluidly coupled between the steam manifold and the one or more second steam injector lines, the method further comprising directing the steam to the one or more second steam injector lines.

The method of any preceding clause, the one or more air dilution holes including a dilution hole insert disposed within the one or more air dilution holes.

The method of any preceding clause, the one or more air dilution holes including a dilution hole support disposed within the one or more air dilution holes for preventing the one or more air dilution holes from closing during thermal expansion of the heat shield and the at least one of the outer liner, the inner liner, or the annular dome.

The method of any preceding clause, the combustor further including an air path positioned axially forward of the one or more dilution holes.

The method of any preceding clause, the air path being defined between the heat shield and the at least one of the outer liner, the inner liner, or the annular dome.

The method of any preceding clause, further comprising directing the compressed air into the air path through the one or more air impingement holes to impinge on the heat shield.

The method of any preceding clause, the combustor further including one or more air injection holes disposed through the heat shield, the method further comprising directing the compressed air from the air path to the combustion chamber through the one or more air injection holes to cool the heat shield.

The method of any preceding clause, the steam path being positioned axially aft of the one or more dilution holes.

The method of any preceding clause, the steam manifold including one or more steam impingement holes disposed in the steam manifold, the method further comprising directing the steam from the steam manifold into the steam path through the one or more steam impingement holes to impinge on the heat shield.

The method of any preceding clause, the steam manifold including a forward portion axially forward of the one or more dilution holes, and an aft portion axially aft of the one or more dilution holes.

The method of any preceding clause, further comprising directing the steam from the aft portion to the forward portion.

The method of any preceding clause, the one or more steam injectors including one or more first steam injectors, the method further comprising directing the steam into the aft portion with the one or more first steam injectors.

The method of any preceding clause, the one or more steam injectors including one or more second steam injectors, the method further comprising directing the steam into the forward portion with the one or more second steam injectors.

The method of any preceding clause, the plurality of fuel injectors including a fuel supply line positioned axially aft of the one or more dilution holes, the method further comprising directing the fuel to the plurality of fuel injectors through the fuel supply line.

The method of any preceding clause, further comprising a fuel path disposed within the outer liner or the inner liner that provides fluid communication from the fuel supply line to the plurality of fuel injectors.

The method of any preceding clause, the fuel path extending substantially axially from the fuel supply line to the plurality of fuel injectors.

The method of any preceding clause, the method further comprising directing the fuel from the fuel supply line to the fuel injector through the fuel path.

The method of any preceding clause, further comprising absorbing heat in the fuel from the steam in the steam path as the fuel flows through the fuel path.

The method of any preceding clause, further comprising directing the steam in the steam path in a direction opposite to a direction of the combustion gases.

The method of any preceding clause, further comprising directing the fuel through the fuel path in a direction opposite to the direction of the combustion gases.

The method of any preceding clause, the steam path being disposed in the outer liner or the inner liner.

The method of any preceding clause, the one or more steam injection holes being disposed in the outer liner or the inner liner.

The method of any preceding clause, the steam path being disposed in the annular dome.

The method of any preceding clause, the one or more steam injection holes being disposed in the annular dome.

The method of any preceding clause, the combustor steam system further comprising one or more flame shaping holes disposed through the annular dome, the method further comprising directing the steam through the annular dome and into the combustion chamber through the one or more flame shaping holes to prevent the flame from expanding radially beyond the steam from the one or more flame shaping holes.

The method of any preceding clause, the one or more flame shaping holes being angled toward the flame.

The method of any preceding clause, the annular dome comprising one or more mixing assembly holes for receiving the plurality of mixing assemblies, the one or more flame shaping holes being positioned radially between the one or more mixing assembly holes and the one or more steam injection holes.

The method of any preceding clause, the one or more flame shaping holes being larger than the one or more steam injection holes.

The method of any preceding clause, the steam path having a generally swirl shape.

The method of any preceding clause, the outer liner, the inner liner, and the annular dome forming a single, unitary component.

The method of any preceding clause, the steam path including a liner steam path disposed within the outer liner or the inner liner, and a dome steam path disposed within the annular dome.

The method of any preceding clause, the liner steam path being fluidly coupled with the dome steam path.

The method of any preceding clause, the steam injected from the outer liner or the inner liner being 70% to 90% of the steam injected into the combustion chamber and the steam injected from the annular dome being 10% to 30% of the steam injected into the combustion chamber.

The method of any preceding clause, the outer liner and the inner liner being angled towards the longitudinal centerline axis to define a converging nozzle that accelerates the combustion gases through a combustion chamber outlet of the combustion chamber.

The method of any preceding clause, the combustion chamber including a total combustion chamber length defined axially from a downstream surface of the annular dome to the combustion chamber outlet.

The method of any preceding clause, the one or more dilution holes being positioned on the outer liner or the inner liner at a dilution hole length measured from the downstream surface of the annular dome to an axial center of the one or more dilution holes.

The method of any preceding clause, the dilution hole length being in a range of 10% to 90% of the total combustion chamber length. Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A combustor comprising:
 a combustion chamber including an outer liner and an inner liner and having a combustion zone;
 an annular dome coupled to the outer liner and the inner liner at a forward end of the combustion chamber;
 a plurality of mixing assemblies that operably injects a fuel-air mixture into the combustion zone of the combustion chamber to produce combustion gases;
 one or more air dilution holes that operably directs compressed air into the combustion chamber through at least one of the outer liner or the inner liner; and
 a combustor steam system in fluid communication with the combustion chamber, the combustor steam system including:
 a steam path defined by, and disposed within, at least one of the outer liner or the inner liner, such that the steam path is axially aft of the annular dome;
 one or more steam injectors extending from a forward portion of the steam path that is axially forward of the one or more air dilution holes; and
 one or more steam injector holes extending from an aft portion of the steam path that is axially aft of the one or more air dilution holes and into the combustion chamber,
 wherein the combustor steam system operably directs steam into the steam path via the one or more steam injectors and into the combustion chamber via the one or more steam injector holes.

2. The combustor of claim 1, wherein the combustor steam system operably directs the steam away from the combustion zone.

3. The combustor of claim 1, wherein a water-to-air ratio of the steam and the compressed air in the combustion chamber is 0.0% to 60%.

4. The combustor of claim 1, further including one or more steam dilution holes extending from the steam path and into the combustion chamber through the at least one of the outer liner or the inner liner, wherein the combustor steam system operably injects at least a portion of the steam into the combustion chamber axially aft of at least one of the one or more air dilution holes or the one or more steam dilution holes.

5. The combustor of claim 1, wherein the combustor steam system includes one or more steam cooling holes extending from the steam path and into the combustion chamber through the at least one of the outer liner or the inner liner, the one or more steam cooling holes operably directing the steam therethrough to cool the at least one of the outer liner or the inner liner.

6. The combustor of claim 1, wherein the one or more steam injectors are annular about the combustion chamber.

7. The combustor of claim 1, wherein the one or more steam injection holes are positioned on at least one of the outer liner or the inner liner at least 25% of a total combustion chamber length of the combustion chamber.

8. A method of operating the combustor of claim 1, the method comprising:
generating the fuel-air mixture with the plurality of mixing assemblies;
injecting the fuel-air mixture into the combustion zone of the combustion chamber to generate a flame in the combustion zone that produces the combustion gases;
directing the steam with the combustor steam system into the steam path defined by, and disposed within, the at least one of the outer liner or the inner liner via the one or more steam injectors; and
directing the steam from the steam path and into the combustion chamber via the one or more steam injector holes.

9. The method of claim 8, further comprising directing the steam away from the combustion zone.

10. The method of claim 8, further comprising injecting the steam with the combustor steam system during a mid-power operation of the combustor and during a high-power operation of the combustor.

11. The method of claim 8, further comprising directing the steam into the combustion chamber such that a water-to-air ratio of the steam to the compressed air in the combustion chamber is 0.0% to 60%.

12. The method of claim 8, wherein the combustor includes one or more steam dilution holes extending from the steam path and into the combustion chamber through the at least one of the outer liner or the inner liner, and the method further comprising directing at least a portion of the steam into the combustion chamber axially aft of at least one of the one or more air dilution holes or the one or more steam dilution holes.

13. The method of claim 8, wherein the combustor steam system includes one or more steam cooling holes extending from the steam path and into the combustion chamber through the at least one of the outer liner or the inner liner, and the method further comprising operably directing the steam through the one or more steam cooling holes to cool the at least one of the outer liner or the inner liner.

14. The method of claim 8, further comprising directing the steam from the steam path, through the one or more steam injection holes, and into the combustion chamber at a position that is at least 25% of a total combustion chamber length of the combustion chamber.

15. The method of claim 8, further comprising directing the steam from the steam path, through the one or more steam injection holes, and into the combustion chamber at a position that is in a range of 10% to 90% of a total combustion chamber length of the combustion chamber.

16. The combustor of claim 1, wherein the combustor steam system operably directs steam through the steam path and into the combustion chamber downstream of the combustion zone and of the one or more air dilution holes.

17. The combustor of claim 1, wherein the steam path has a zigzag shape that extends axially afterward from the one or more steam injectors and around the one or more air dilution holes to the one or more steam injector holes.

18. The combustor of claim 1, wherein the steam path includes one or more circumferential extending portions and one or more axial extending portions that are fluidly coupled with the one or more circumferential extending portions.

19. The combustor of claim 18, wherein the one or more steam injector holes extends from the one or more circumferential extending portions of the steam path and into the combustion chamber.

20. The combustor of claim 18, wherein the one or more steam injector holes extends from the one or more axial extending portions of the steam path and into the combustion chamber.

* * * * *